(12) United States Patent
Shalit et al.

(10) Patent No.: US 10,394,952 B2
(45) Date of Patent: Aug. 27, 2019

(54) METHODS AND SYSTEMS FOR IMPROVING DATA ENTRY INTO USER INTERFACES

(71) Applicant: Learning Touch, LLC, Brookline, MA (US)

(72) Inventors: Andrew L M Shalit, Brookline, MA (US); William W. St. Clair, Jr., Bennington, VT (US)

( * ) Notice: Subject to any disclaimer, the term of this patent is extended or adjusted under 35 U.S.C. 154(b) by 175 days.

(21) Appl. No.: 15/669,250

(22) Filed: Aug. 4, 2017

(65) Prior Publication Data

US 2018/0039616 A1 Feb. 8, 2018

Related U.S. Application Data

(60) Provisional application No. 62/370,830, filed on Aug. 4, 2016.

(51) Int. Cl.

| | |
|---|---|
| *G06F 17/27* | (2006.01) |
| *G06F 3/0488* | (2013.01) |
| *G06F 3/023* | (2006.01) |
| *G06F 3/0486* | (2013.01) |
| *G06F 17/28* | (2006.01) |

(52) U.S. Cl.
CPC .......... *G06F 17/276* (2013.01); *G06F 3/0236* (2013.01); *G06F 3/0237* (2013.01); *G06F 3/0486* (2013.01); *G06F 3/04883* (2013.01); *G06F 3/04886* (2013.01); *G06F 17/271* (2013.01); *G06F 17/2735* (2013.01); *G06F 17/2795* (2013.01); *G06F 17/289* (2013.01)

(58) Field of Classification Search
USPC ......................................................... 715/773
See application file for complete search history.

(56) References Cited

U.S. PATENT DOCUMENTS

| | | | | |
|---|---|---|---|---|
| 2006/0265668 | A1* | 11/2006 | Rainisto | G06F 3/0236 715/816 |
| 2011/0248945 | A1* | 10/2011 | Higashitani | G06F 3/018 345/173 |
| 2012/0056816 | A1* | 3/2012 | Ettinger | G06F 3/0235 345/171 |
| 2012/0278734 | A1* | 11/2012 | Ishizuka | G06F 1/1624 715/752 |
| 2014/0208255 | A1* | 7/2014 | Kim | G06F 3/0236 715/773 |

* cited by examiner

*Primary Examiner* — Jason C Olson
(74) *Attorney, Agent, or Firm* — Richard Ben Amster

(57) ABSTRACT

A method to provide an improved text entry user interface, with benefit to people with movement disorders. The method provides a virtual keyboard with active and inactive regions, and fixed or dynamically located target regions placed in relation to virtual keys. The method is insensitive to spurious movement of touch points, allowing persons with tremor to more easily provide input. The method provides, among other things, translations and completions based on dictionaries, word or letter frequency and language properties.

17 Claims, 55 Drawing Sheets

| Preferences | |
|---|---|
| G | Good for you. |
| H | Have a nice day. |
| I | I'm on my way. |
| J | Just kidding! |
| K | |
| L | |
| M | |
| N | |
| O | I'm on my way. |

*Fig. 21A*

METHODS AND SYSTEMS FOR IMPROVING DATA ENTRY INTO USER INTERFACES

CROSS-REFERENCE TO RELATED APPLICATION

This application claims the benefit of U.S. Provisional Application No. 62/370,830, filed Aug. 4, 2016.

BACKGROUND

The disclosure relates to interacting with software applications. More particularly, the methods and systems described herein relate to functionality for improving data entry into a user interface of a software application.

Conventionally, on-screen keyboards—also referred to as virtual keyboards—include a user interface in which letters of an alphabet (and other characters, such as punctuation and spaces) are presented on the screen and a user taps each letter or other character that she wants to type (e.g., type into an application displaying the on-screen keyboard). In some cases, the keyboard may offer a word prediction feature whereby possible words are presented in a dedicated location on the screen as the user types; tapping one of these words inserts the word. Alternatively, the keyboard may present a prediction for the current word, which may be accepted and entered by tapping the space key or another key. Existing on-screen keyboards also often provide an auto-correction feature, which attempts to replace words that have been mistyped with their correct substitutes.

Such conventional keyboards typically suffer from several shortcomings: most notably, it is hard to type on them accurately because of the size of the screen and the lack of physical contour and tactile feedback to help users place their fingers correctly. While auto-correction sometimes helps reduce errors, at other times it introduces additional errors.

Word prediction provides shortcuts that can help reduce errors and speed text entry, but conventional implementations are typically inconvenient, requiring that the user divert their attention from the typing process and move their eyes to a separate portion of the screen to scan for words, followed by a potential movement of the finger away from the main keyboard area to select the desired word. These steps typically interfere with efficient motor planning, complicating and slowing the writing process.

The combined result of the above-mentioned shortcomings is that the process of typing by tapping on touch screen devices is slow, error-prone, and generally not a source of enjoyment.

Recently, several swiping keyboards have become available (e.g., Swiftkey, Swype). With these keyboards, in addition to (or instead of) tapping on individual letters, a user can drag his finger from one letter to the next to spell a word; using a variety of heuristics, the swiping keyboards attempt to insert the word the user intends to type. Swiping keyboards also typically offer word prediction and auto-correction features. Swiping keyboards provide a satisfactory substitute for some people, however, many people find them unintuitive and difficult to use accurately.

The shortcomings of conventional on-screen keyboards are exacerbated for people with movement disorders. These include disorders that cause tremors such as Parkinson's disease and essential tremor; disorders that inhibit motor control such as multiple sclerosis, muscular dystrophy, and cerebral palsy; and cognitive disorders that make accurate movement difficult such as some forms of Down syndrome and some forms of autism spectrum disorder. For these people it is difficult or impossible to place a finger or other pointing device on the screen accurately enough to type. In addition, people with cognitive disabilities may benefit from the ability to make a tentative key selection and then receive feedback before committing to the selected key.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIGS. 21A-21F are block diagrams showing that targets may offer users the ability to insert complete phrases.

DETAILED DESCRIPTION

In some embodiments, the methods and systems described herein provide functionality for improving data entry into a user interface. Before describing these methods and systems in detail, however, a description is provided of a network in which such methods and systems may be implemented.

Figure 1A:
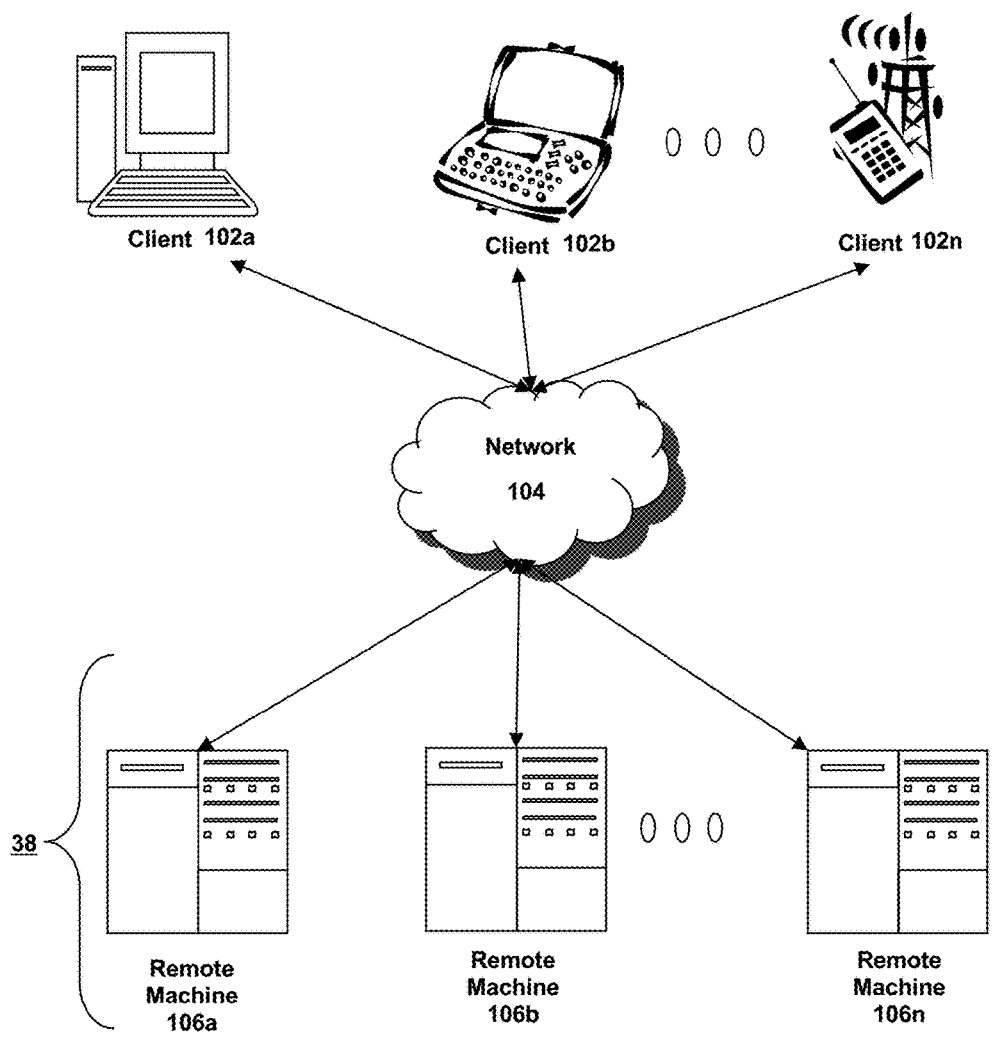
FIGS. 1A-1C are block diagrams depicting embodiments of computers useful in connection with the methods and systems described herein.

Referring now to FIG. 1A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, computing device(s) 102, endpoint(s) 102, or endpoint node(s) 102) in communication with one or more remote machines 106a-106n (also generally referred to as server(s) 106 or computing device(s) 106) via one or more networks 104.

Although FIG. 1A shows a network 104 between the clients 102 and the remote machines 106, the clients 102 and the remote machines 106 may be on the same network 104. The network 104 can be a local area network (LAN), such as a company Intranet, a metropolitan area network (MAN), or a wide area network (WAN), such as the Internet or the World Wide Web. In some embodiments, there are multiple networks 104 between the clients 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client 102 and a remote machine 106 (referred to generally as computing devices 100) can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 102 may execute, operate or otherwise provide an application, which can be any type and/or form of software, program, or executable instructions, including, without limitation, any type and/or form of web browser, web-based client, client-server application, an ActiveX control, or a JAVA applet, or any other type and/or form of executable instructions capable of executing on client 102.

In one embodiment, a computing device 106 provides the functionality of a web server. In some embodiments, a web server 106 comprises an open-source web server, such as the APACHE servers maintained by the Apache Software Foundation of Delaware. In other embodiments, the web server executes proprietary software, such as the INTERNET INFORMATION SERVICES products provided by Microsoft Corporation of Redmond, Wash., the ORACLE IPLANET web server products provided by Oracle Corporation of Redwood Shores, Calif., or the BEA WEBLOGIC products provided by BEA Systems of Santa Clara, Calif.

In some embodiments, the system may include multiple, logically-grouped remote machines 106. In one of these embodiments, the logical group of remote machines may be referred to as a server farm 38. In another of these embodiments, the server farm 38 may be administered as a single entity.

Figure 1B:
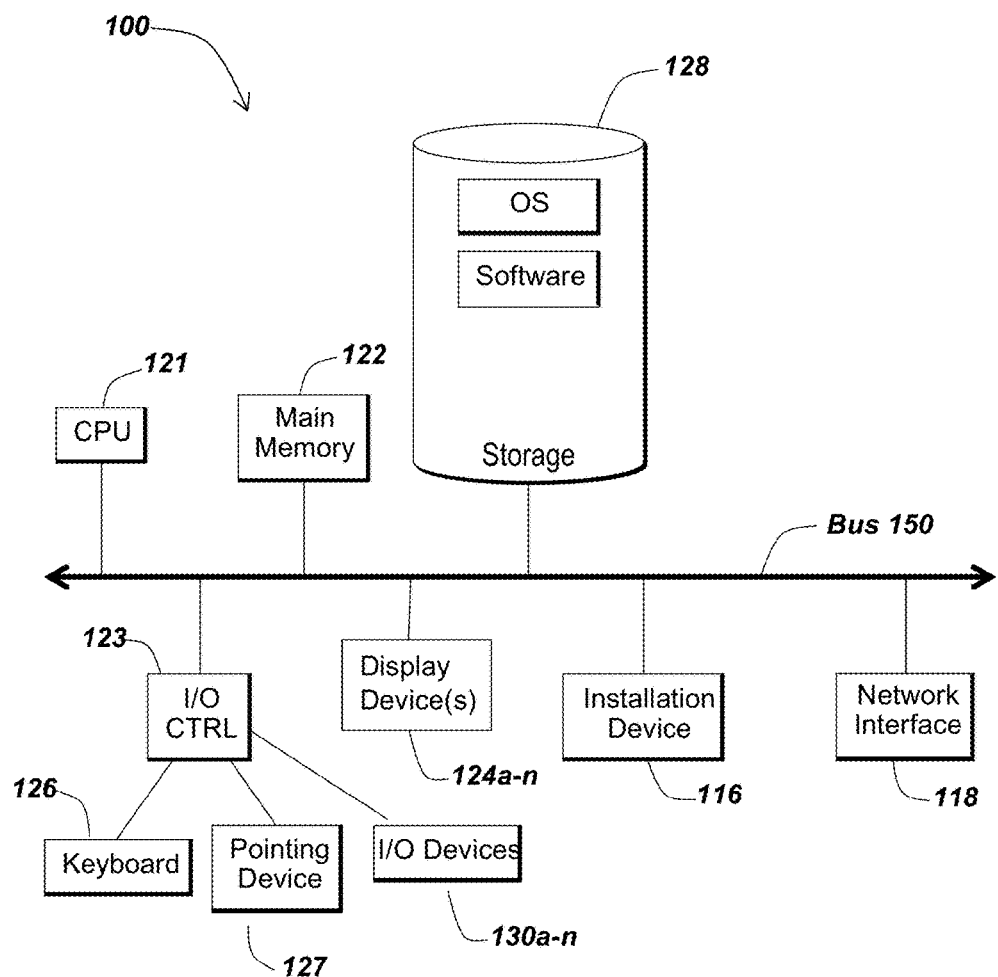
Figure 1C:
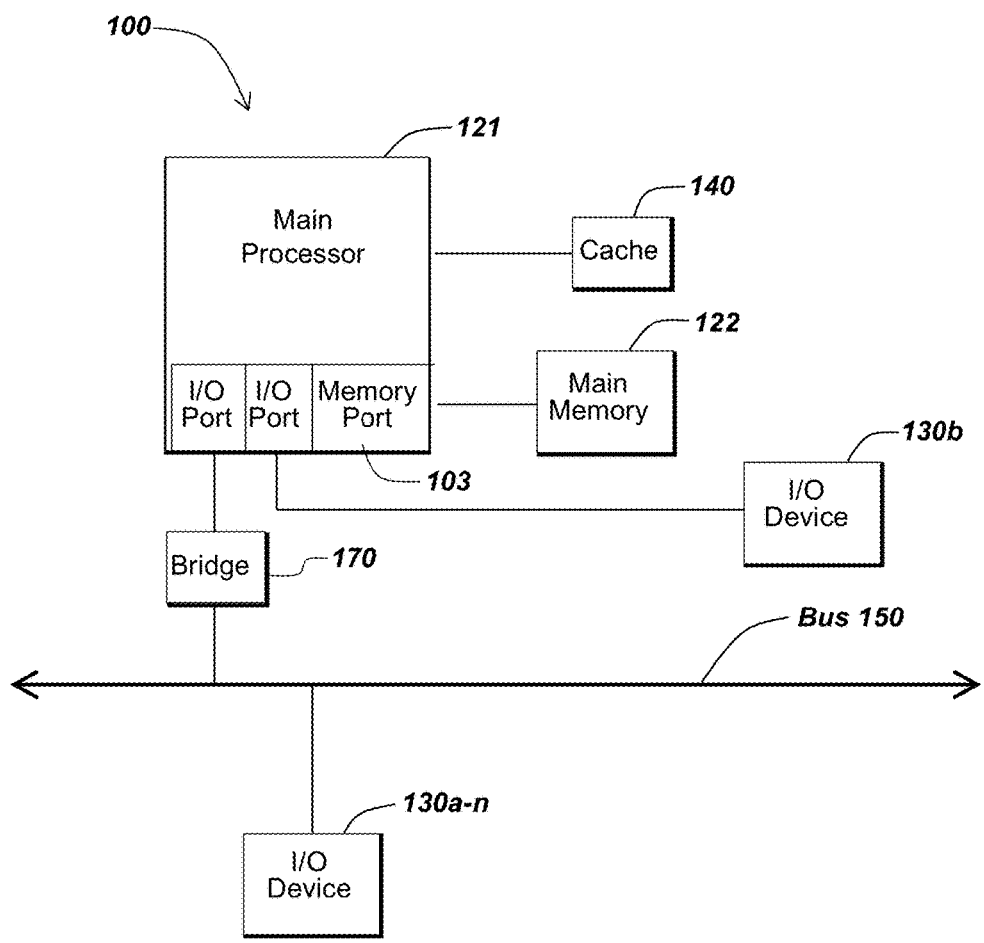

FIGS. 1B and 1C depict block diagrams of a computing device 100 useful for practicing an embodiment of the client 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126, a pointing device 127, such as a mouse, and one or more other I/O devices 130a-n. The storage device 128 may include, without limitation, an operating system and software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. Other examples include SPARC processors, ARM processors, processors used to build UNIX/LINUX "white" boxes, and processors for mobile devices. The computing device 100 may be based on any of these processors, or any other processor capable of operating as described herein.

Main memory unit 122 may be one or more memory chips capable of storing data and allowing any storage location to be directly accessed by the microprocessor 121. The main memory 122 may be based on any available memory chips capable of operating as described herein. In the embodiment shown in FIG. 1B, the processor 121 communicates with main memory 122 via a system bus 150. FIG. 1C depicts an embodiment of a computing device 100 in which the processor communicates directly with main memory 122 via a memory port 103. FIG. 1C also depicts an embodiment in which the main processor 121 communicates directly with cache memory 140 via a secondary bus, sometimes referred to as a backside bus. In other embodiments, the main processor 121 communicates with cache memory 140 using the system bus 150.

In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 also communicates directly with an I/O device 130b via, for example, HYPERTRANSPORT, RAPIDIO, or INFINIBAND communications technology.

A wide variety of I/O devices 130a-130n may be present in the computing device 100. Input devices include keyboards, mice, trackpads, trackballs, microphones, scanners, cameras, touch screens, and drawing tablets. Output devices include video displays, speakers, inkjet printers, laser printers, and dye-sublimation printers. The I/O devices may be controlled by an I/O controller 123 as shown in FIG. 1B. Furthermore, an I/O device may also provide storage and/or an installation medium 116 for the computing device 100. In some embodiments, the computing device 100 may provide USB connections (not shown) to receive handheld USB storage devices such as the USB Flash Drive line of devices manufactured by Twintech Industry, Inc. of Los Alamitos, Calif.

Referring still to FIG. 1B, the computing device 100 may support any suitable installation device 116, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive or any other device suitable for installing software and programs. In some embodiments, the computing device 100 may provide functionality for installing software over a network 104. The computing device 100 may further comprise a storage device, such as one or more hard disk drives or redundant arrays of independent disks, for storing an operating system and other software. Alternatively, the computing device 100 may rely on memory chips for storage instead of hard disks.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, BLUETOOTH, ZIGBEE, CDMA, GSM, WiMax, and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem, or any other device suitable for interfacing the computing device 100 to any type of network capable of communication and performing the operations described herein.

In some embodiments, the computing device 100 may comprise or be connected to multiple display devices 124a-124n, each of which may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the UNIX and LINUX operating systems, any version of the MAC OS for Macintosh computers, any version of iOS or Android, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WIN- DOWS CE, WINDOWS XP, WINDOWS 7, WINDOWS 8, and WINDOWS VISTA, all of which are manufactured by Microsoft Corporation of Redmond, Wash.; MAC OS manufactured by Apple Inc. of Cupertino, Calif.; OS/2 manufactured by International Business Machines of Armonk, N.Y.; Red Hat Enterprise Linux, a Linus-variant operating system distributed by Red Hat, Inc. of Raleigh, N.C.; Ubuntu, a freely-available operating system distributed by Canonical Ltd. of London, England; or any type and/or form of a UNIX operating system, among others.

The computing device 100 can be any workstation, desktop computer, laptop or notebook computer, server, portable computer, mobile telephone, tablet or other portable telecommunication device, media playing device, a gaming system, mobile computing device, or any other type and/or form of computing, telecommunications or media device that is capable of communication and that has sufficient processor power and memory capacity to perform the operations described herein. In some embodiments, the computing device 100 may have different processors, operating systems, and input devices consistent with the device. In other embodiments the computing device 100 is a mobile device, such as a JAVA-enabled cellular telephone/smartphone or personal digital assistant (PDA). The computing device 100 may be a mobile device such as those manufactured, by way of example and without limitation, by Apple Inc. of Cupertino, Calif.; Google/Motorola Div. of Ft. Worth, Tex.; Kyocera of Kyoto, Japan; Samsung Electronics Co., Ltd. of Seoul, Korea; Nokia of Finland; Hewlett-Packard Development Company, L.P. and/or Palm, Inc. of Sunnyvale, Calif.; Sony Ericsson Mobile Communications AB of Lund, Sweden; or Research In Motion Limited of Waterloo, Ontario, Canada. In yet other embodiments, the computing device 100 is a smartphone, POCKET PC, POCKET PC PHONE, or other portable mobile device supporting Microsoft Windows Mobile Software.

In some embodiments, the computing device 100 is a digital audio player. In one of these embodiments, the computing device 100 is a digital audio player such as the Apple IPOD, IPOD TOUCH, IPOD NANO, and IPOD SHUFFLE lines of devices manufactured by Apple Inc. In another of these embodiments, the digital audio player may function as both a portable media player and as a mass storage device. In other embodiments, the computing device 100 is a digital audio player such as those manufactured by, for example, and without limitation, Samsung Electronics America of Ridgefield Park, N.J., or Creative Technologies Ltd. of Singapore. In yet other embodiments, the computing device 100 is a portable media player or digital audio player supporting file formats including, but not limited to, MP3, WAV, M4A/AAC, WMA Protected AAC, AEFF, Audible audiobook, Apple Lossless audio file formats, and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a device in the Google/Motorola line of combination digital audio players and mobile phones. In another of these embodiments, the computing device 100 is a device in the IPHONE smartphone line of devices manufactured by Apple Inc. In still another of these embodiments, the computing device 100 is a device executing the ANDROID open source mobile phone platform distributed by the Open Handset Alliance; for example, the device 100 may be a device such as those provided by Samsung Electronics of Seoul, Korea, or HTC Headquarters of Taiwan, R.O.C. In other embodiments, the computing device 100 is a tablet device such as, for example and without limitation, the IPAD line of devices manufactured by Apple Inc.; the PLAYBOOK manufactured by Research In Motion; the CRUZ line of devices manufactured by Velocity Micro, Inc. of Richmond, Va.; the FOLIO and THRIVE line of devices manufactured by Toshiba America Information Systems, Inc. of Irvine, Calif.; the GALAXY line of devices manufactured by Samsung; the HP SLATE line of devices manufactured by Hewlett-Packard; and the STREAK line of devices manufactured by Dell, Inc. of Round Rock, Tex.

In some embodiments, the methods and systems described herein provide functionality for improving data entry into a user interface. In one of these embodiments, the methods and systems described herein provide an improved software keyboard (also referred to herein as an on-screen keyboard or a virtual keyboard). In other embodiments, the methods and systems described herein are used to improve text entry in environments in which users use any of a variety of pointing devices 127 (e.g., track pads, eye tracking interfaces, head sticks, or computer mice) instead of touch screen interfaces. In further embodiments, the methods and systems described herein are used to improve text entry and/or speech generation in environments in which augmentative and alternative communication (AAC) devices are used. As a result, although referred to herein as virtual or soft keyboards, one of ordinary skill in the art will understand that the methods and systems described herein may also apply to environments in which user interfaces other than virtual keyboards are provided.

In some embodiments, the methods and systems described herein provide increased latitude in finger placement, demanding less accuracy from users and allowing users to correct misplacement easily. In other embodiments, the methods and systems described herein provide feedback that the user has selected the correct key, and allow users to back out of incorrect key selections with minimal cost (e.g., minimal additional keystrokes). In further embodiments, the methods and systems described herein minimize the number of keystrokes needed to enter complete words and sentences, thereby speeding text entry and reducing opportunities for errors.

In some embodiments, the methods and systems described herein provide word prediction functionality that is integrated into the eye and finger movement paths that are used to type individual letters, thus aiding motor planning, speeding text entry and reducing cognitive load. In other embodiments, the methods and systems described herein provide word prediction functionality with previews, thereby helping people with cognitive disabilities express themselves and helping those without cognitive disabilities benefit from improved spelling. In some embodiments, the methods and systems described herein eschew auto-correction, thereby avoiding an entire category of communication errors that has become all too common in the age of the "smart phone." In further embodiments, the methods and systems described herein provide functionality that improves over time, as the systems are exposed to, and learn from, a particular user's writing habits and vocabulary.

In contrast to conventional on-screen keyboards, where users enter data into an application by tapping at a graphical representation of a key, and in contrast to a swipe-style on-screen keyboard, where users enter data by touching one key and then moving from one key to the next key to identify a sequence of data to provide to an application, the methods and systems described herein provide a virtual keyboard application in which users "drag" (e.g., dragging a finger from one point on a touch screen to another) a touch point from a graphical representation of a key to a target area of a virtual keyboard user interface. In one embodiment, a combination of touching a graphical representation of a key in a virtual keyboard user interface followed by movement to the target area determines whether and what data is provided to the application. In some embodiments, if the user does not complete the combined action of touching the graphical representation of the key and also dragging a touch point to the target area, no data is provided to the application. Users may enter individual letters, groups of letters, complete words, or complete phrases using the methods and systems described herein.

Figure 2A:
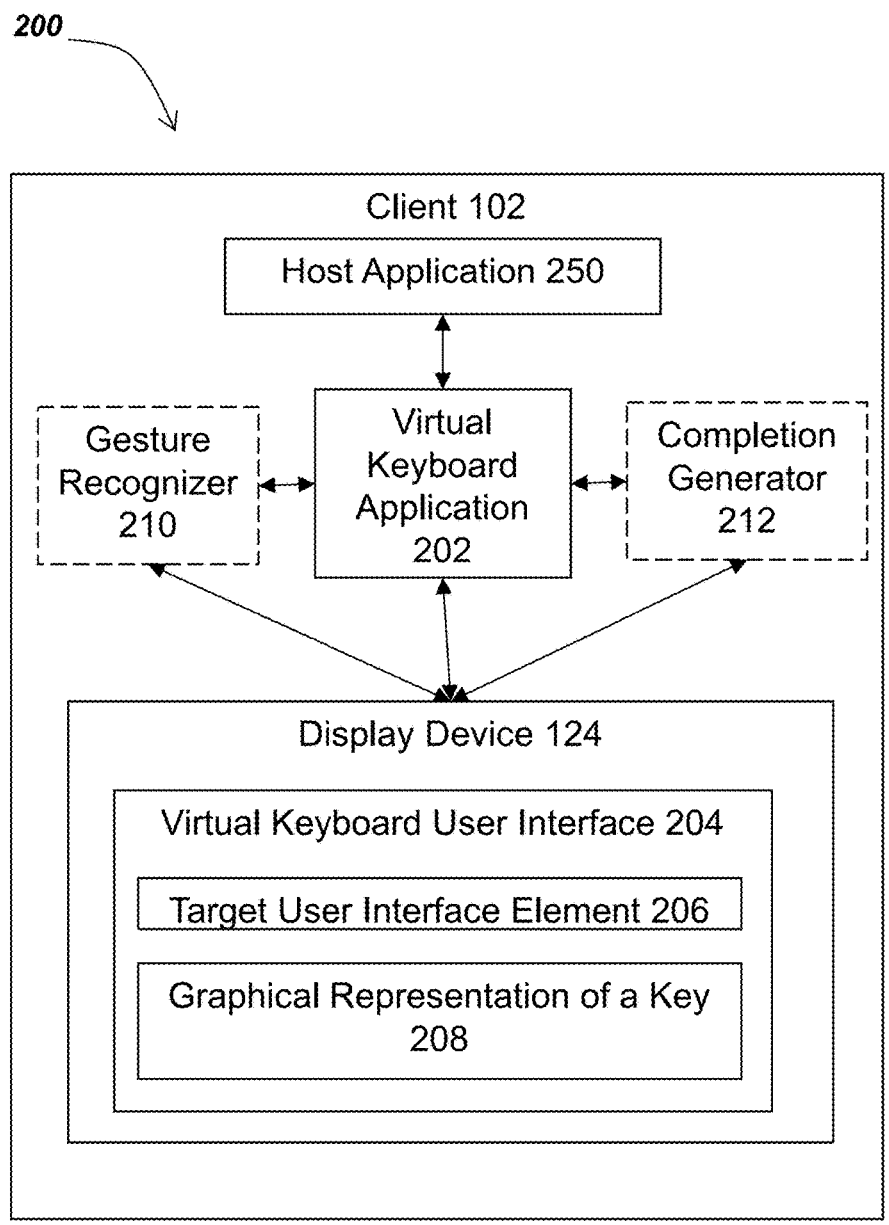
FIG. 2A is a block diagram depicting an embodiment of a system for improving data entry into a user interface.

Referring now to FIG. 2A, a block diagram depicts one embodiment of a system for improving data entry into a user interface. In brief overview, the system 200 includes a virtual keyboard application 202 and a host application 250, each executing on a client 102, which includes a display device 124. The system 200 includes a virtual keyboard user interface 204 and a graphical representation of a key 208.

The client 102 may be a machine 100 as described above in connection with FIGS. 1A-1C. In some embodiments, instead of providing a keyboard 126 or pointing device 127, the client 102 executes the virtual keyboard application 202 (e.g., in embodiments in which the client 102 includes a touch screen).

In one embodiment, the virtual keyboard application 202 is implemented in software. In another embodiment, the virtual keyboard application 202 is implemented in hardware. In one embodiment, the virtual keyboard application 202 is a data input system that is used as the basis of an on-screen keyboard, an AAC application, or other input tool. In some embodiments, the virtual keyboard application 202 is in communication with the host application 250; for example, the virtual keyboard application 202 may transmit an identification of user-entered data to the host application 250 for processing. As another example, the virtual keyboard application 202 may receive context data from the host application 250, including, without limitation, text preceding, following, or otherwise surrounding a data insertion point.

In one embodiment, the host application 250 is implemented in software. In another embodiment, the host application 250 is implemented in hardware.

In some embodiments, the host application 250 and the virtual keyboard application 202 are provided as separate applications. In other embodiments, the host application 250 includes the functionality of the virtual keyboard application 202.

In some embodiments, the system 200 includes an output connection (not shown) with which the virtual keyboard application 202 transmits data to the host application 250. The output connection may be a communications protocol allowing the virtual keyboard application 202 and the host application 250 to exchange data. The output connection may be a separate software application accessed by the virtual keyboard application 202 and the host application 250 to exchange data. The output connection may be an application programming interface (API) provided by the host application 250 and allowing the virtual keyboard application 202 and the host application 250 to exchange data. The output connection may be an application programming interface (API) provided by the operating system and allowing the virtual keyboard application 202 and the host application 250 to exchange data. The output connection may be proprietary functionality. Alternatively, the output connection may be or include commercially available functionality.

In one embodiment, a graphical representation of a key 208 is a region within the virtual keyboard user interface 204 displaying a graphical element (e.g., an icon, picture, punctuation mark, or representation of one or more alphanumeric or other symbols). The graphical representation may include ornamental features; for example, the graphical representation may include features that suggest to a user a more realistic (or fanciful, or decorated, or aesthetically appealing, etc.) depiction of a key on a keyboard. In another embodiment, a graphical representation of a key 208 is associated with one or more key values (e.g., a picture of a letter "a" may be depicted in a region of the virtual keyboard user interface 204 associated with a key value "a" or "A" or "a" or some or all of these or other values). The key values may also be referred to as symbols. Symbols, like the keys 208, may be one or more alphanumeric characters, punctuation marks, icons, emoticons, or pictures. In still another embodiment, users "activate" the key 208 by touching or pressing down on the graphical element (e.g., when using a touch screen device). In some embodiments, there are a plurality of graphical representations of keys 208, such that the virtual keyboard user interface appears to display either a standard (e.g., "QWERTY") keyboard or a non-standard keyboard (e.g., a keyboard in which only certain keys are displayed, for example, keys selected based on a context of the application).

A target user interface element 206 may be consistently displayed in the virtual keyboard user interface; alternatively, the target user interface element 206 may only be rendered upon selection of a graphical representation of a key. A target user interface element 206 may be consistently displayed in one location in the virtual keyboard user interface; alternatively, the target user interface element 206 may be rendered in a location relative to the location of the selected graphical representation of a key. In some embodiments, there are a plurality of target user interface elements 206. In one of these embodiments, the plurality of target user interface elements 206 allows for different types of data to be provided to the "host" application 250 (e.g., the application receiving data entry information from the virtual keyboard application 202).

The virtual keyboard application 202 may include a background region that does not contain a key or a target. If a display of key(s) and target(s) take up the entire virtual keyboard user interface 204, then the background is effectively a null region.

The virtual keyboard application 202 may include a context retrieval module that provides information about a context in which the virtual keyboard application 202 is being used. For example, the context retrieval module may communicate with the host application 250 (e.g., via the output connection) to request an identification of text (if any) that precedes an insertion point. This context may be provided to the virtual keyboard application 202 or a sub-component thereof (e.g., the completion generator 212 described below), which uses the context when calculating the candidate output values to provide to the target.

The virtual keyboard application 202 may include a completion generator 212 (depicted in shadow in FIG. 2A) that produces one or more candidate output values for association with a target when a key is activated (e.g., pressed upon); the association of the output values with the target user interface element 206 may enable insertion of the output values into a display of the output values by the target user interface element 206. The output values produced by the completion generator 212 may be based in part or whole on the key value of the key that was activated. The completion generator 212 may also incorporate information from other components of the system 200, such as the context provider or the language database, to produce the output values. In some embodiments, the completion generator 212 includes the functionality of the context retrieval module described above.

The virtual keyboard application 202 may include a gesture recognizer 210 (depicted in shadow in FIG. 2A) that detects whether or not a finger or other pointing device is touching a screen of the client 102; note that touching a screen may include a mouse down event or track pad pressed event in embodiments in which non-touch-screens are used. The gesture recognizer 210 may include functionality for receiving an indication of a touch event from the display device 124 (e.g., an indication that a finger or other pointing device has touched a screen of the display device 124, or has been dragged from one point on the screen (e.g., as defined by a coordinate pair) to another, or has exerted a level of pressure on one point on the screen that is above, or below, a level of pressure exerted on the point on the screen at a previous time, or that a touch event has ended). Touch events may include, without limitation, touch-down, touch-up, and touch-move.

In one embodiment, the gesture recognizer 210 may be stand-alone functionality provided by the system 200. In another embodiment, the virtual keyboard application 202 may provide the functionality of the system 200. In still another embodiment, an operating system of the client 102 provides the functionality of the gesture recognizer 210. In yet another embodiment, the gesture recognizer 210 is commercially available software.

The virtual keyboard application 202 may include a language database including linguistic information. The linguistic information may include, but is not limited to, lists of words with correct spelling and capitalization, parts of speech, and relative frequency of words; frequency data for letter sequences, word sequences, and word co-proximity; root word and inflection tables; conjugation and inflection patterns. The database may be read-only, or it may be read-write, in which case it may be updated based on usage. Information from the language database may be used by the completion generator 212 to produce candidate output values.

Figure 2B:
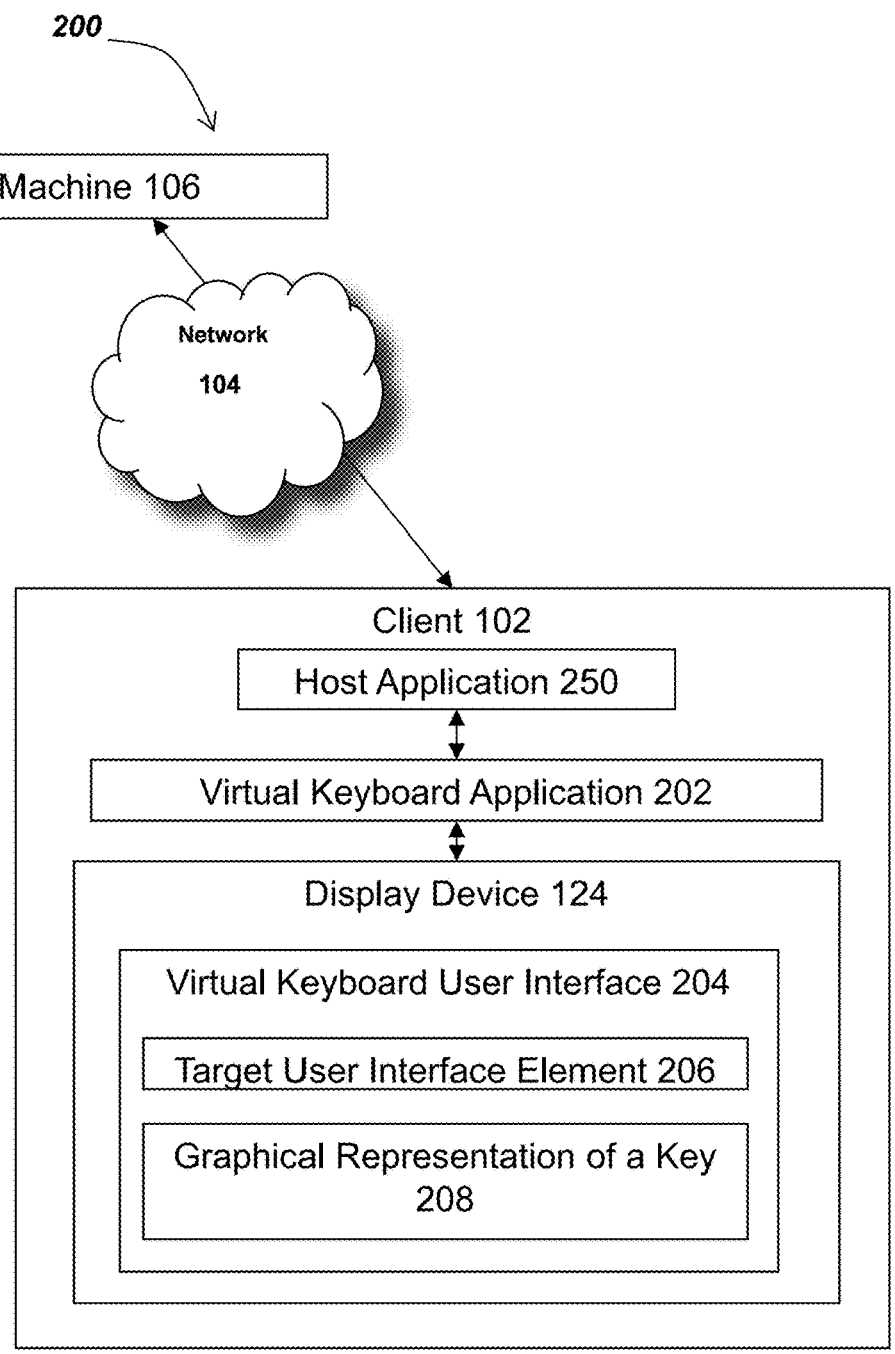
FIG. 2B is a block diagram depicting an embodiment of a system for improving data entry into a user interface.

As indicated in FIG. 2B, the client 102 may be in communication with a machine 106 (e.g., over a network 104). In some embodiments, the client 102 and the machine 106 each provide a portion of the functionality described herein. For example, the client 102 may request that the machine 106 make determinations regarding natural language processing (e.g., determining what keystrokes are probabilistically likely to be associated with what words) or leveraging one or more machine learning engines on the machine 106 that can provide improved speed, processing power, or other hardware or software benefit over what the client 102 provides. By leveraging distributed computing in such embodiments, the system 200 may provide improved data entry to user interfaces.

Although for ease of discussion the elements of the system 200 are described as separate elements, it should be understood that this does not restrict the architecture to a particular implementation. For instance, these elements may be encompassed by a single circuit or software function; alternatively, they may be distributed across a plurality of machines 100.

Figure 3A:
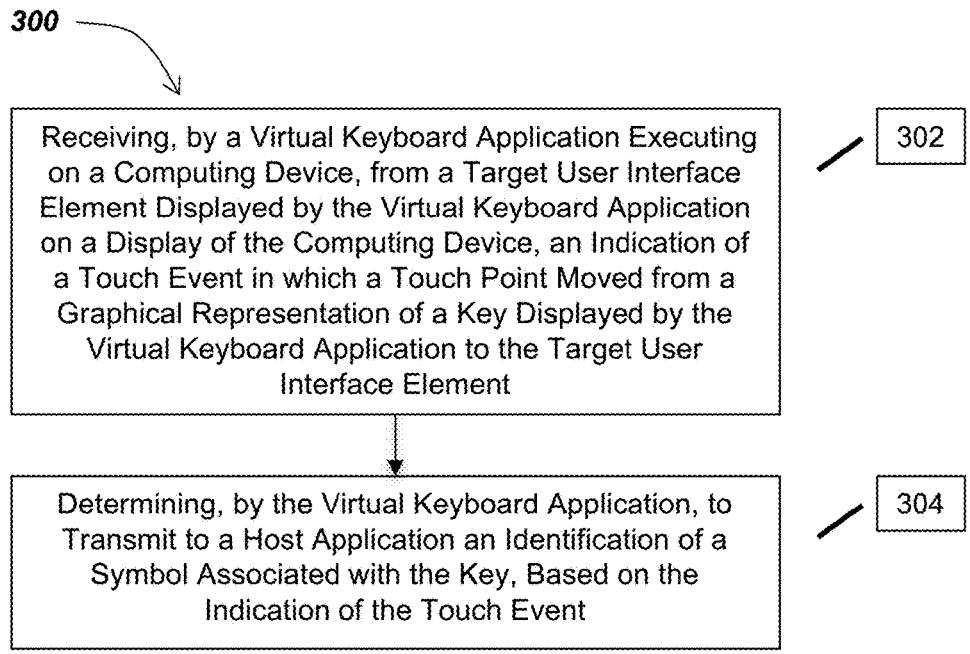
FIG. 3A is a flow diagram depicting an embodiment of a method for improving data entry into a user interface.

Referring now to FIG. 3A, and in connection with FIGS. 2A-B, a flow diagram depicts one embodiment of a method 300 for improving data entry into a user interface. In brief overview, the method 300 includes receiving, by a virtual keyboard application executing on a computing device, from a target user interface element displayed by the virtual keyboard application on a display of the computing device, an indication of a touch event in which a touch point moved from a graphical representation of a key displayed by the virtual keyboard application to the target user interface element (302). The method 300 includes determining, by the virtual keyboard application, to transmit to a host application an identification of a symbol associated with the key, based on the indication of the touch event (304).

In some embodiments, the virtual keyboard application 202 receives an indication of a touch event indicating an initial touch of a finger or pointing device to a screen of the display device 124 (as opposed to, or before, receiving an indication of completion of an entire activation sequence). The virtual keyboard application 202 may optionally provide a user of the client 102 with feedback as to whether or not the user has successfully touched the screen of the display device 124 and initiated a touch event. As one example, display of the target user interface element 206 may provide feedback that the user successfully touched the screen. As another example, the virtual keyboard application 202 may alter the display to provide visual feedback that the user successfully touched the screen.

Figure 4:
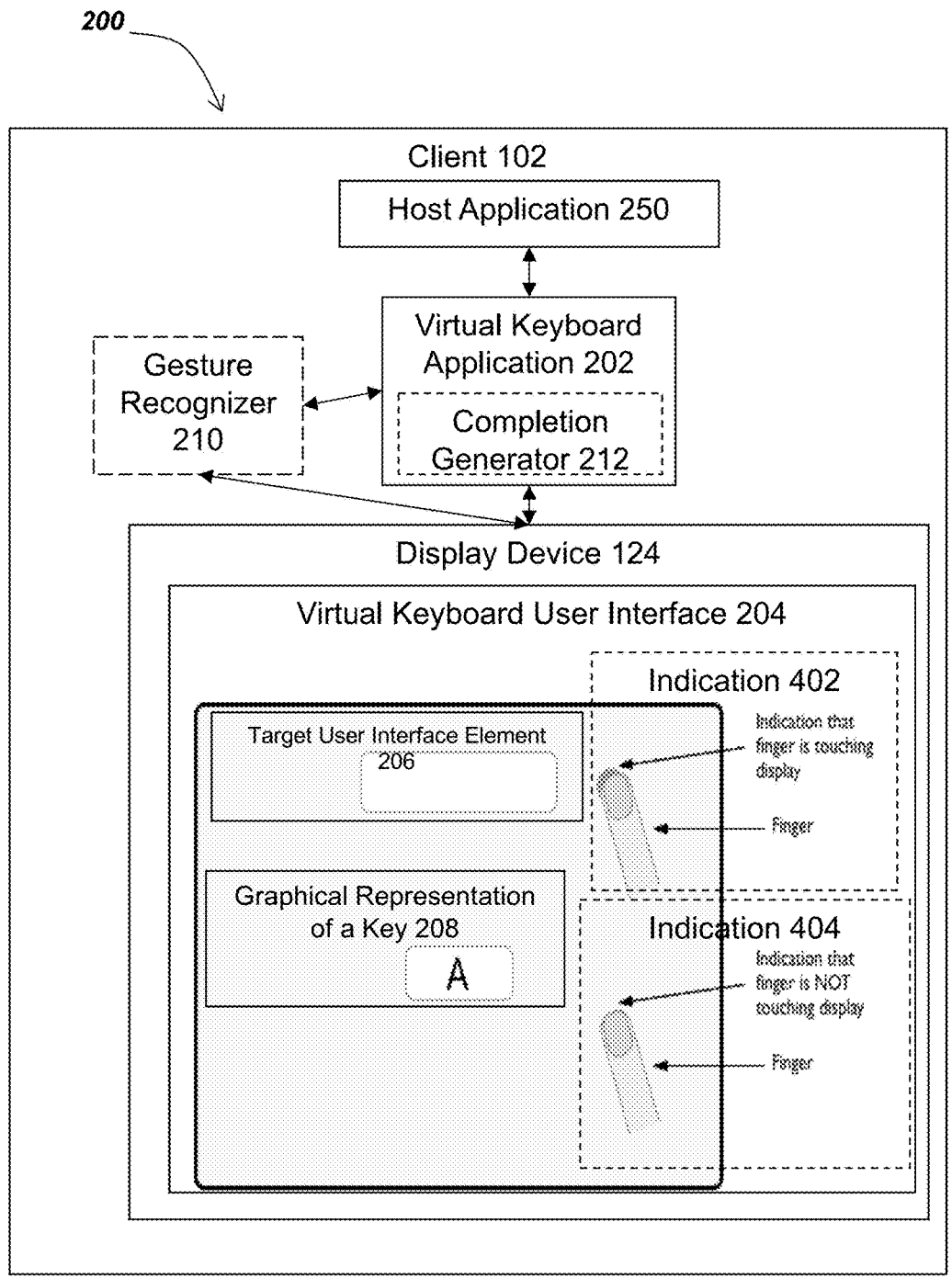
FIG. 4 is a block diagram depicting one embodiment of a system for improving data entry into a user interface and providing feedback regarding activation of a touch screen device.

Referring ahead to FIG. 4, a block diagram depicts one embodiment of a system for improving data entry into a user interface and providing feedback regarding activation of a touch screen device. As depicted in FIG. 4, a user has attempted to activate the graphical representation of the key 208 (e.g., attempted to click on and "drag" from the region of the screen displaying the "A" to the target user interface element 206). In an embodiment in which the user successfully places their finger on the screen of the display device, the virtual keyboard user interface 204 displays indication 402 that the user is touching the display (e.g., by generating a graphical display of a shape, distinct color, or other mark identifying a place on the screen of the display device 124 where the user's finger or other pointing device has touched the screen). In an embodiment in which the user has not touched the screen of the display device, the virtual keyboard user interface 204 displays indication 404 that the user is not touching the display. It should be noted that implementation of functionality providing this type of feedback is optional.

Referring back to FIG. 3A, a user may touch a background region of the virtual keyboard user interface 204 and then drag a finger to the graphical representation of the key 208 to activate a key on the touch screen device; alternatively, the user may directly touch the region of the display device 124 displaying the graphical representation of the key 208.

In some embodiments, the user moves a finger from the region of the display device 124 displaying the graphical representation of the key 208 to a region of the screen displaying the target 206. In other embodiments, upon activation of a key 208, the virtual keyboard application 202 generates a display of a symbol associated with the key 208 that "follows" a location of a touch point on the display device 124 as the touch point moves across the screen (e.g., the symbol appears to be moving from the key 208 to the target 206 as the pointing device moves from the key 208 to the target 206); a target user interface element 206 is activated when the symbol is displayed within a region of the screen that overlaps with a region associated with the target user interface element 206 (instead of, for example, activating the target 206 when the pointing device is touching the region of the screen associated with the target 206). Such embodiments may provide a visual metaphor of a user dragging and dropping a letter key into a target user interface and the metaphor may be helpful to many users, particularly those with disabilities.

Once a user successfully touches the graphical representation of the key 208 (i.e., "activates the key"), the user may either complete a command sequence (i.e., complete a touch event that includes activating the key and dragging the touch point to the target user interface element 206) or abandon the command sequence (i.e. by lifting their finger when the touch point is not within the bounds of a target). Completing a command sequence may also be referred to as activating the target 206. In some embodiments, the virtual keyboard application 202 receives an indication that the touch point was released within a region of the display screen associated with the target user interface element and determines based on the indication that the command sequence has been completed.

Figure 5:
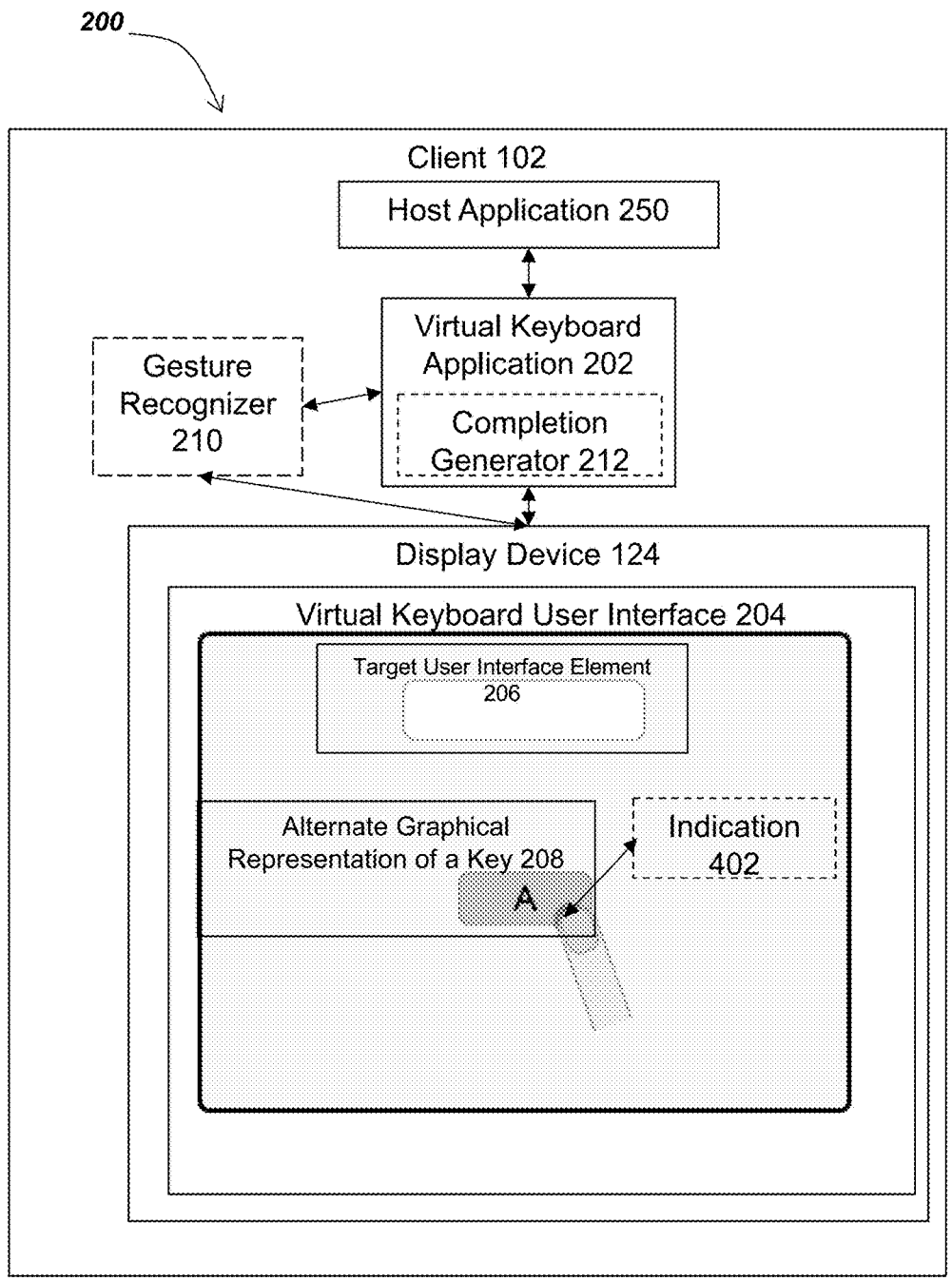
FIG. 5 is a block diagram depicting an embodiment of a system in which a graphical representation of an activated key may displays differently from a display of a key that has not been activated.

In some embodiments, an alternative graphical representation is provided for an activated key. Referring ahead to FIG. 5, a block diagram depicts an embodiment of a system in which a graphical representation of an activated key may displays differently from a display of a key that has not been activated (e.g., by highlighting, bolding, or otherwise modifying the display of the key). The alternate graphical representation of a key 208 shown in FIG. 5, for example, includes a shaded box with the letter "A"—this is in contrast to the graphical representation of a key 208 shown in FIG. 4, for example, in which the box with the letter "A" on it was not shaded.

In some embodiments, the virtual keyboard application 202 delays display of the target user interface element 206 until a user has activated a key 208.

Figure 6:
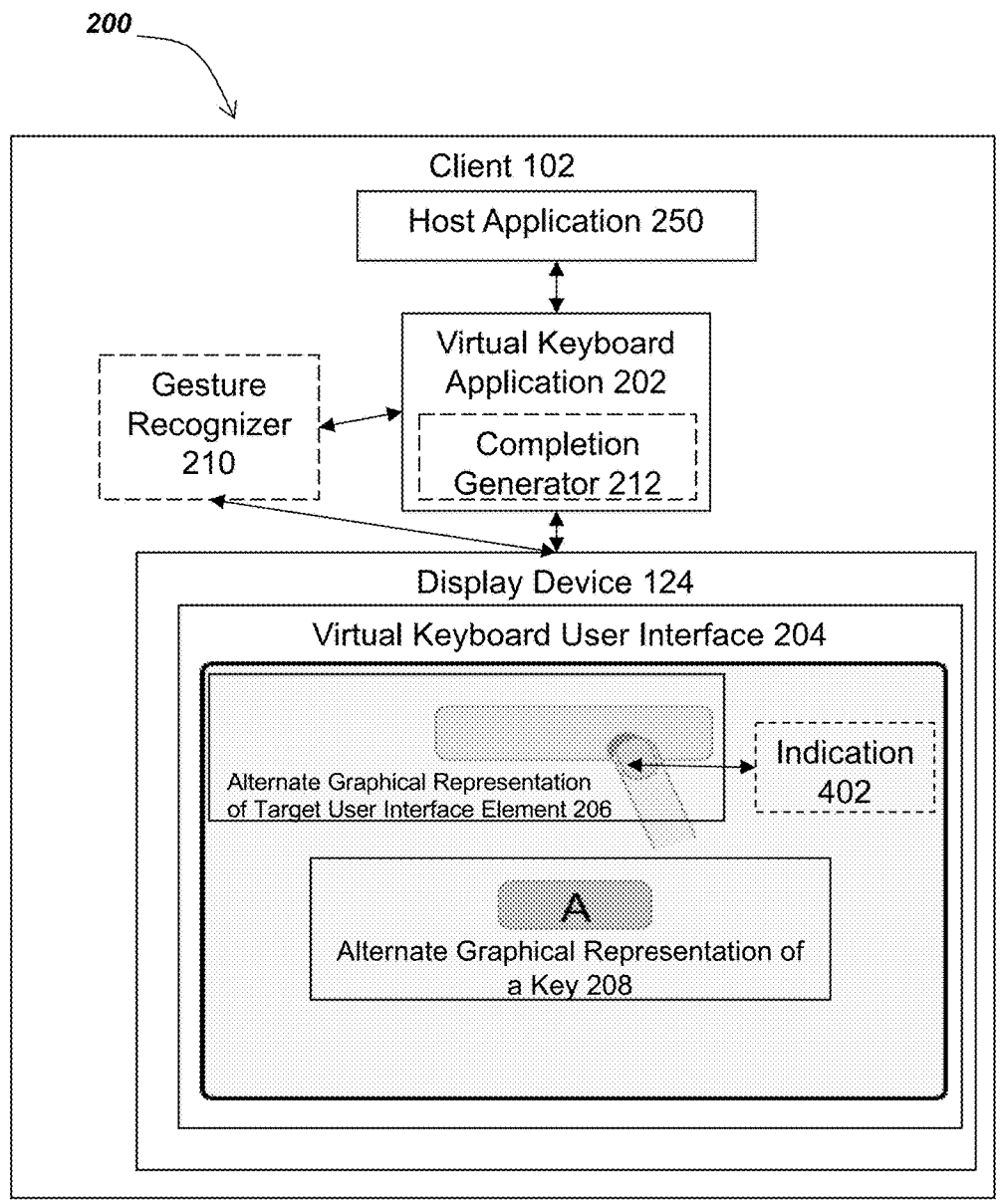
FIG. 6 is a block diagram depicting one embodiment of a system in which an alternative graphical representation is provided for an activated target user interface element.

In some embodiments, an alternative graphical representation is provided for an activated target. For example, a first graphical representation may display the target 206 in one way before activation and a second graphical representation may display the activated target 206 in a second way—for example, by highlighting the target 206, adding a frame, boundary, border, or other graphical element to the exterior or interior of the displayed target 206. Referring now to FIG. 6, a block diagram depicts one embodiment of an alternative graphical representation provided for an activated target. As shown in FIG. 6, an alternate graphical representation of the target 206 includes a shaded box, unlike, for example, the target 206 shown in FIG. 5, in which the box was not shaded.

Figure 7:
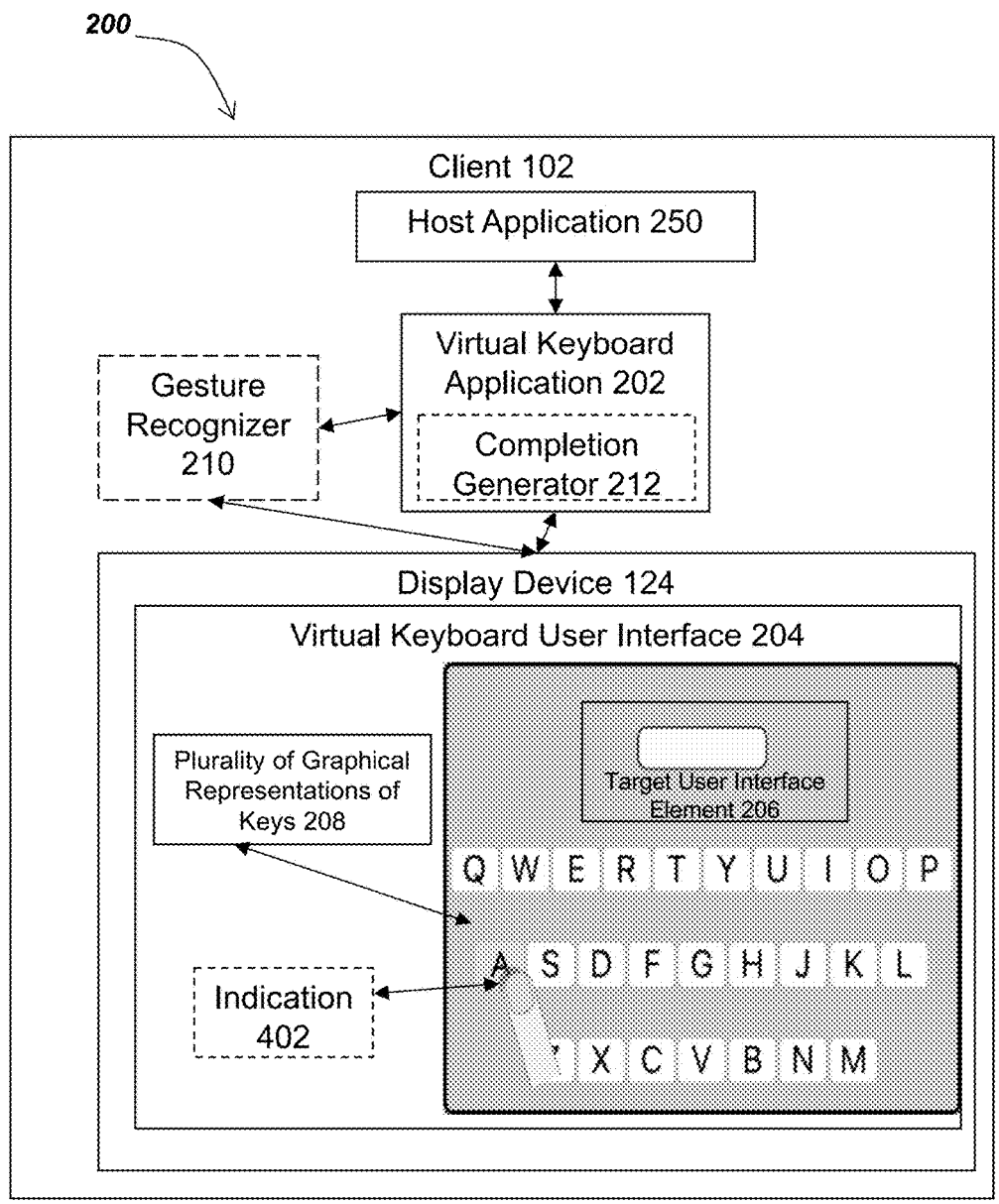
FIG. 7 a system in which an embodiment of a virtual keyboard user interface including multiple keys.

As will be understood by those of ordinary skill in the art, although only one letter on one key 208 may be discussed in examples herein, a plurality of keys may be displayed. Referring now to FIG. 7, a block diagram depicts an embodiment of the virtual keyboard user interface 204 including multiple keys 208.

Figure 8A:
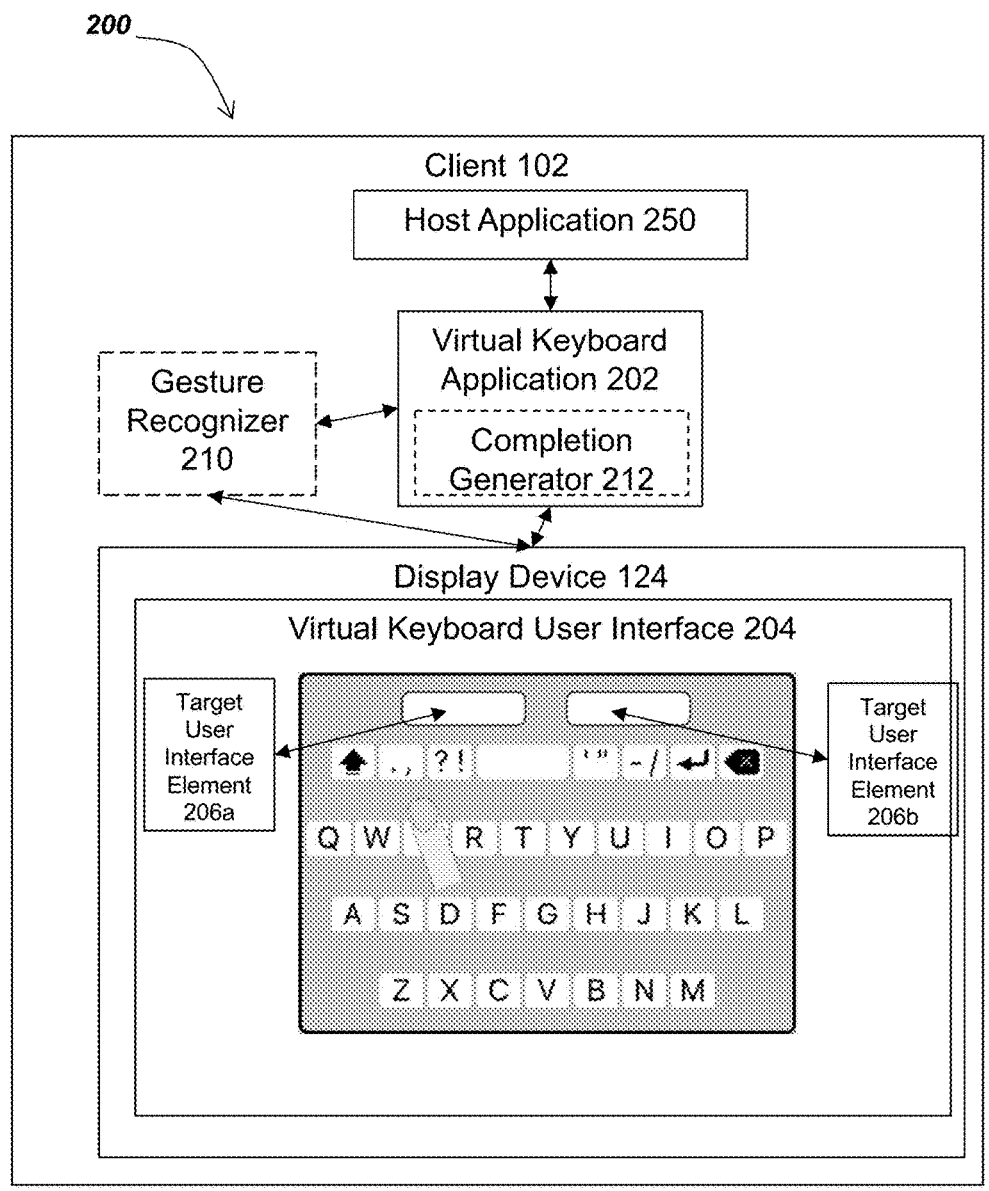
FIGS. 8A-8B are block diagrams depicting embodiments of a virtual keyboard user interface including a plurality of target user interface elements.
Figure 8B:
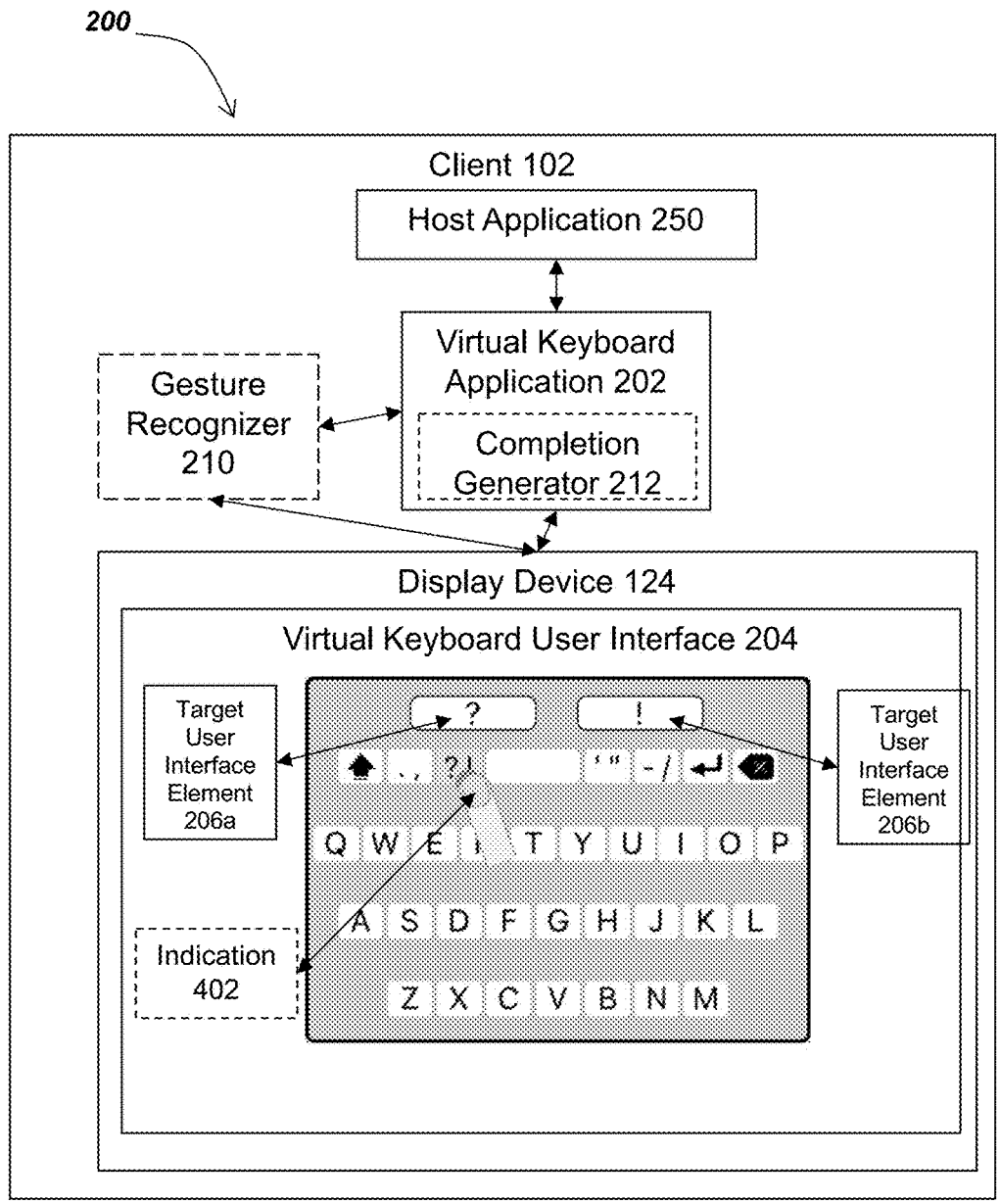

Referring now to FIGS. 8A-8B, block diagrams depict embodiments of a virtual keyboard user interface 204 including a plurality of target user interface elements. As shown in FIG. 8A, the virtual keyboard application 202 may display a keyboard interface in which one or more keys include a plurality of symbols; for example, in FIG. 8A, one key includes both a question mark and an exclamation point. As shown in FIG. 8B, when the virtual keyboard application 202 receives an indication that a user has activated a key associated with a plurality of key values (e.g., both a question mark and an exclamation point), the virtual keyboard application 202 may display a plurality of targets 206; for example, the virtual keyboard application 202 may display a number of targets 206 equal to a number of key values associated with an activated key 208. As shown in FIG. 8B, the virtual keyboard application 202 may display one of the plurality of key values in each target 206, allowing the user to drag the touch point to the target 206 that contains the key value the user intends to transmit to the host application. Similarly, alternate forms of letters may be displayed in the target (not just different symbols)—for example, capital or lowercase versions of an activated key may be displayed in different targets 206. As another example, multiple letters may be grouped together in a key 208 and then separated out into different targets 206; this is useful, for example, to increase the background area of the keyboard and allow greater latitude in where users with motor control difficulties place their finger initially on the keyboard.

Referring back to FIG. 3A in greater detail, and in connection with FIGS. 2A-B, the method 300 includes receiving, by a virtual keyboard application executing on a computing device, from a target user interface element displayed by the virtual keyboard application on a display of the computing device, an indication of a touch event in which a touch point moved from a graphical representation of a key displayed by the virtual keyboard application to the target user interface element (302). The indication of the touch event may indicate completion of a sequence of touch events, such as both touching a screen of the display device 124 and dragging either a touch point to a target user interface element 206 (which, in some embodiments, includes dragging the graphical representation itself to a target user interface element 206); this may be referred to as activation of the target 206 or completion of a command sequence. In one embodiment, a gesture recognizer 210 receives the indication from the target user interface element 206 and forwards the indication to the virtual keyboard application 202.

In some embodiments, the virtual keyboard application 202 determines a key value of key 208. In one of these embodiments, the virtual keyboard application 202 may receive an identification of the key value with the indication of the touch event that activates the target 206. Alternatively, the virtual keyboard application 202 may use information received with the indication of the touch event that activates the target 206 to determine the key value (e.g., receiving a coordinate pair identifying a point on the screen that was touched and accessing a data structure such as a map between coordinate pairs and key values to look up a key value associated with the received coordinate pair). In another of these embodiments, the virtual keyboard application 202 may receive an identification of the key value with the indication of the touch event that activates the key 208.

In one embodiment, the virtual keyboard application 202 determines an output value based on a key value of an activated key 208. The virtual keyboard application 202 may determine an output value by accessing a data structure that maps key values to output values. In another embodiment, the virtual keyboard application 202 provides the key value to the completion generator 212 and the completion generator 212 determines the output value. The completion generator 212 may incorporate information from a context provider and/or a language database to generate output values.

Figure 9:
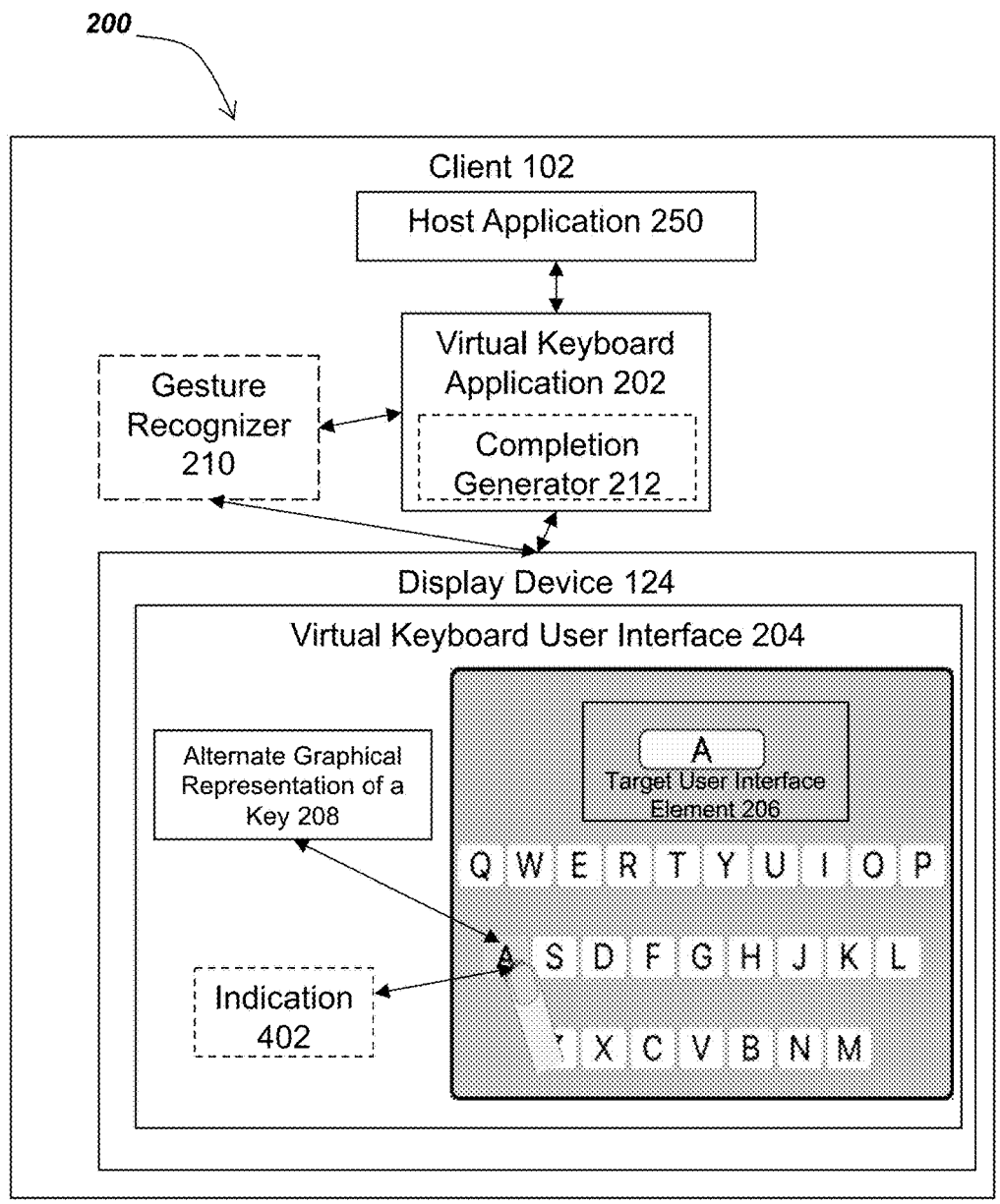
FIG. 9 is a block diagram depicting an embodiment of a virtual keyboard user interface in which the target user interface element displays an output value associated with an activated key.

Referring ahead to FIG. 9, a block diagram depicts an embodiment of the virtual keyboard user interface 204 in which the target user interface element 206 displays an output value associated with an activated key 208. In one embodiment, the completion generator 212 associates the output value with a target 206. In another embodiment, a display of the target 206 is updated to reflect an associated output value. As shown in FIG. 9, the virtual keyboard application 202 has generated a display of an indication 402 that a touch event successfully occurred (e.g., when the user touched the screen), the virtual keyboard application 202 generated an alternative display of the key 208, and the virtual keyboard application 202 updated the display of the target 206 to include the output value associated with the key value of the key 208. In some embodiments, and as shown in FIG. 9, the virtual keyboard application 202 updates the display upon activation of the key 208. In one of these embodiments, the virtual keyboard application 202 updates the display to remove the output value if the user removes a touch point from the region of the display associated with the graphical representation of the key 208 or otherwise fails to complete the command sequence.

Referring back to FIG. 3A, and in some embodiments, the virtual keyboard application 202 may produce a plurality of output values based on the key values. In one of these embodiments, the virtual keyboard application 202 generates a display of the plurality of output values for selection by the user of one of the plurality of output values.

In some embodiments, upon receiving an indication that the user activated a key 208 the virtual keyboard application 202 initiates a timer and, if the virtual keyboard application 202 receives an indication that the user has ended a touch event (i.e., removed their finger from the key 208) before a predetermined period of time elapses, the virtual keyboard application 202 automatically selects an output value based on the key value of the key 208. If the virtual keyboard application 202 determines to automatically select an output value, the virtual keyboard application 202 may also determine to transmit the output value to the host application 250. In such embodiments, the virtual keyboard application 202 provides functionality for touch-to-type entry, in addition to data entry based upon a completed command sequence.

The method 300 includes determining, by the virtual keyboard application, to transmit to a host application an identification of a symbol associated with the key, based on the indication of the touch event (304). The virtual keyboard application 202 may transmit the instruction to the host application 250 upon completion of the command sequence. Alternatively, in embodiments in which a plurality of output values was generated and displayed on the virtual keyboard user interface 204, the virtual keyboard application 202 may transmit the instruction to the host application 250 upon receiving an identification of a selection of one of the plurality of output values. Upon completion of the transmission, the virtual keyboard application 202 may remove any associations between the target 206 and any output values and may update the display of the target 206. If an alternative graphical representation of a key was displayed upon activation of the key, the virtual keyboard application 202 may display a graphical representation associated with the unactivated key. The virtual keyboard application 202 may store a user selection of the one of the plurality of output values for future reference (e.g., in the language database).

Figure 3B:
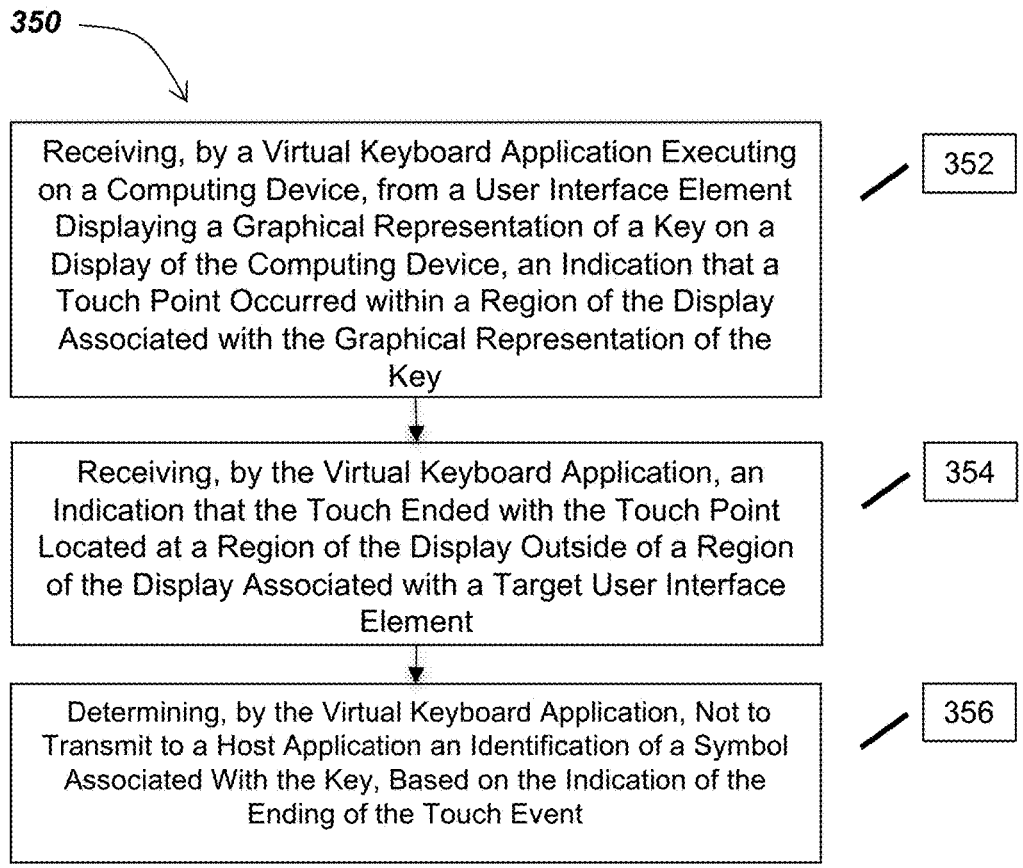
FIG. 3B is a flow diagram depicting an embodiment of a method for improving data entry into a user interface.

Referring now to FIG. 3B, and in connection with FIGS. 2A-B and 3A, a flow diagram depicts one embodiment of a method 350 for improving data entry into a user interface. In brief overview, the method 350 includes receiving, by a virtual keyboard application executing on a computing device, from a user interface element displaying a graphical representation of a key on a display of the computing device, an indication that a touch point occurred within a region of the display associated with the graphical representation of the key (352). The method 350 includes receiving, by the virtual keyboard application, an indication that the touch ended with the touch point located at a region of the display outside of a region of the display associated with a target user interface element (354). The method 350 includes determining, by the virtual keyboard application, not to transmit to a host application an identification of a symbol associated with the key, based on the indication of the ending of the touch event (356).

The method 350 includes receiving, by a virtual keyboard application executing on a computing device, from a user interface element displaying a graphical representation of a key on a display of the computing device, an indication that a touch point occurred within a region of the display associated with the graphical representation of the key (352). The virtual keyboard application 202 may receive this indication as described above in connection with FIG. 3A.

The method 350 includes receiving, by the virtual keyboard application, an indication that the touch ended with the touch point located at a region of the display outside of a region of the display associated with a target user interface element (354). The virtual keyboard application 202 may receive an indication that the user activated a key 208 and the virtual keyboard application 202 may receive a subsequent indication that the user ended the touch event. In some embodiments, upon receiving an indication that the user activated a key 208 the virtual keyboard application 202 initiates a timer and if a predetermined period of time elapses without receipt of an indication of a touch event activating the target 206, the virtual keyboard application 202 determines that the user has aborted the attempt to activate the target 206.

The method 350 includes determining, by the virtual keyboard application, not to transmit to a host application an identification of a symbol associated with the key, based on the indication of the ending of the touch event (358).

The methods and systems described herein may also provide additional functionality, as described below.

Inserting Multiple Characters with a Single Command Sequence

Figure 10A:
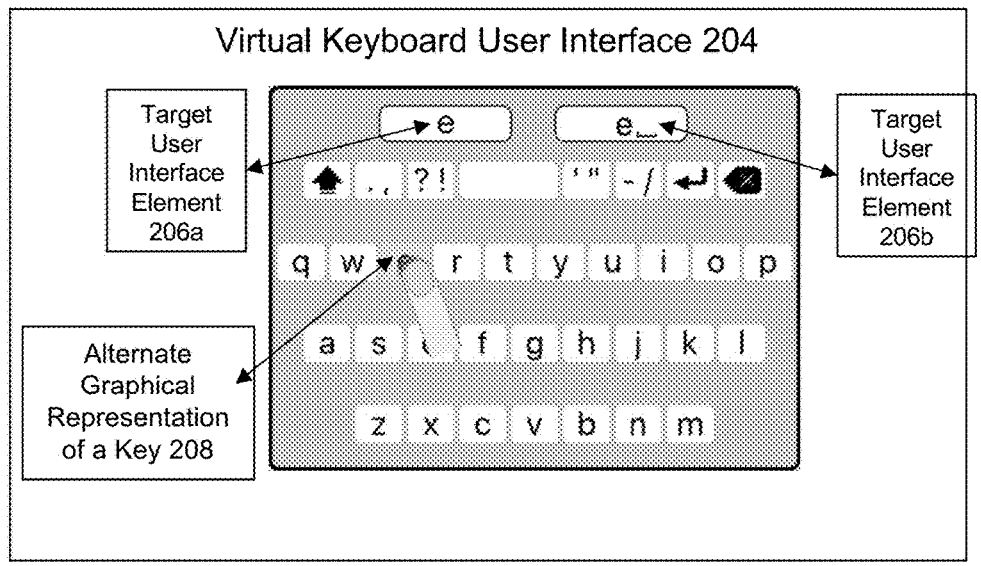
FIGS. 10A-10B are block diagrams showing that a single command sequence—dragging a finger from a key to a target—may result in the insertion of multiple characters.

A single command sequence—dragging a finger from a key to a target—may result in the insertion of multiple characters. FIG. 10A shows one embodiment, where two targets provide options for inserting a letter by itself 206a, or for inserting a letter followed by a space 206b. The "letter plus space" target 206b allows the user to complete words with a single action, rather than having to type the letter (first action) and then separately type a space (second action).

Figure 10B:
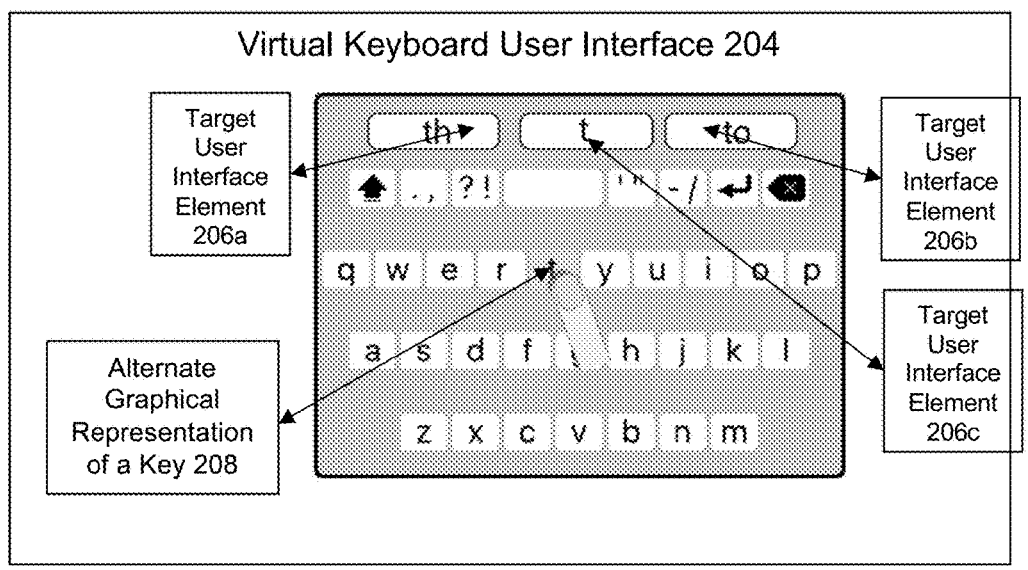

FIG. 10B shows three targets providing options for inserting the letter by itself 206c, or for inserting the letter followed by another letter 206a and 206b. (The other letters shown would typically be letters that frequently follow the first letter, either through a static analysis of the language or from context.)

Inserting Complete Words with a Single Command Sequence

A single command sequence—dragging a finger from a key 208 to a target 206—can also insert a complete word. For example, the virtual keyboard application 202 can provide targets showing the most common words that begin with the chosen letter.

Figure 11A:
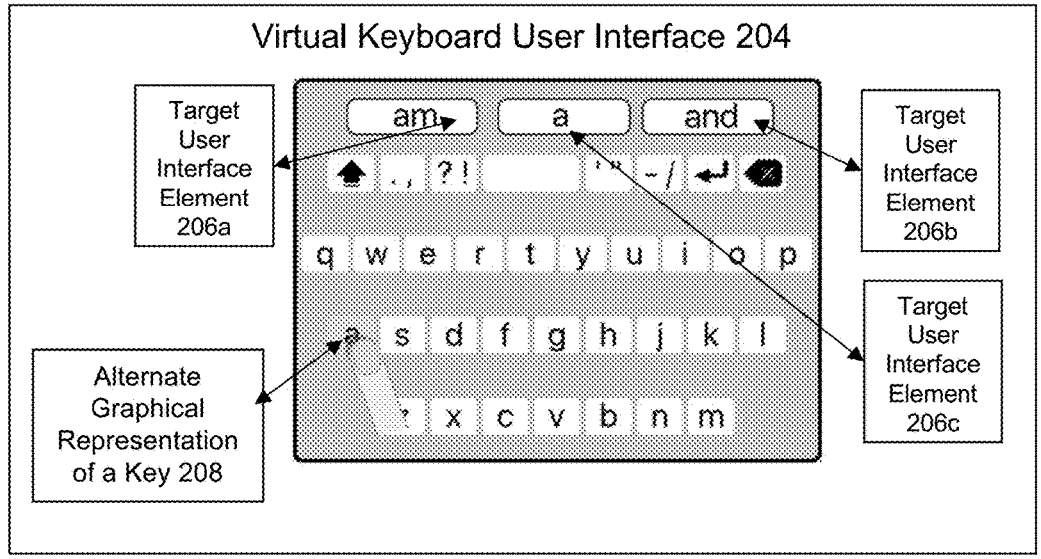
FIGS. 11A-11B are block diagrams showing that a single command sequence—dragging a finger from a key to a target—can insert a complete word.

FIG. 11A shows one embodiment, in which the user touches the key for the letter 'a', the virtual keyboard application 202 references an internal dictionary of word frequencies and displays three targets. One target 206c will insert the selected letter. The other targets 206a and 206b will insert a word beginning with the selected letter.

Figure 11B:
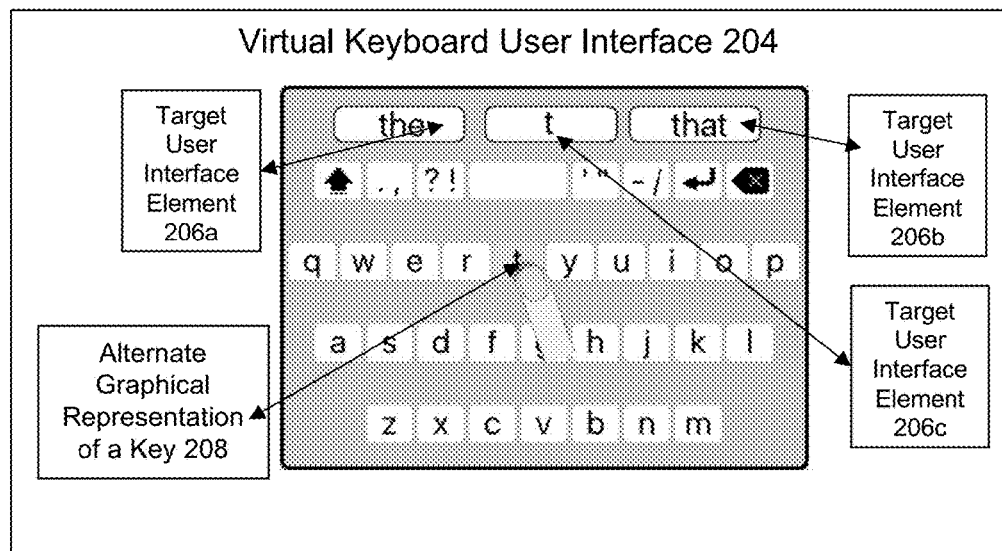

FIG. 11B shows an embodiment in which the user is selecting the letter 't'. The virtual keyboard application 202 offers targets for inserting the letter 't' 206c, the word 'the' 206a, or the word 'that' 206b.

Context-Dependent Word Completion

Referencing FIGS. 12A-12E, in some embodiments, the text offered for insertion by targets 206 can be determined by the context in which the virtual keyboard application 202 is being used. Letters that have already been inserted are combined with the letter on the key that has been selected to offer word completions.

Figure 12A:
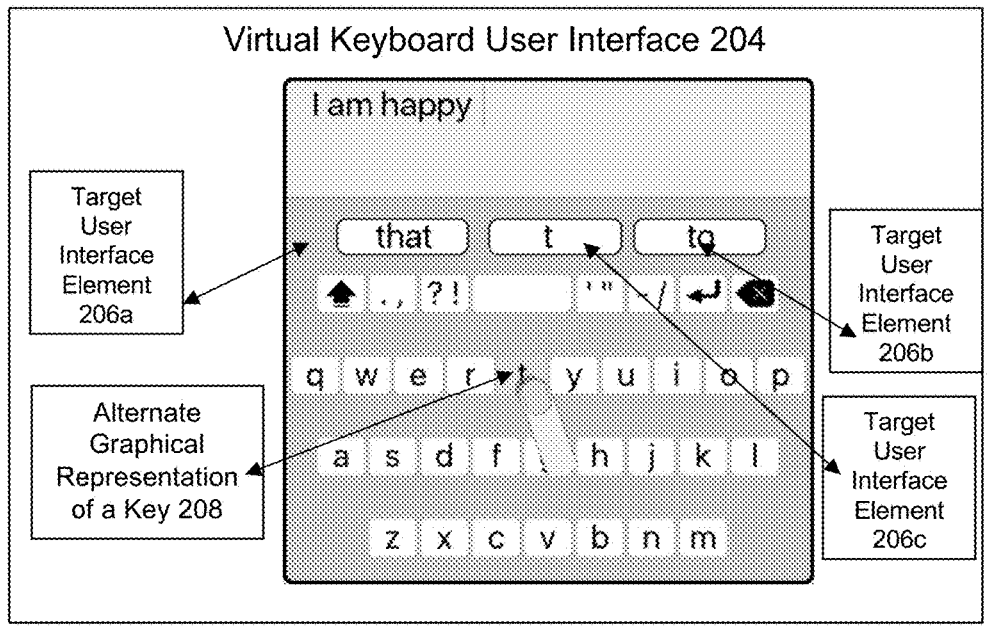
FIGS. 12A-12E are block diagrams showing an embodiment, where the text offered for insertion by targets can be determined by the virtual keyboard application context.
Figure 12B:
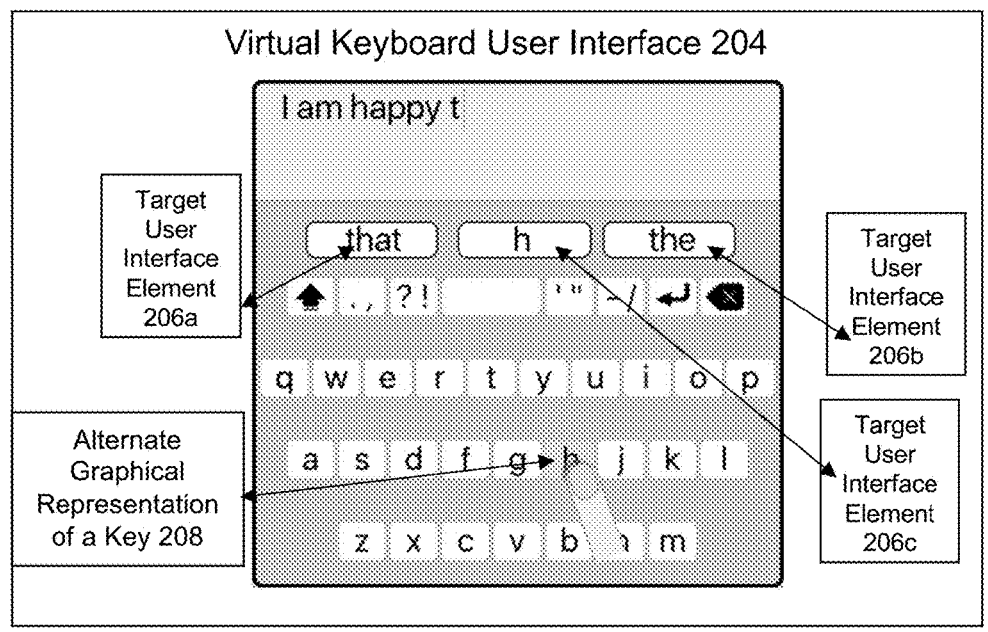

FIG. 12A shows the user typing a phrase. The user has selected the T key 208. The virtual keyboard application 202 displays targets that will allow the insertion of the letter 't' 26c or the insertion of two common words beginning with the letter T: 'that' 206a and 'to' 206b. FIG. 12B shows the display after the user has entered the letter 't' and has now selected the letter 'h'. The 't' that is already present in the text area provides context. The virtual keyboard application 202 combines this context (the letter T) with the letter on the key 208 that the user has selected (the letter 'h'). The virtual keyboard application 202 displays a target that will insert the letter 'h' 206c, as well as targets 206a and 206b that will insert complete words that begin with the letters 'th'.

Figure 12C:
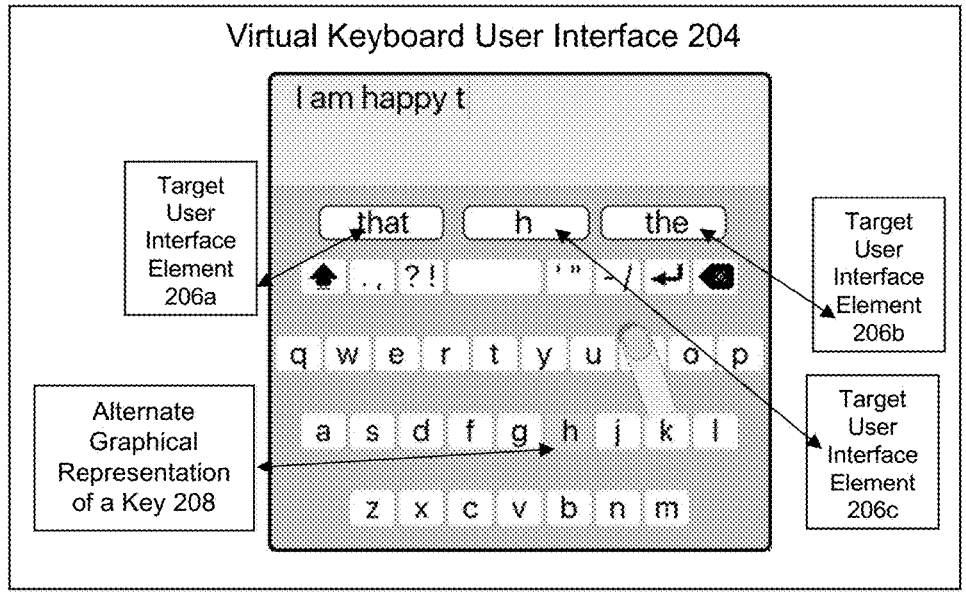
Figure 12D:
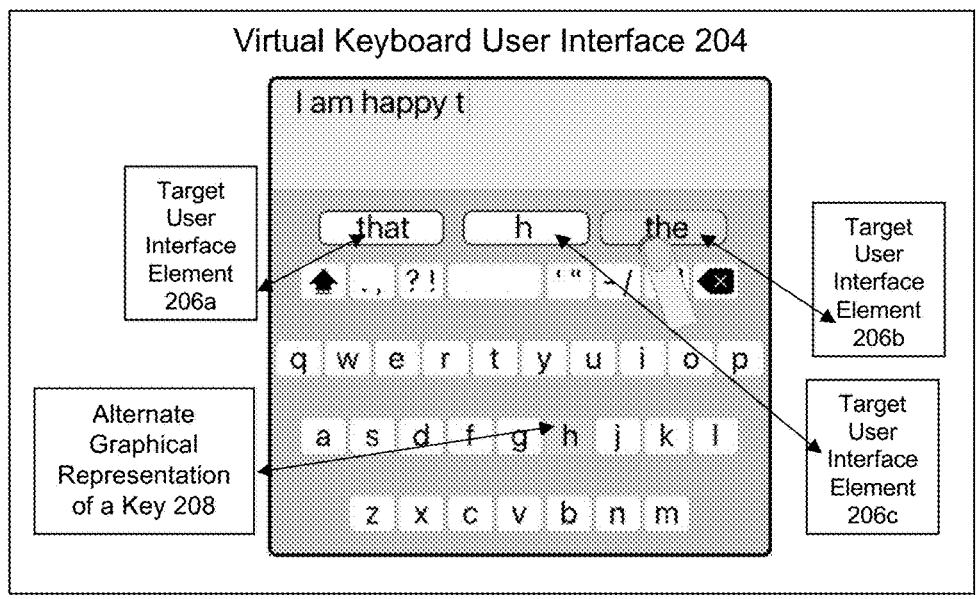
Figure 12E:
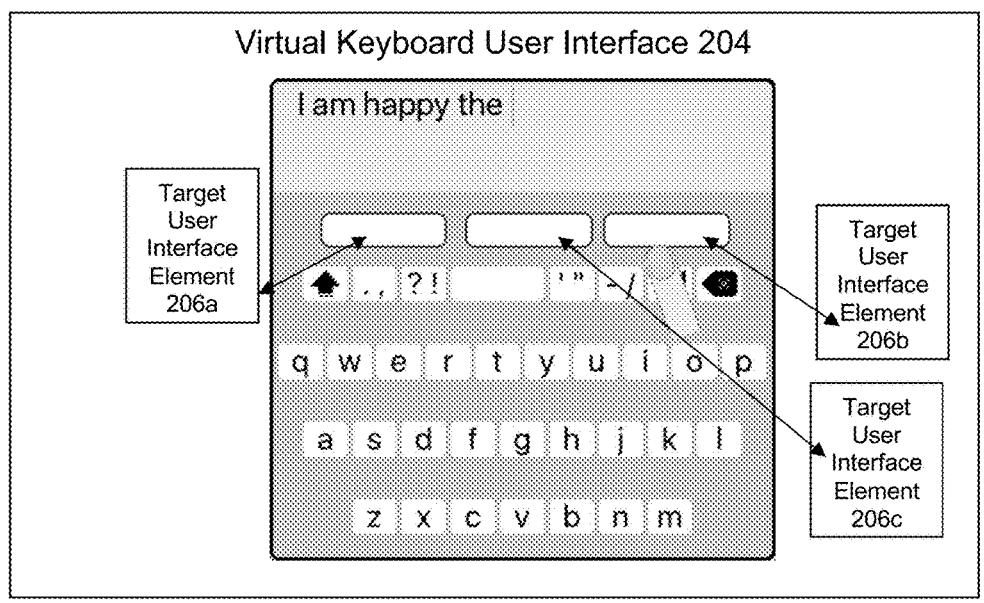

FIG. 12C shows the user dragging their finger towards the desired target. In FIG. 12D the finger is above a target 206b, and that target highlights. In FIG. 12E the user lifts their finger while it is on a target, and the value of that target is inserted in the text area. Note that the 't' was already in the text area, so in this case that means inserting the letters 'he' to complete the word. Note also that a space is inserted as well, preparing text entry for the next word.

Context-Dependent Word Selection

Referencing FIGS. 13A-13E, in some embodiments the values offered for insertion by targets 206 can be determined by the context in which the virtual keyboard application 202 is being used. For example, a database of common phrases can be used (e.g., by the completion generator 212) to display the most likely word to complete a phrase. Alternatively, grammatical analysis can be used (e.g., by the completion generator 212) to predict what part of speech the next word will be, and provide targets with those values.

Figure 13A:
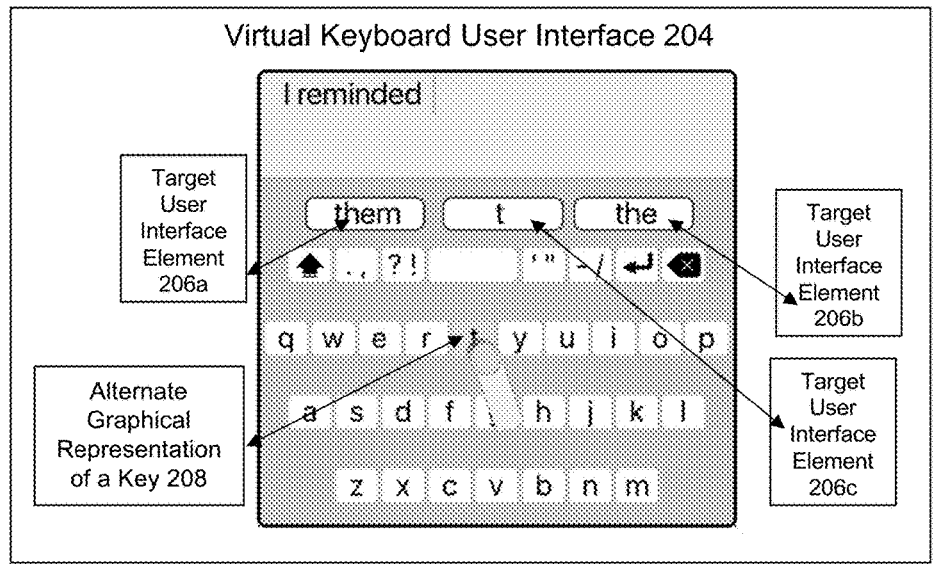
FIGS. 13A-13E are block diagrams showing that in some embodiments, the values offered for insertion by Targets can be determined by the virtual keyboard application context.
Figure 13B:
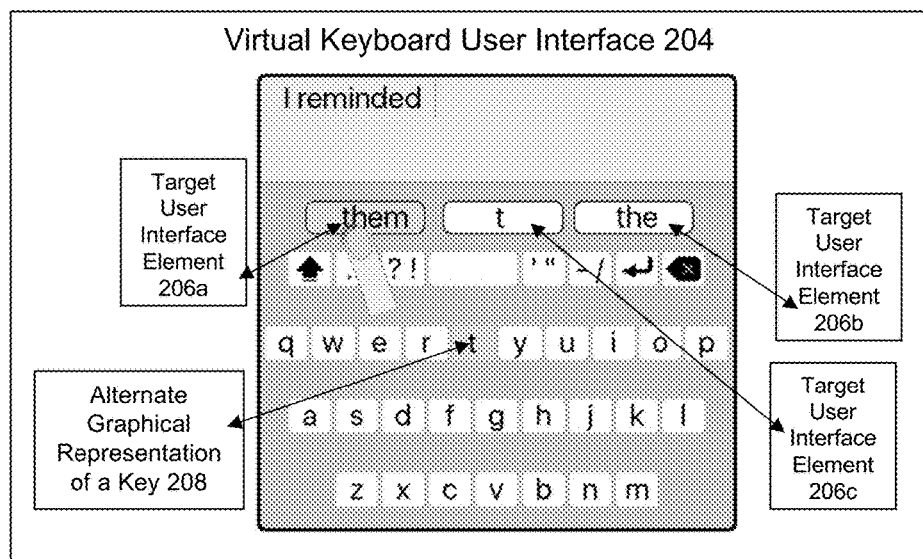
Figure 13C:
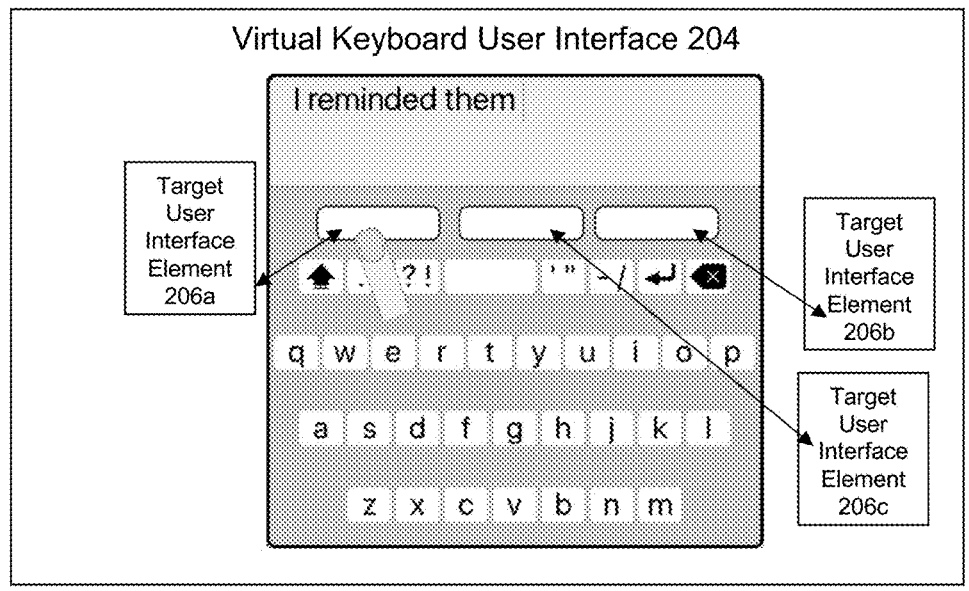
Figure 13D:
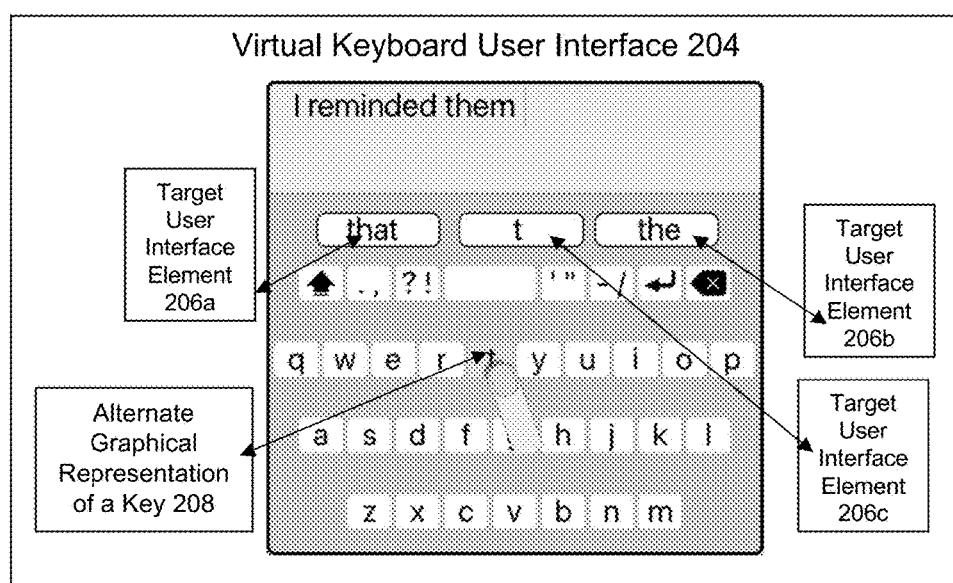
Figure 13E:
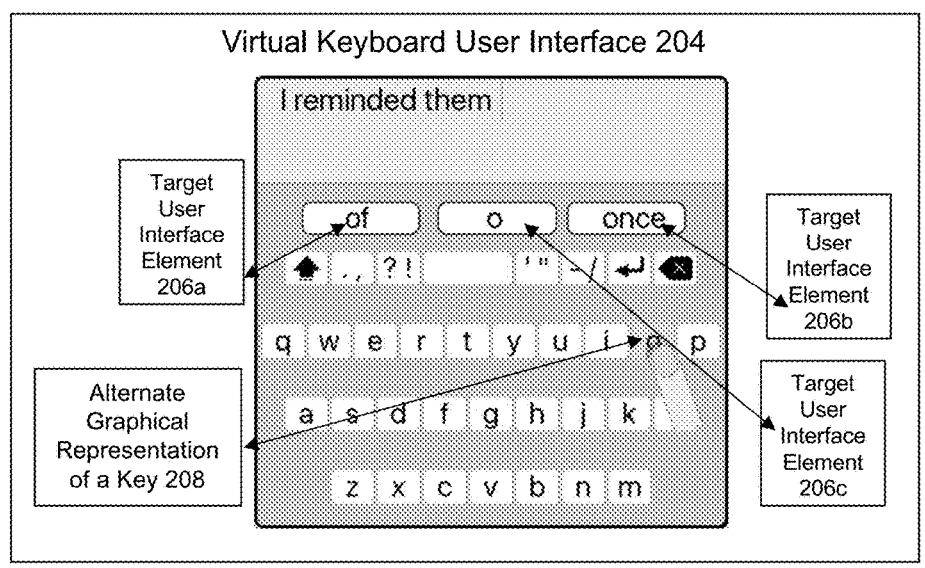

FIG. 13A shows the user typing a phrase that begins with the words "I reminded". When the user selects the letter 't', the targets 206c, 206a, and 206b offer the letter 't' as well as the two words beginning with the letter 't' that it determines are most likely to follow the phrase "I reminded". FIG. 13B shows the user moving their finger to the target 206a displaying the word "them". FIG. 13C shows that the user has lifted their finger, inserting the word "them" into the text area. FIG. 13D shows the text area now contains the words "I reminded them". This is the new context. When the user selects the letter 't', the virtual keyboard application 202 offers word completions (e.g., provided by the completion generator 212) that begin with the letter 't' and that are likely to occur after the phrase "I reminded them". FIG. 13E shows that if the user selects the letter 'o' rather than T, the virtual keyboard application 202 offers word completions (e.g., provided by the completion generator 212) that begin with the letter 'o' and are likely to follow the phrase "I reminded them".

Modifying Existing Text

Referencing FIGS. 14A-14D, in some embodiments a command sequence may modify text that is already displayed.

Figure 14A:
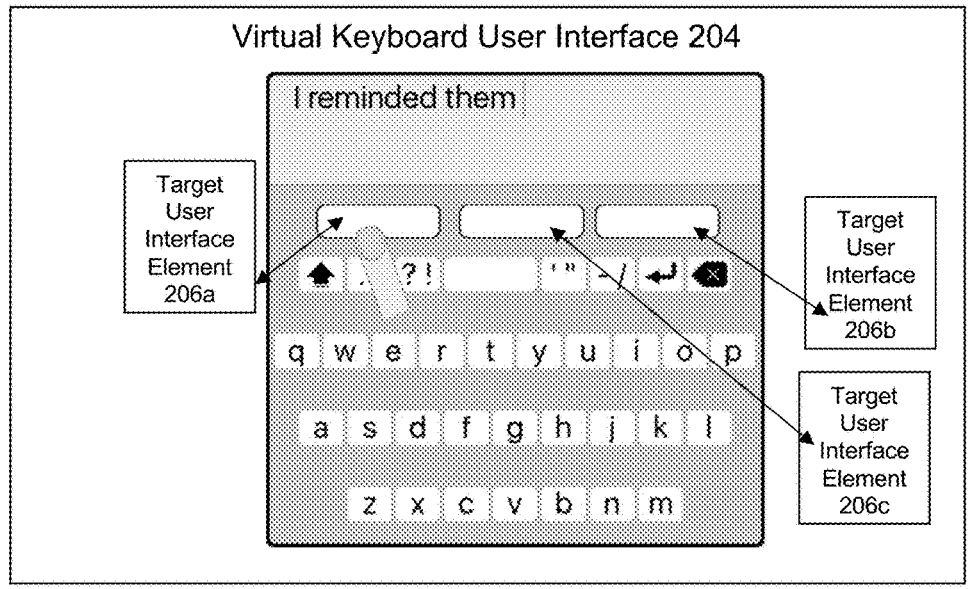
FIGS. 14A-14D are block diagrams showing that in addition to inserting text, a command sequence may modify text that is already displayed.
Figure 14B:
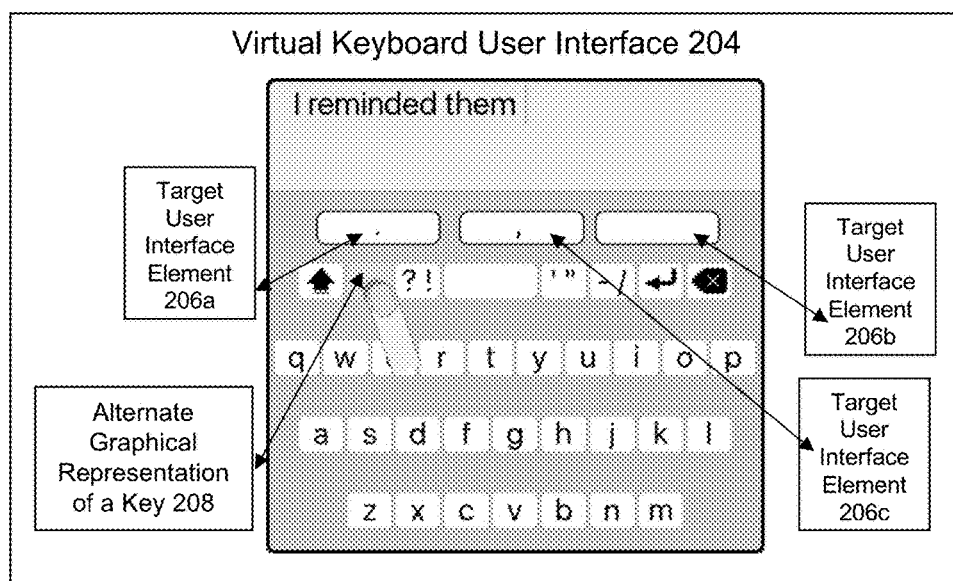
Figure 14C:
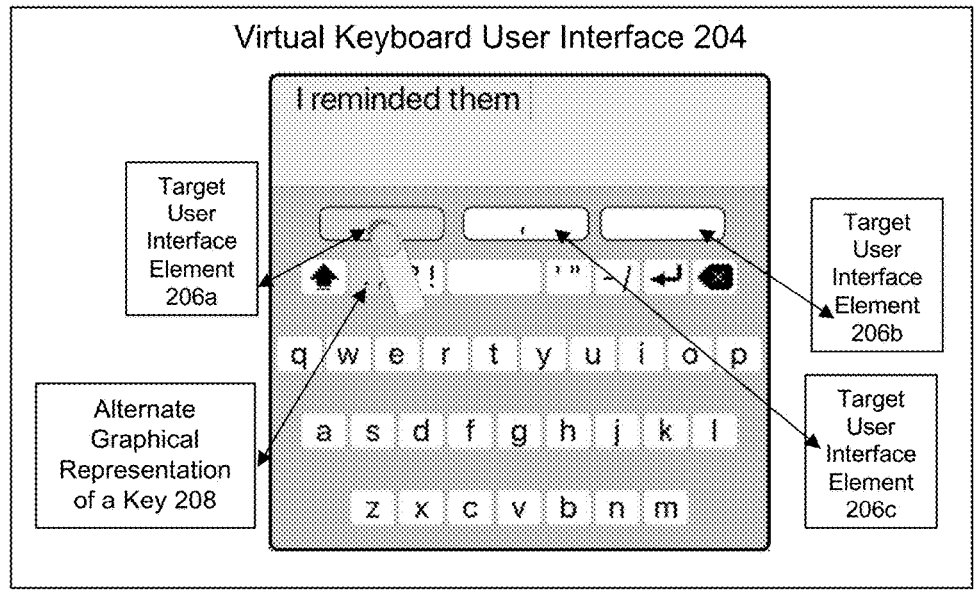
Figure 14D:
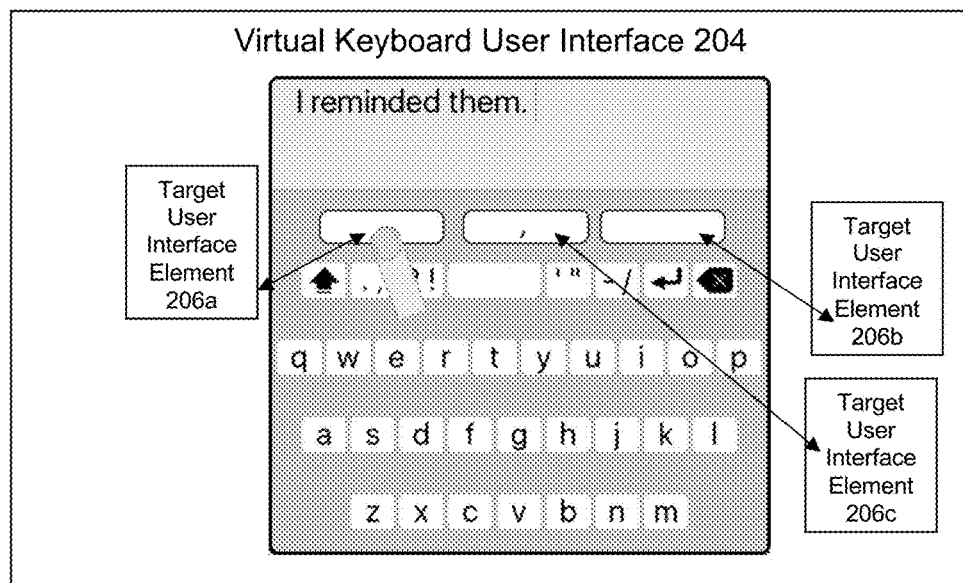

FIG. 14A shows the user has just typed "I reminded them". Because the user used word completion to enter the word "them" the virtual keyboard application 202 inserted a space after the word, to prepare for typing the next word. FIG. 14B shows the user wants to end the sentence by typing a period. The user selects the key 208 that has both a period and a comma on it. The target on the left 206a shows the period, and the middle target 206c shows the comma. The target on the right 206b is unused. FIG. 14C shows the user moves their finger to the period target 206a. FIG. 14D shows the user has lifted their finger to insert the period. Before inserting the period, the virtual keyboard application 202 deletes the space it had previously inserted, so the period appears immediately after the word "them". It then inserts a space after the period, to prepare for typing the next sentence.

Inflections

Referencing FIGS. 15A-15I, keys and targets may be used to change the inflections of words that were previously entered.

Figure 15A:
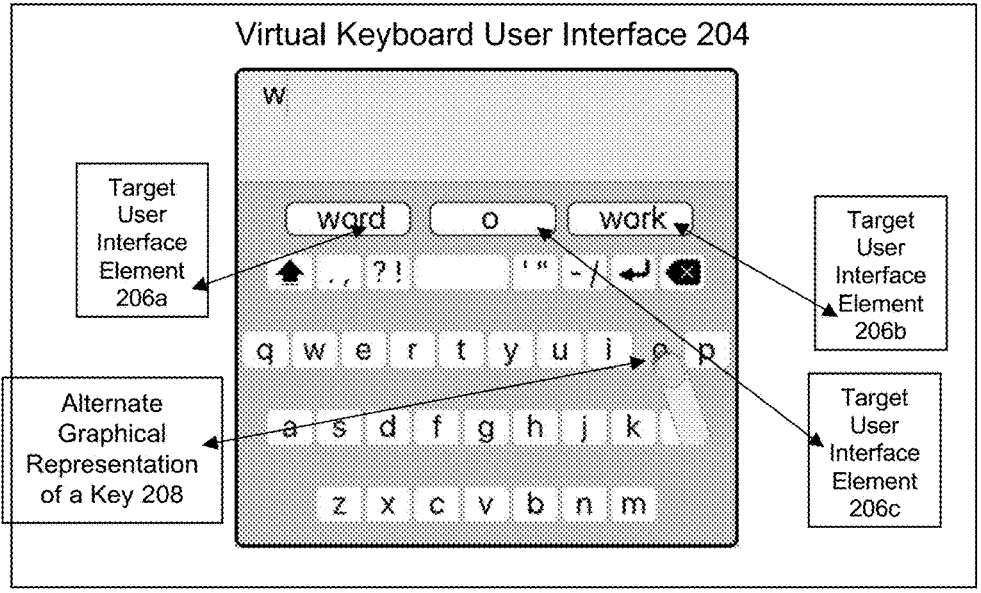
FIGS. 15A-15I are block diagrams showing that keys and targets may be used to change the inflections of words that were previously entered.
Figure 15B:
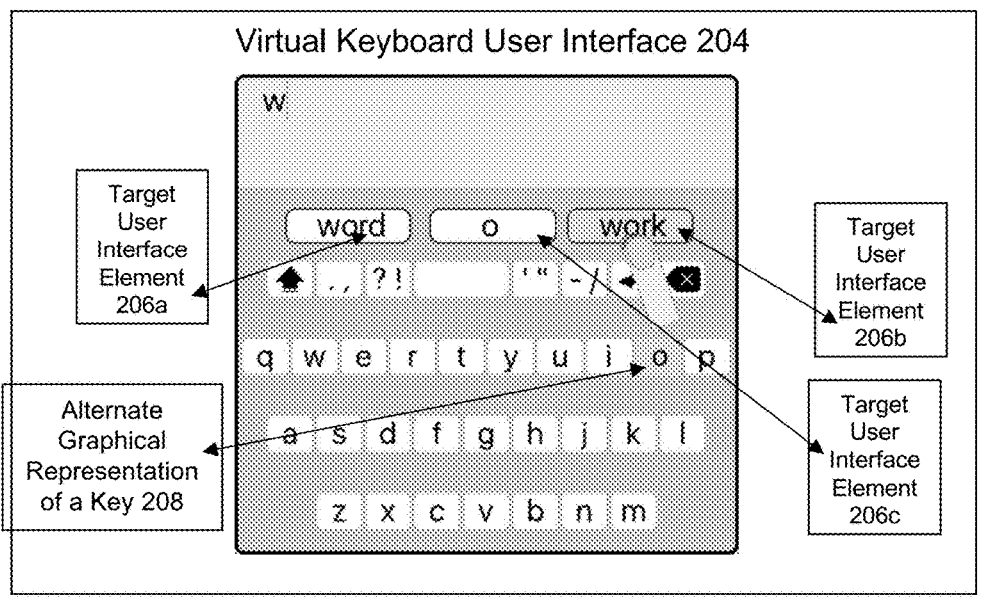
Figure 15C:
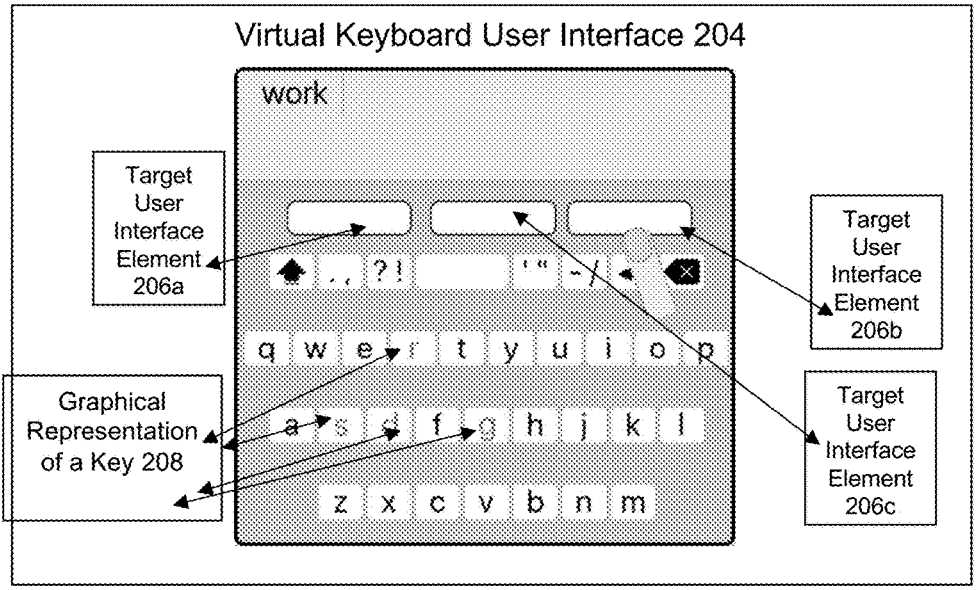
Figure 15D:
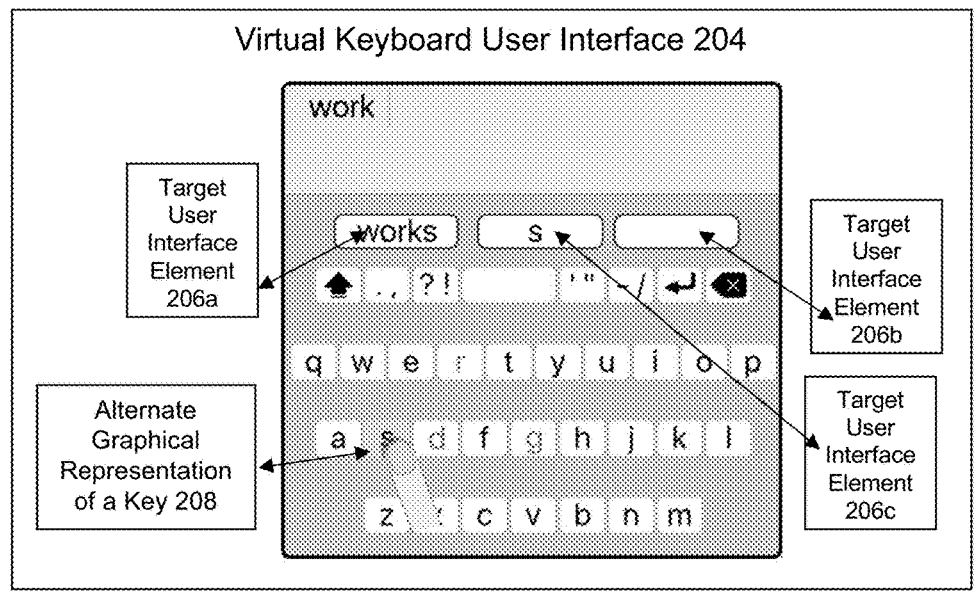
Figure 15E:
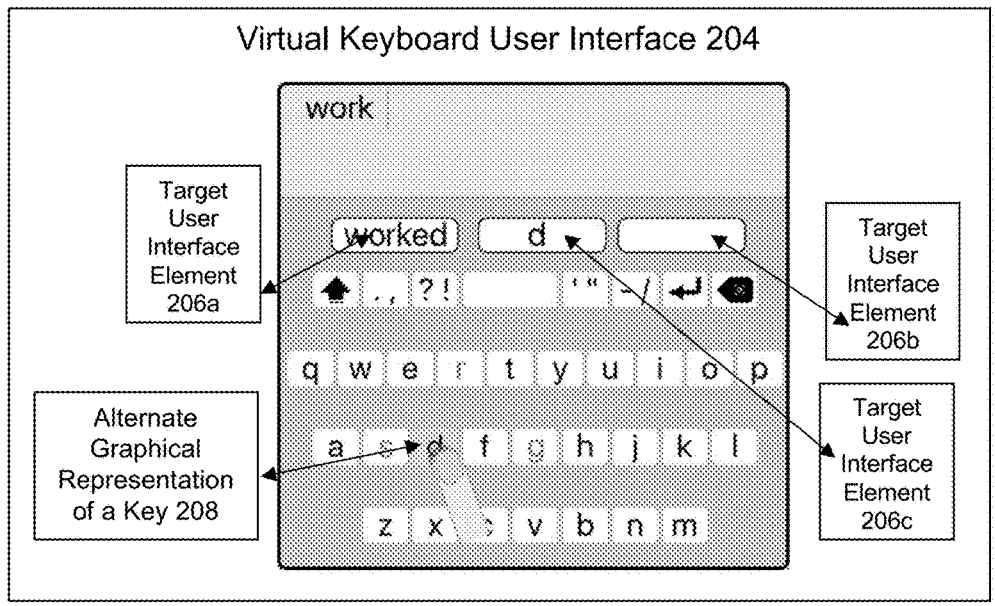
Figure 15F:
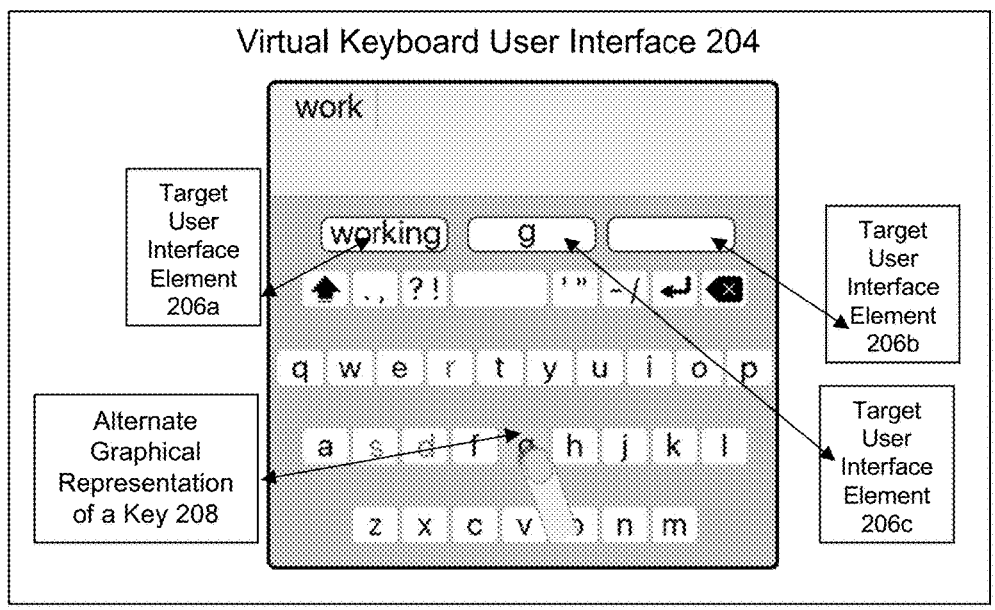
Figure 15G:
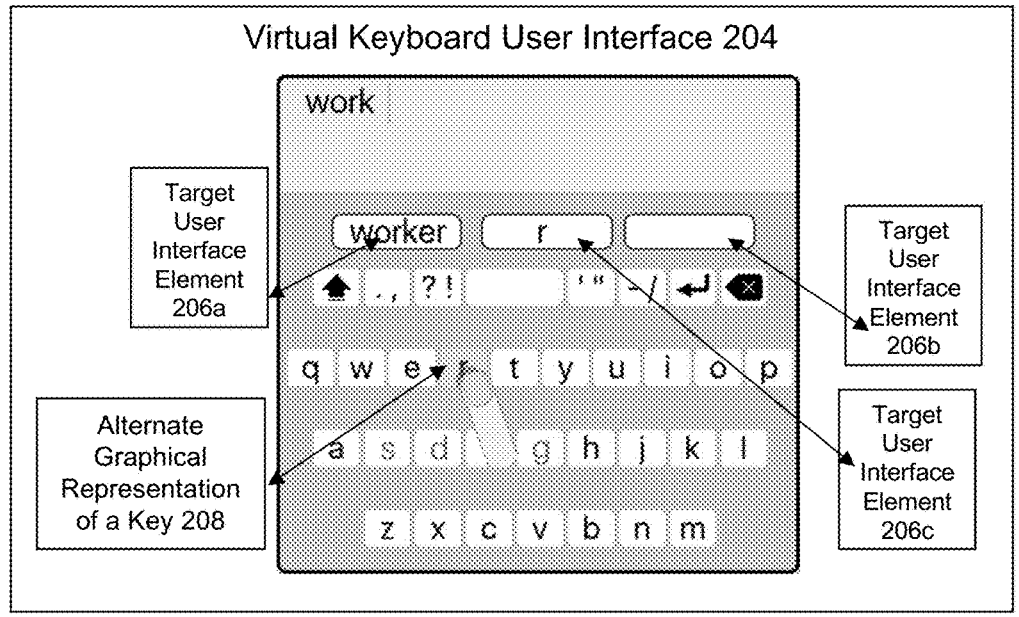
Figure 15H:
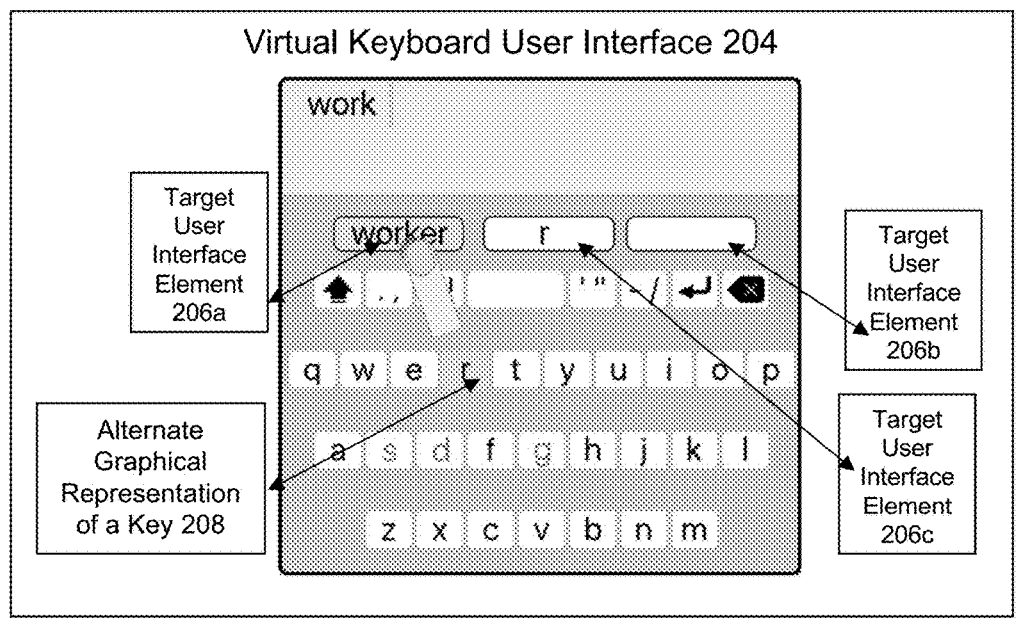
Figure 15I:
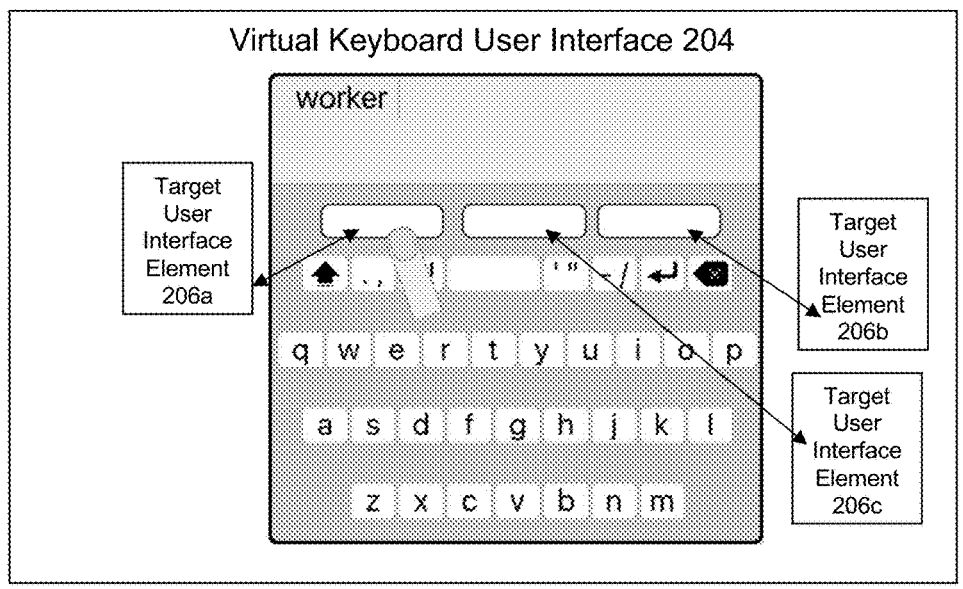

FIG. 15A shows that after entering the letter "w" the user selects the "o" key 208. the virtual keyboard application 202 provides targets 206a, 206b, 206c to insert the letter "o" or the word "work" or the word "word". In FIG. 15B the user chooses the target 206b for the word "work". FIG. 15C shows that the word "work" is inserted. The keyboard updates to show that inflections for the word "work" are available from the several keys 208. FIG. 15D shows that if the user selects the "s" key 208, they are offered two targets 206a and 206c. The middle target 206c will insert the letter "s" (and begin a new word). The lefthand target 206a will replace the previously inserted word "work" with "works". Similarly, as shown in FIGS. 15E-15G the "d", "g", and "r" keys allow users to insert those letters, or replace the word "work" with "worked", "working", or "worker", respectively. FIG. 15H shows the user has moved their finger to the left-hand target 206a. FIG. 15I shows that the user has lifted their finger. The word "work" is replaced with the word "worker" and the keyboard is ready for the user to type the next word.

Targets Positioned Dynamically

Referencing FIGS. 16A-16H, targets may be displayed in a location relative to the selected key rather than in fixed locations. This reduces the distance that the finger has to travel to reach the target, speeding input. The targets are only displayed when a key is selected, and they may be displayed over other keys. Thus they do not take up space on the screen, and allow more efficient use of the space available.

Figure 16A:
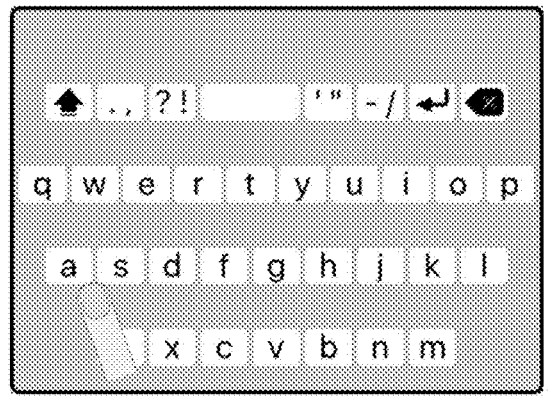
FIGS. 16A-16H are block diagrams showing that targets may be displayed in a location relative to the selected key rather than in fixed locations.
Figure 16B:
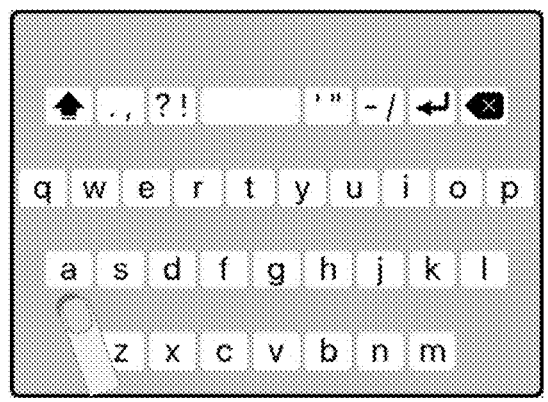
Figure 16C:
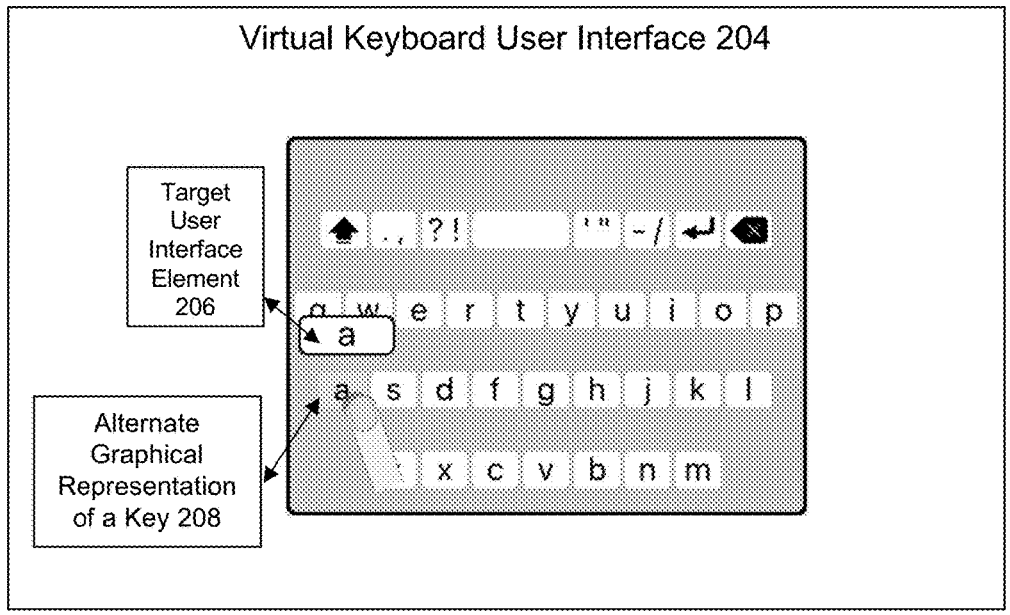
Figure 16D:
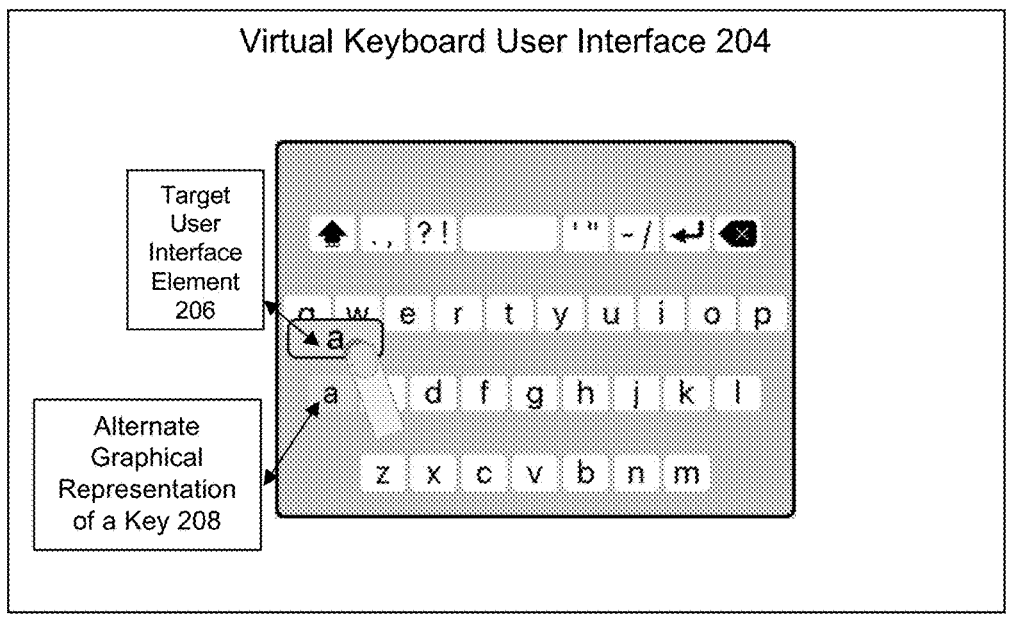
Figure 16E:
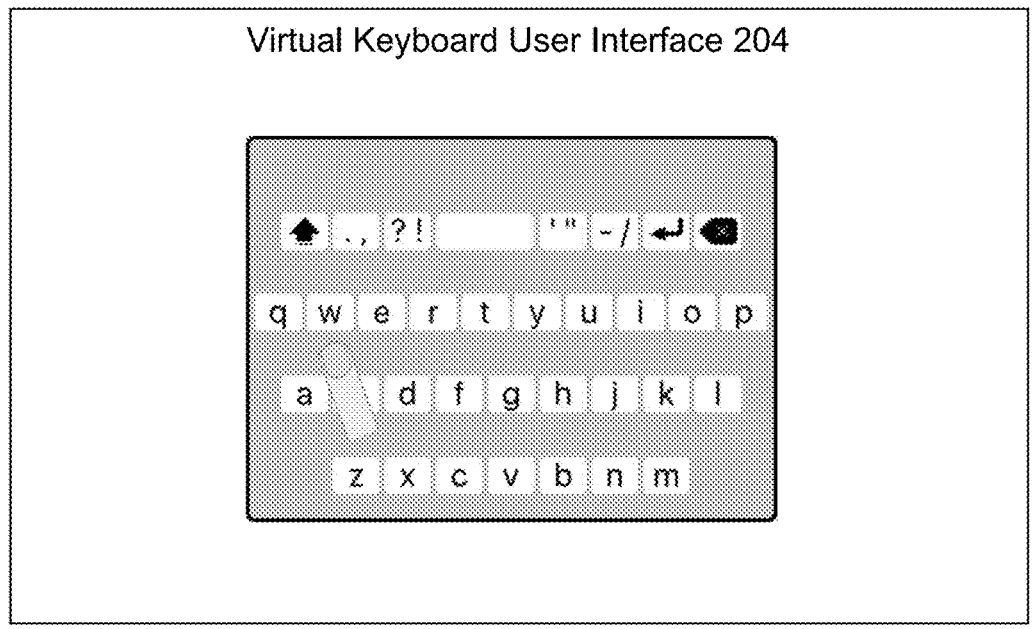
Figure 16F:
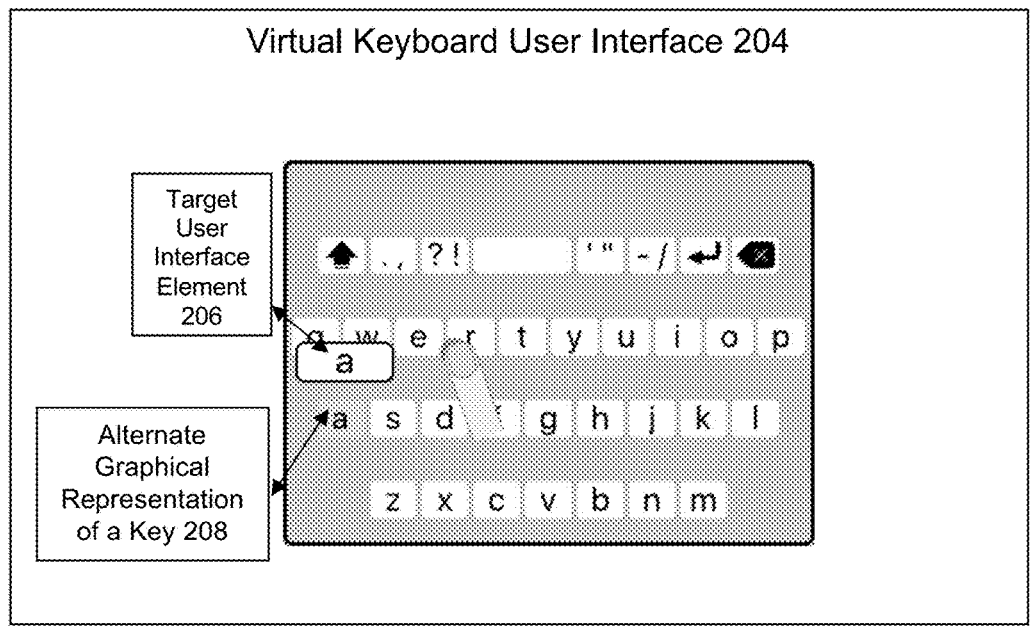
Figure 16G:
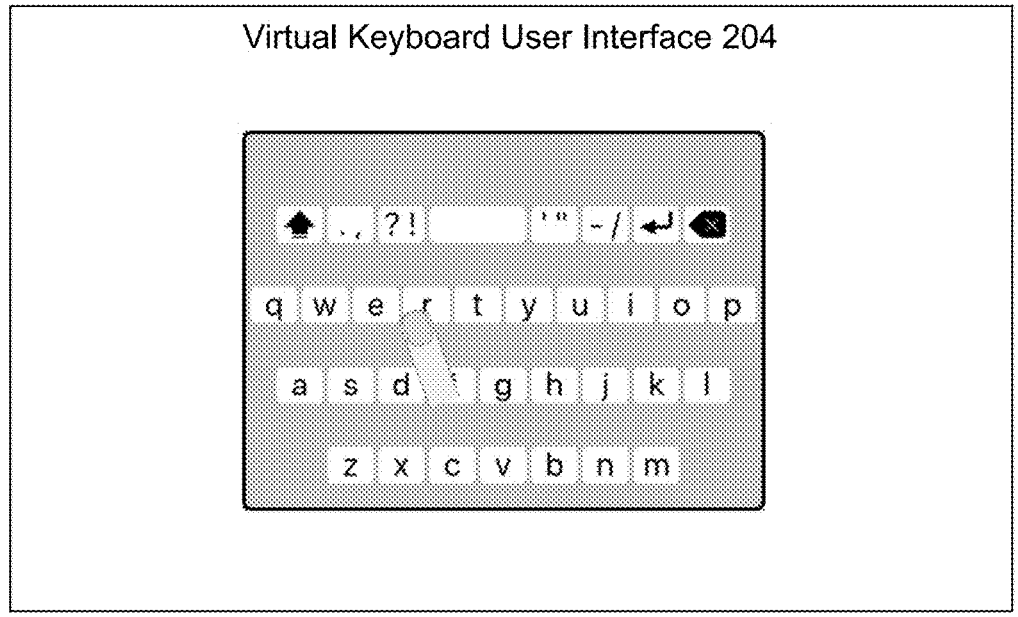
Figure 16H:
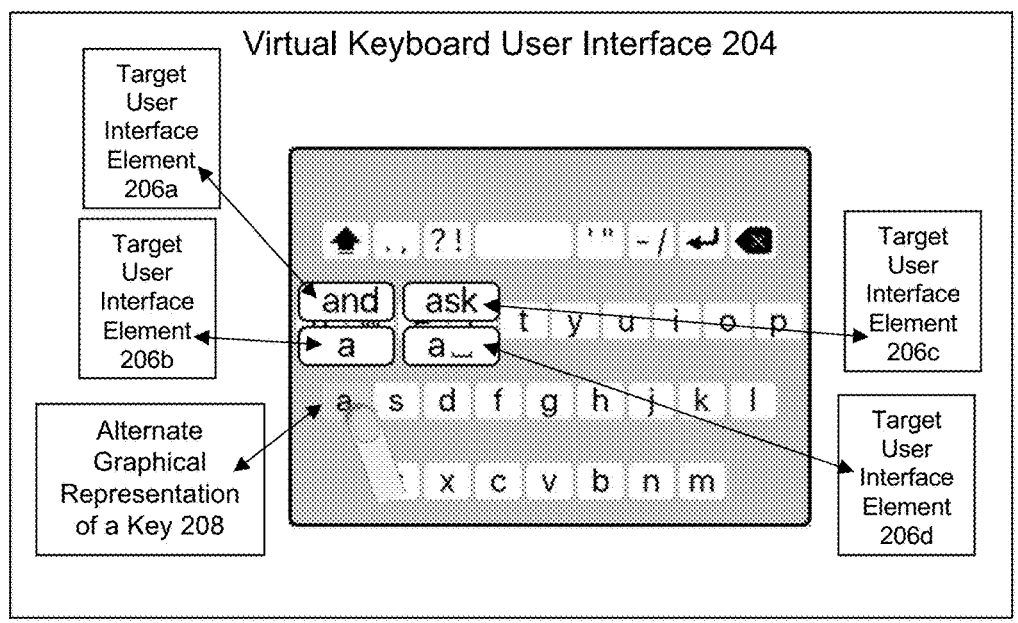

FIG. 16A shows the user with their finger above the screen, not yet touching the screen. Note that there are no targets visible. FIG. 16B shows the user touching the screen, but not yet touching a key. There are still no targets visible. FIG. 16C shows the user touching a key 208. The target 206 appears near the key. In FIG. 16D the user moves their finger to the target 206. Because the target is shown close to the selected key 208, the user does not need to move their finger far. In FIG. 16E the user lifts their finger. Because their finger was on the target 206 when they lifted it, the value of that target (in this case the letter 'a') is inserted. FIG. 16F shows an alternate outcome; the user can move their finger away from the target 206. If the user lifts their finger while it is not on a target (FIG. 16G), the command sequence is aborted and no text is inserted. FIG. 16H shows that just as it is possible to place one target near the selected key, it is also possible to place multiple targets 206a-206d near the selected key.

Synonyms, Translation, and Emoji

The virtual keyboard application 202 is not restricted to offering targets that extend the literal text that the user is typing. While the simpler embodiments of the virtual keyboard application 202 are based purely on letters, words, and punctuation, the virtual keyboard application 202 can go further and offer targets that assist the user in expressing their meaning in a variety of ways.

For example, in some embodiments, the virtual keyboard application 202 can offer synonyms of the word a user may be typing. The user can choose to use one of the synonyms rather than their original word if they believe that will improve their writing.

Figure 17A:
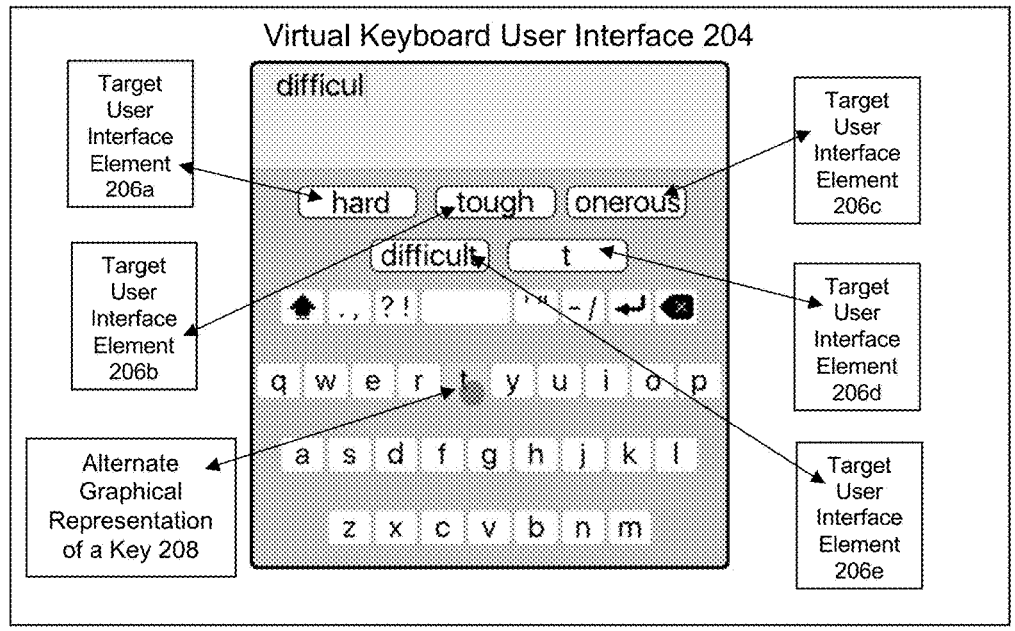
FIGS. 17A-17C are block diagrams showing that the virtual keyboard application can offer synonyms of the word a user may be typing.
Figure 17B:
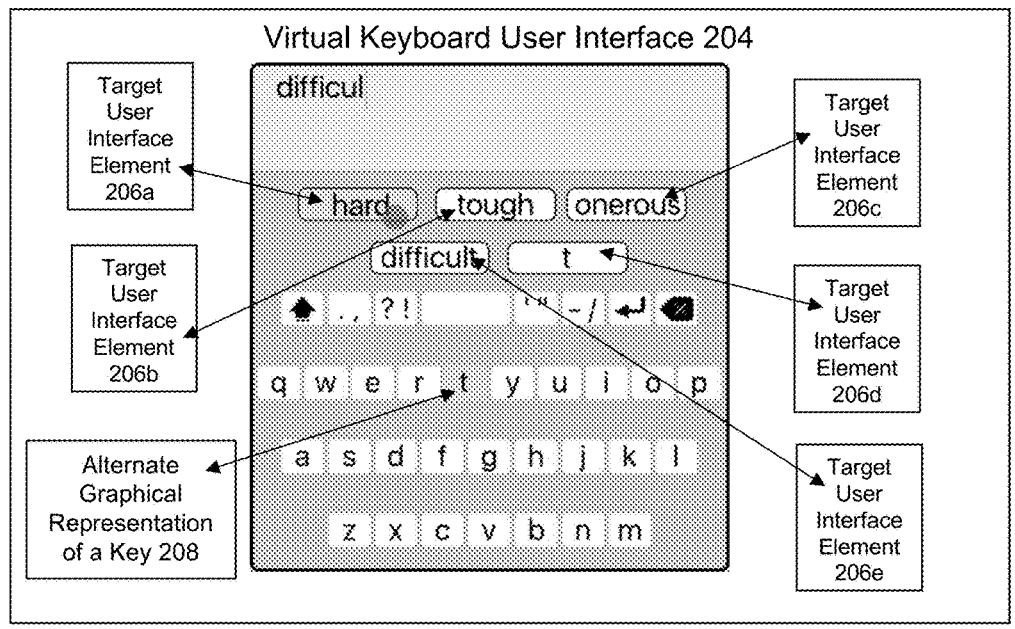
Figure 17C:
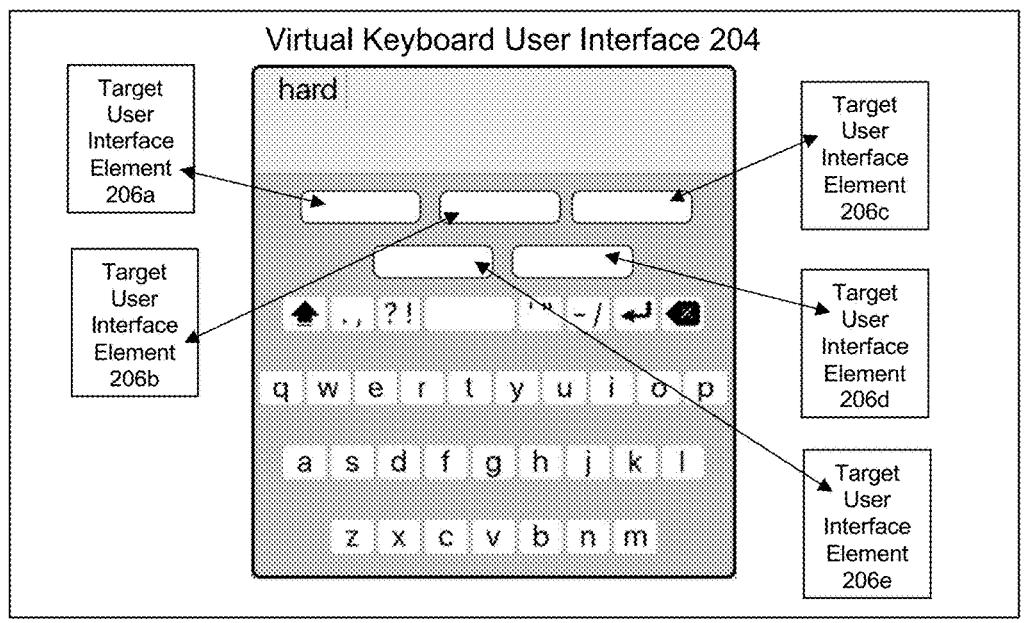

FIG. 17A shows that the user has typed the letters "difficul" and then the touch point is placed on the "t" key 208, activating it. The virtual keyboard application 202 offers targets for "t" 206d and "difficult" 206e. Additionally, it offers three targets 206a, 206b, 206c with synonyms of "difficult". In FIG. 17B the user has moved the touch point to the target "hard" 206a, highlighting it. In FIG. 17C the user has released the touch point, activating the target. The partial word "difficul" is replaced with the complete word "hard" followed by a space.

The virtual keyboard application 202 can offer targets to insert a word in a language different from the language in which it was written.

Figure 18A:
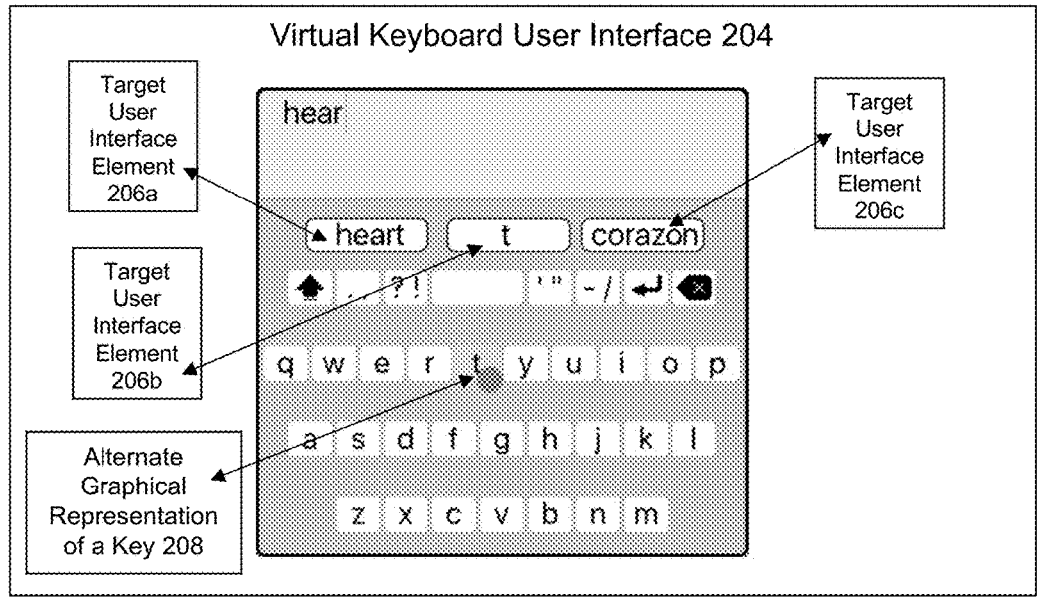
FIGS. 18A-18C are block diagrams showing that the virtual keyboard application can offer targets to insert a word in a language different from the language in which it was written.
Figure 18B:
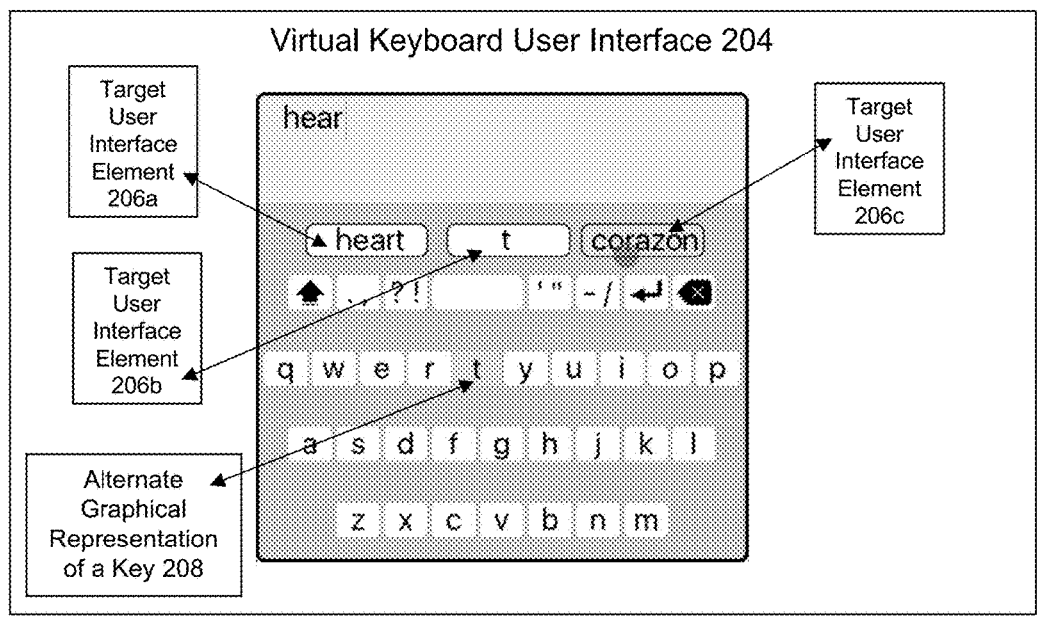
Figure 18C:
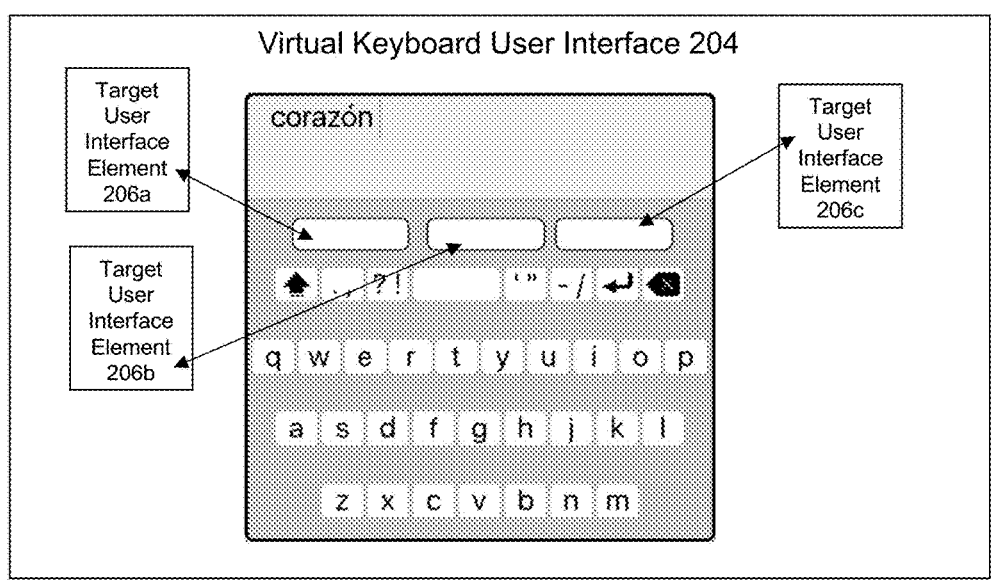

FIG. 18A shows that following the letters "hear" the touch point is placed on the "t" key 208, activating it. The virtual keyboard application 202 offers targets for the letter "t" 206b and for two words: the English word "heart" 206a and the Spanish translation, "corazon" 206c. FIG. 18B shows the user has moved the touch point to the target "corazon" 206c, highlighting it. In FIG. 18C the user has released the touch point, activating the target. The partial word "hear" is replaced with the complete word "corazon" followed by a space.

The virtual keyboard application 202 can offer to insert an emoji in place of a word.

Figure 19A:
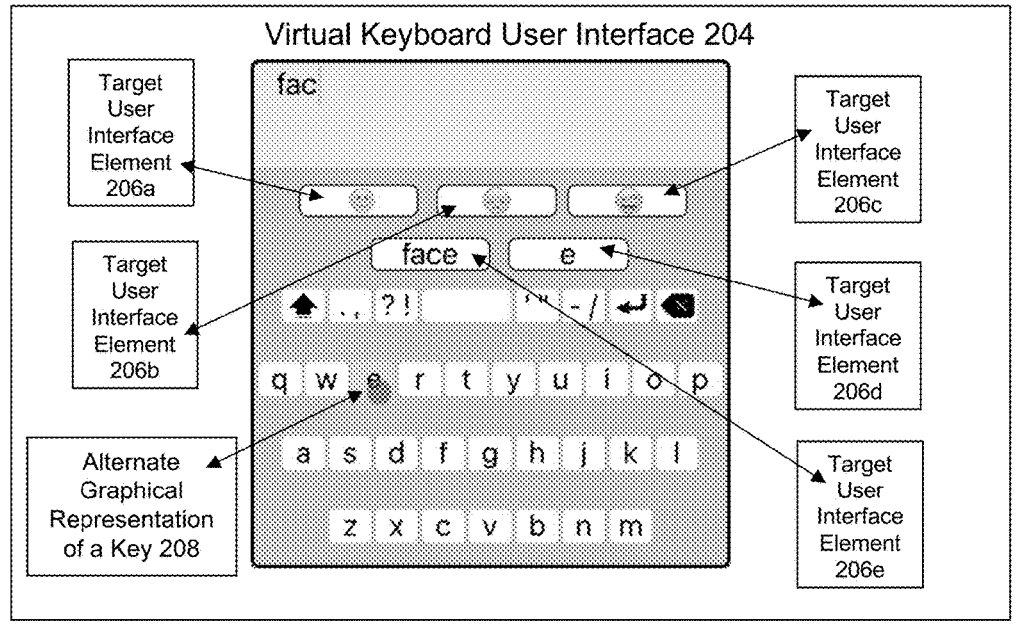
FIGS. 19A-19C are block diagrams showing that the virtual keyboard application can offer to insert an emoji in place of a word.
Figure 19B:
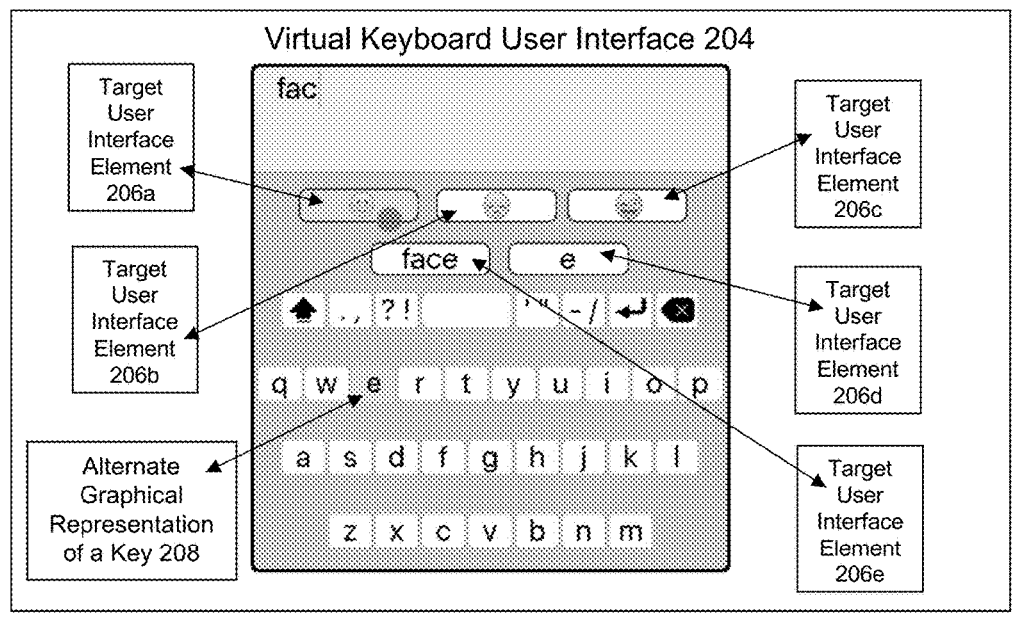
Figure 19C:
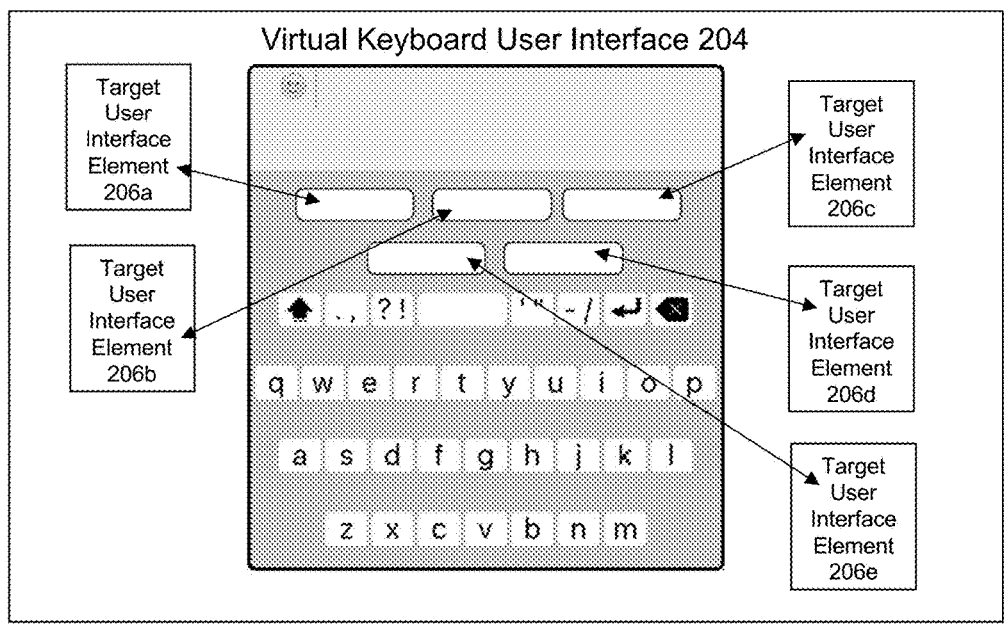

In FIG. 19A, following the letters "fac" the touch point is placed on the "e" key 208, activating it. The virtual keyboard application 202 offers targets for the letter "e" 206d, for the word "face" 206e and for three face emoji 206a, 206b, 206c. In FIG. 19B the user has moved the touch point to the target 206a with the smiling emoji, highlighting it. In FIG. 19C the user has released the touch point, activating the target. The partial word "fac" is replaced with the smiling face emoji.

Similar functionality can be used to enter non-alphabetic text such as Chinese ideograms. The keys are used to enter the transliteration of the word, and the targets offer ideograms (or analogous characters in the language) that match the transliteration. The user can continue to enter details in the Romanization system until the desired word in the language's writing system is provided in a target.

In some embodiments, the user is in the process of writing a word when the virtual keyboard application 202 offers alternatives that can be inserted in place of the partial word. The virtual keyboard application 202 can also be used to replace a word that has already been inserted with an alternate. For example, a virtual keyboard application 202 could have a "Synonym" key that could be used to replace a word with a synonym. This key could operate on the word immediately preceding the insertion point, or alternatively it could operate on the selection.

Figure 20A:
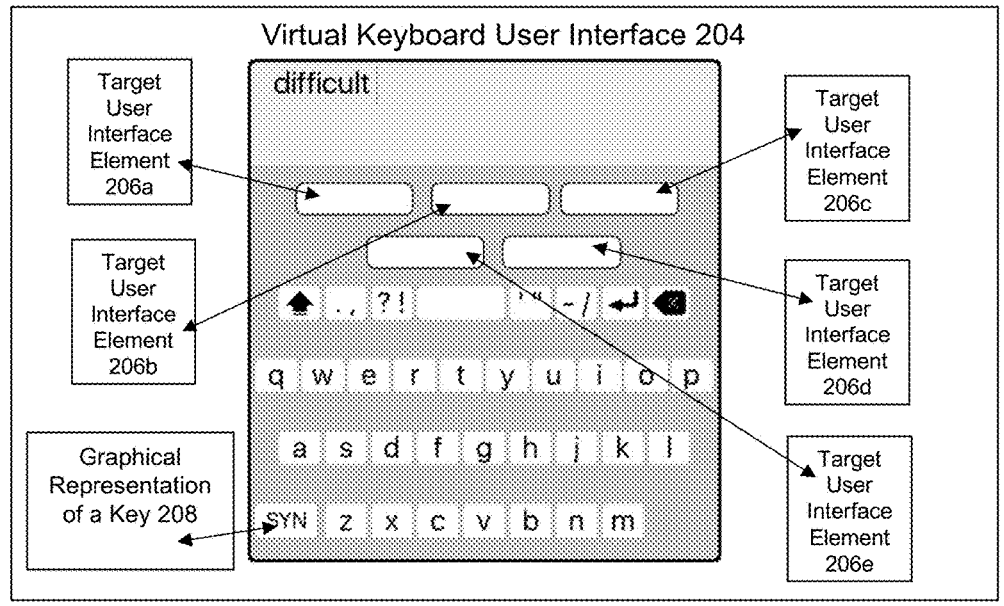
FIGS. 20A-20D are block diagrams showing that the virtual keyboard application can be used to replace a word that has already been inserted with an alternate.
Figure 20B:
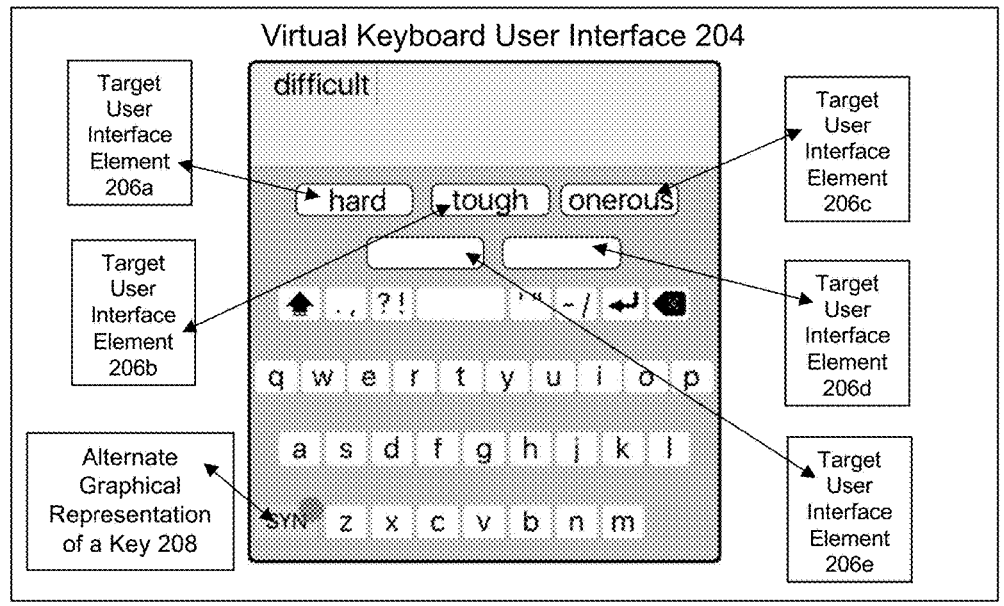
Figure 20C:
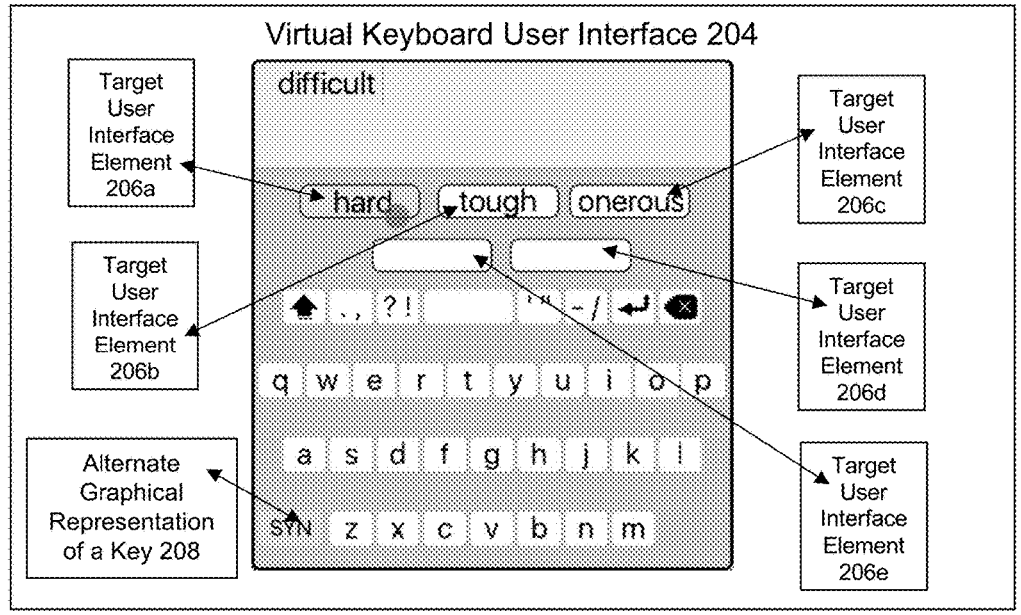
Figure 20D:
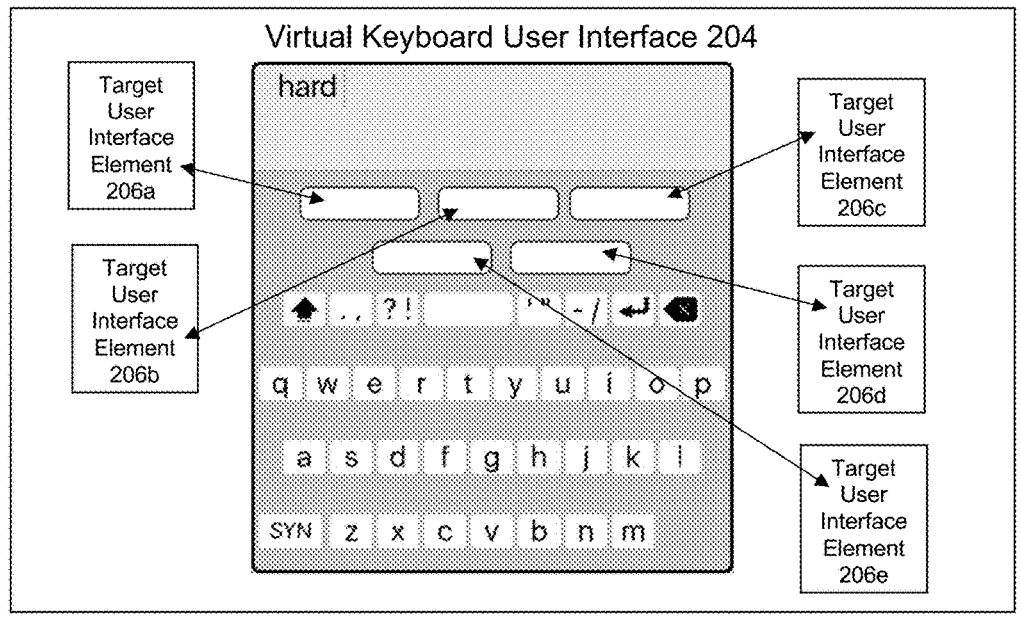

FIG. 20A shows the virtual keyboard application 202 with a "Synonym" key 208 in the lower-left corner. The word immediately preceding the insertion point is "difficult". In FIG. 20B the user touches the synonym key 208. The virtual keyboard application 202 offers three targets 206a 206b 206c with synonyms for the word "difficult". In FIG. 20C the user has moved the touch point to the target containing the word "hard" 206a. The target 206a highlights. In FIG. 20D the user has released the touch point. The virtual keyboard application 202 replaces the word "difficult" with the word "hard".

Similar functionality could be created to operate on a selected word rather than on the word preceding the insertion point.

Similar functionality could also be implemented to support translation, emojification, etc.

Targets may offer users the ability to insert complete phrases.

For example, the user could specify phrases to be associated with letters of the alphabet. The virtual keyboard application 202 would then offer these phrases when the user selects that letter at the start of a new word.

Figure 21B:
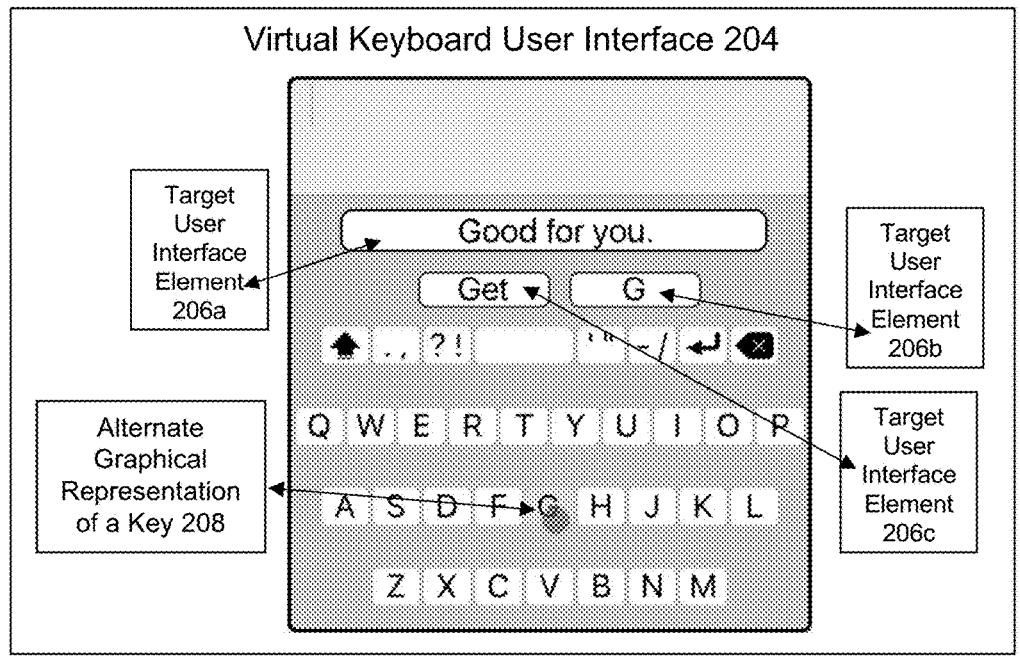
Figure 21C:
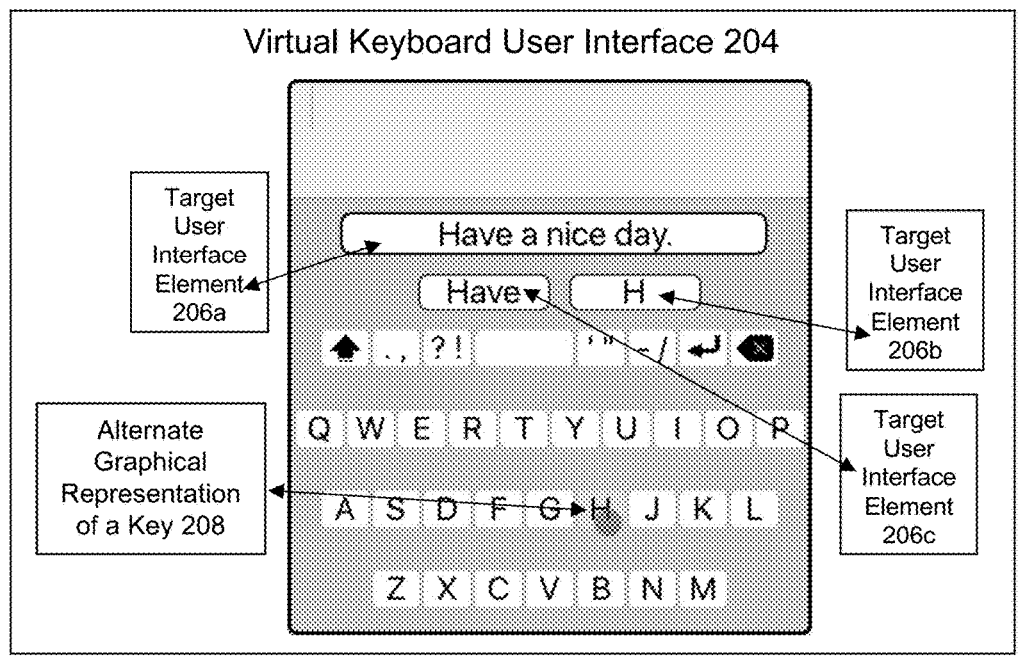
Figure 21D:
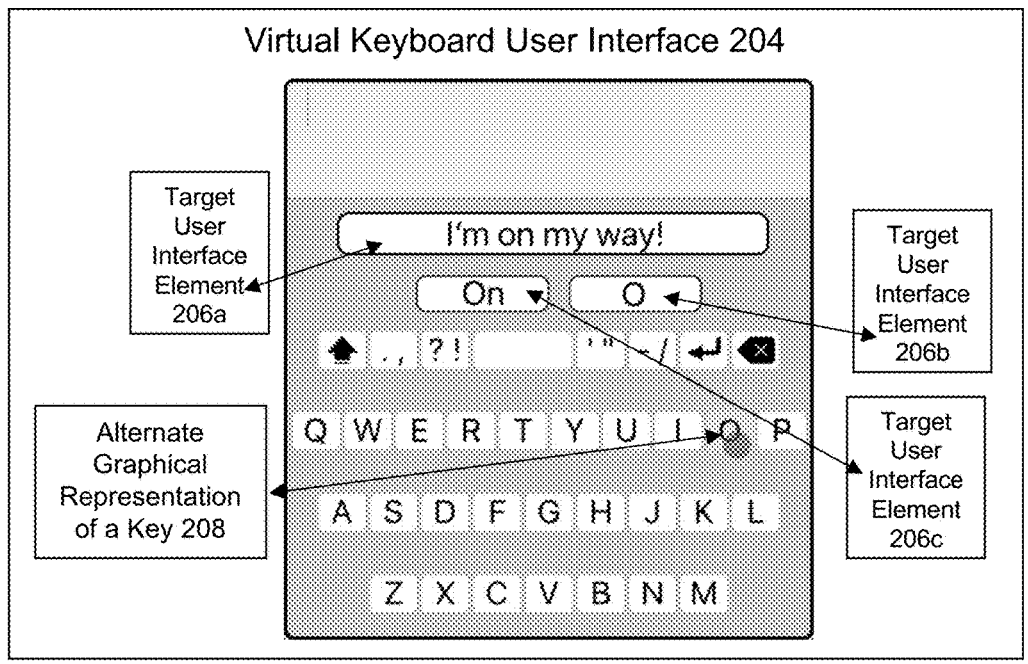
Figure 21E:
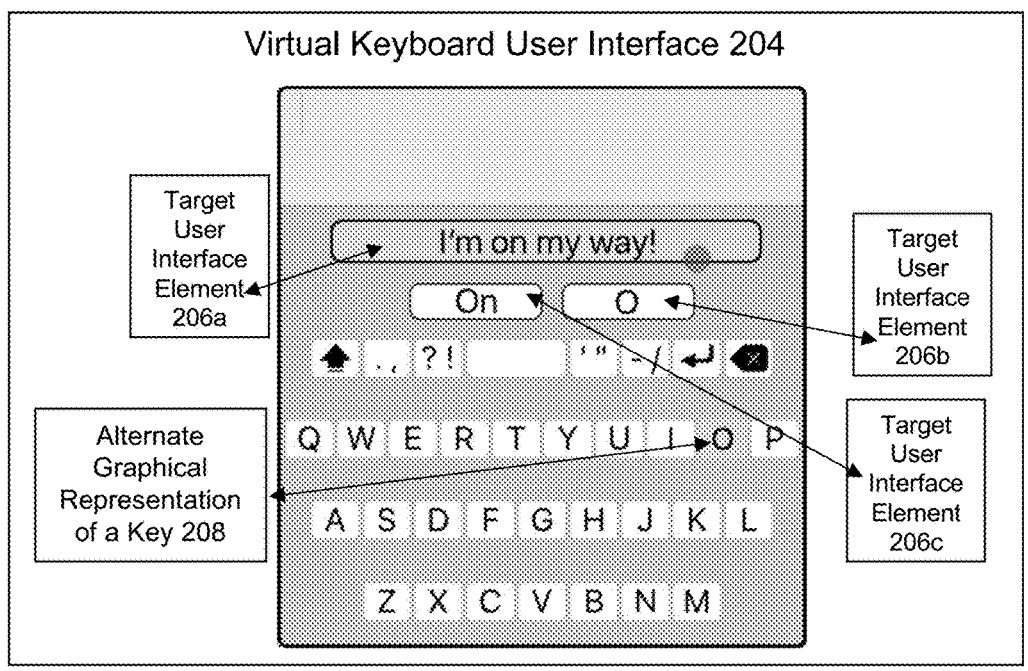
Figure 21F:
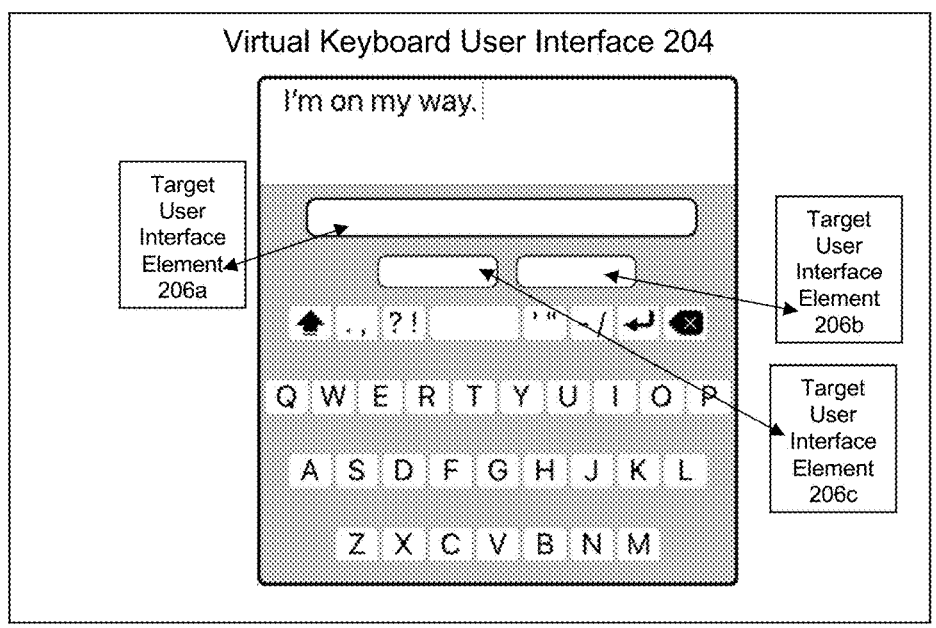

FIG. 21A shows a preferences screen. The user has specified phrases for certain letters of the alphabet but not others. Note that the phrase does not need to begin with the letter it is attached to. In this example, the phrase "I'm on my way." is associated with the letter "o". In FIG. 21B the user touches the "G" key 208. The virtual keyboard application 202 shows targets for inserting the letter "G" 206b, the word "Get" 206c, or the phrase "Good for you" 206a. In FIG. 21C the user touches the "H" key 208. The virtual keyboard application 202 shows targets for inserting the letter "H" 206b, the word "Have" 206c, or the phrase "Have a nice day" 206ba. In FIG. 21D user touches the "O" key 208. The virtual keyboard application 202 shows targets for inserting the letter "O" 206b, the word "On" 206c, or the phrase "I'm on my way" 206a. In FIG. 21E the user moves the touch point to the target for the phrase "I'm on my way" 206a. The target 206a highlights. In FIG. 21F the user has released the touch point. The target is activated, the phrase is inserted, and the command sequence is completed.

Alternatively, the virtual keyboard application 202 could monitor the user's writing for word and letter sequences that begin common phrases. (These phrases could be common in the general usage of the language, or they could be common to the particular user.) It could then offer to insert the complete phrase if it determines that there is sufficient likelihood the user will type that phrase.

Figure 22A:
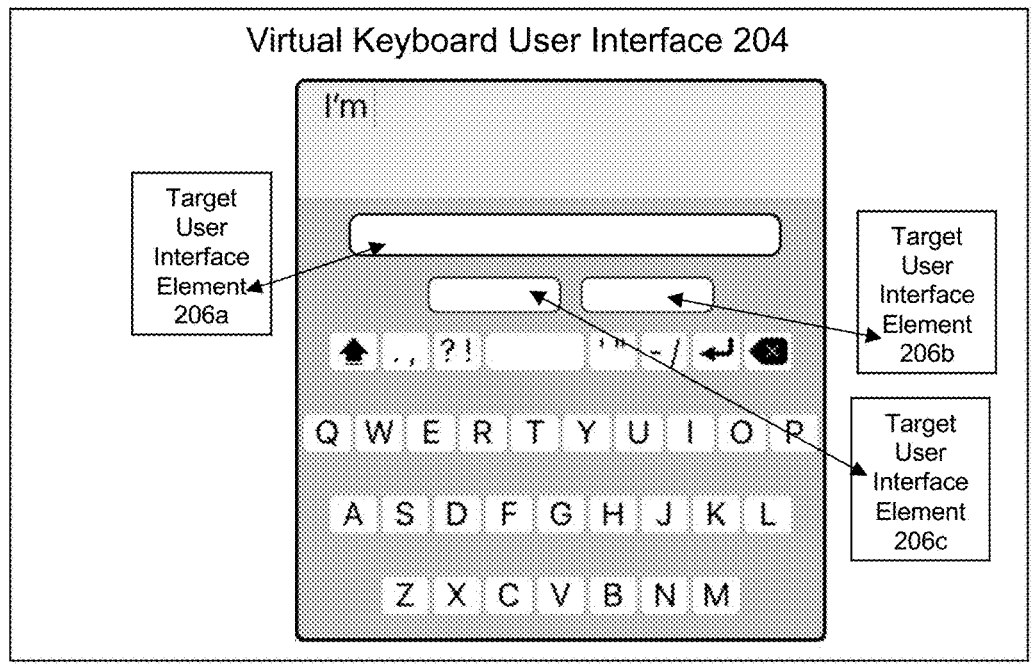
FIGS. 22A-22D are block diagrams showing that the virtual keyboard application could monitor the user's writing for word and letter sequences that begin common phrases.
Figure 22B:
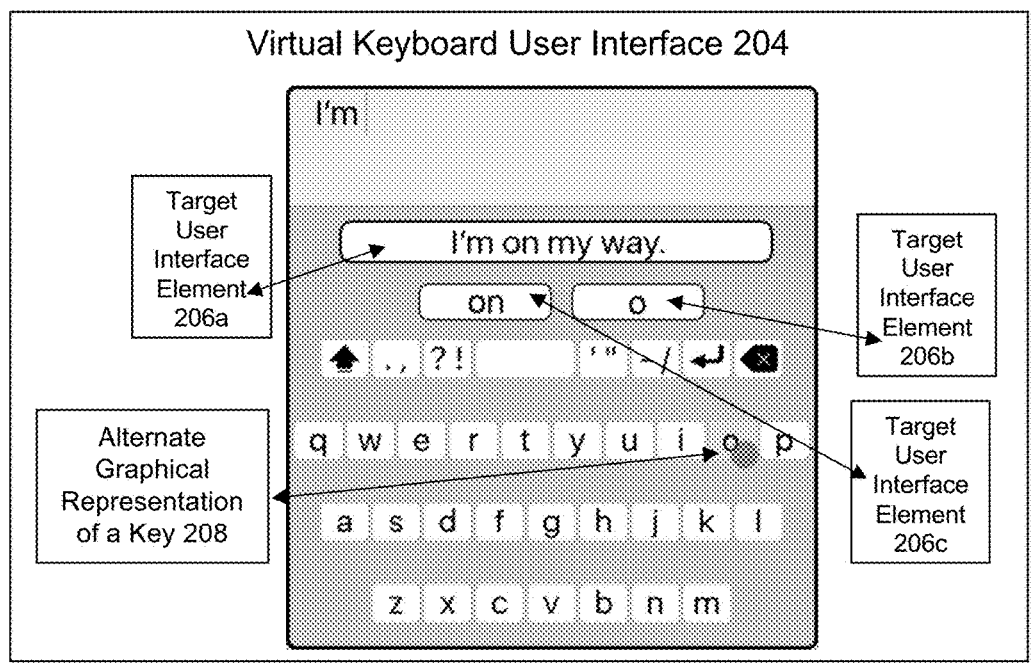
Figure 22C:
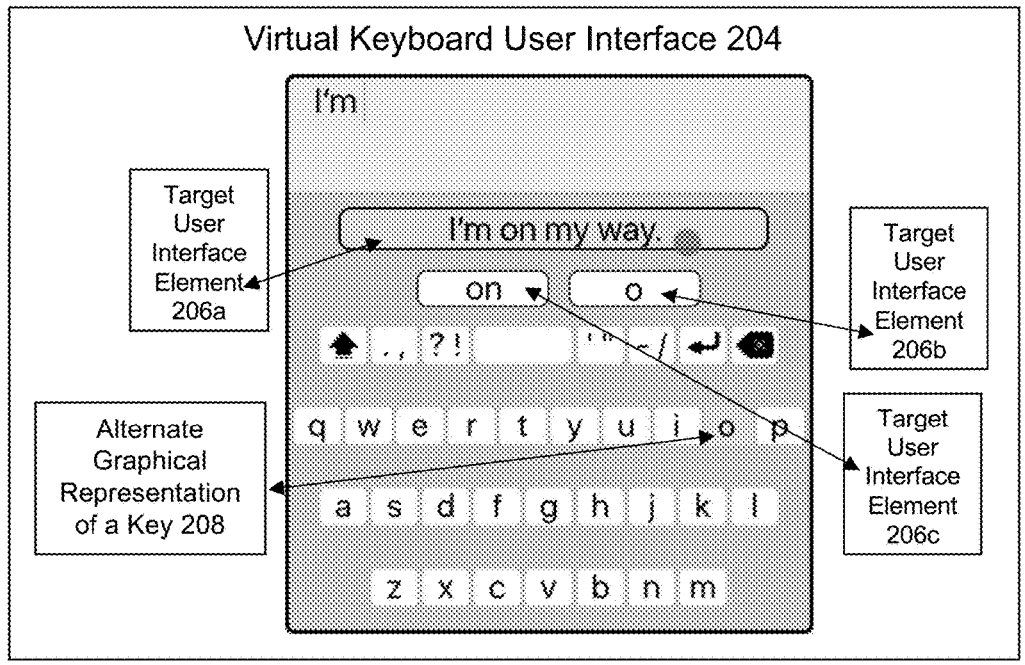
Figure 22D:
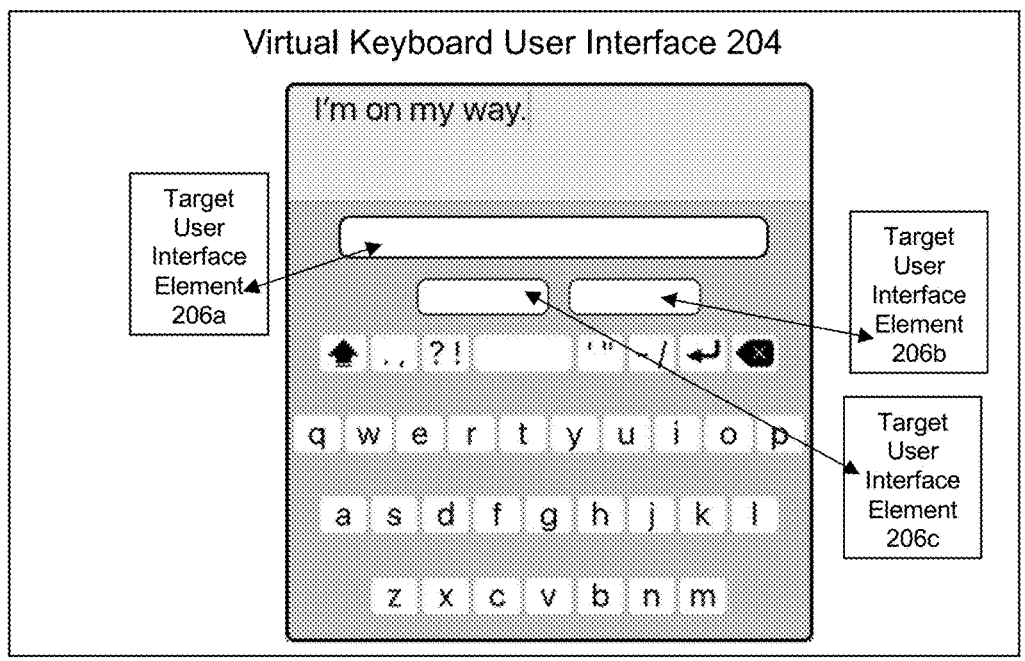

FIG. 22A shows that the insertion point is directly following the word "I'm". In FIG. 22B the user touches the "o" key 208. The virtual keyboard application 202 shows targets for inserting the letter "o" 206b, the word "on" 206c, or the phrase "I'm on my way" 206a. In FIG. 22C the user moves the touch point to the target 206a for the phrase "I'm on my way". The target 206a highlights. In FIG. 22D the user has released the touch point. The target is activated, the phrase is inserted, and the Command Sequence is completed.

For Use in Assistive and Adaptive Communications (AAC)

In some embodiments, the virtual keyboard application 202 provides advantages in the creation of Assistive and Adaptive Communication (AAC) systems. These systems are commonly used by people who cannot speak because of some combination of physical and/or cognitive disabilities.

AAC devices typically use pictures to indicate words. This allows users to select a complete word with one action, thus reducing the number of keystrokes required to communicate (important for people who have physical disabilities). Using pictures also makes the AAC device accessible to people with cognitive impairments that would make it difficult or impossible for them to use written words.

The virtual keyboard application 202 improves on existing systems in a number of ways. For example, it is easier to select the desired picture because the user does not need to tap directly on the picture; they can tap anywhere near the picture and then move their finger onto the picture. Also, if the user accidentally selects the wrong picture, they can lift their finger (or other pointing device) without dragging to the target, thereby aborting the command sequence. In a tap-to-enter AAC system, if a user taps the wrong key they have to take a separate action to delete the incorrect entry.

Another advantage of the virtual keyboard application 202 for AAC systems is that it allows each picture to provide access to multiple words, through the multiple target feature.

Figure 23A:
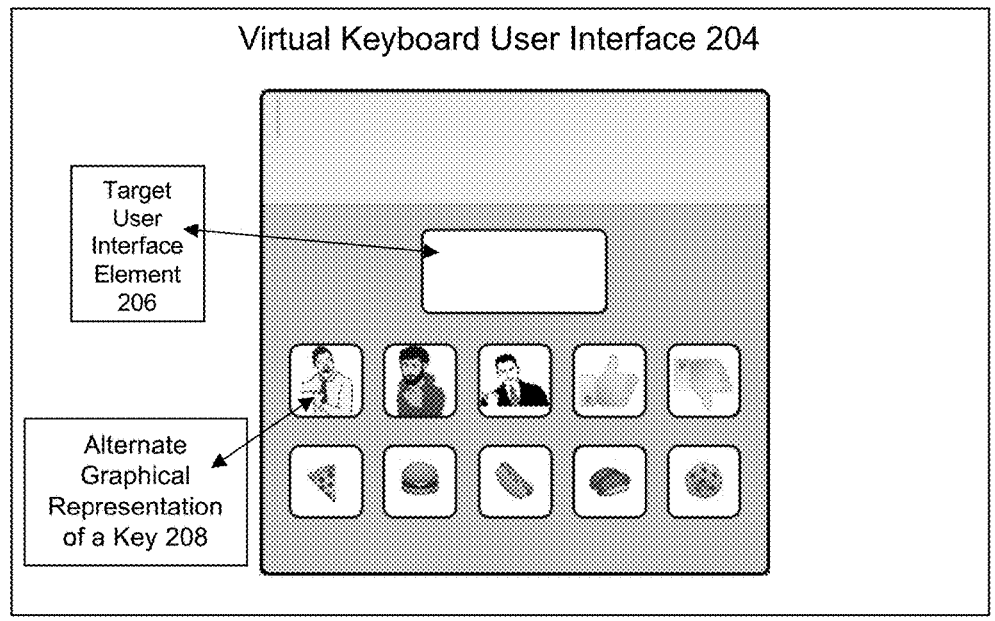
FIGS. 23A-23I are block diagrams showing that the virtual keyboard application provides advantages in the creation of Assistive and Adaptive Communication (AAC) systems.
Figure 23B:
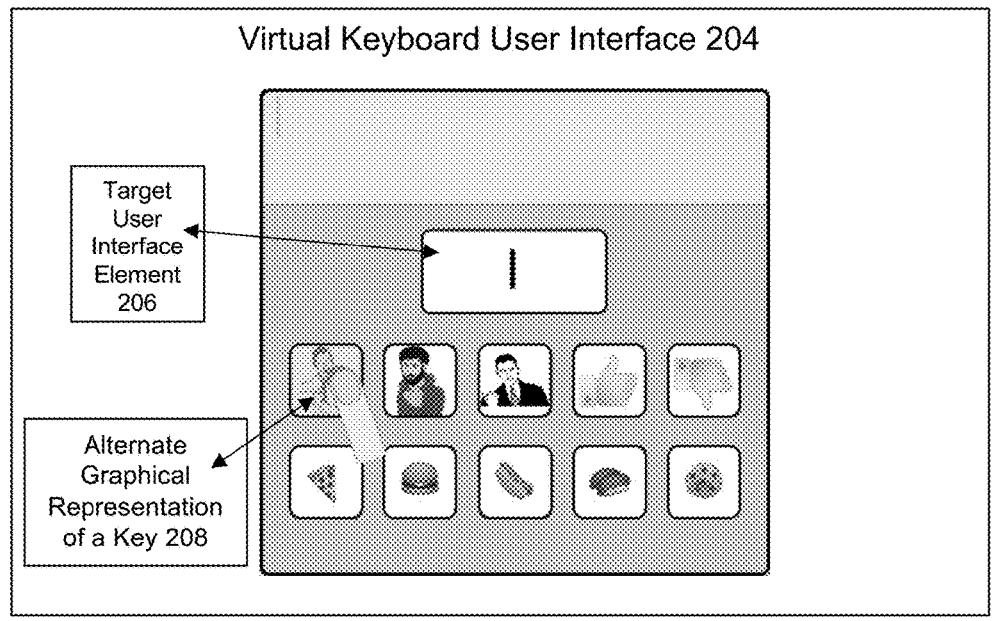
Figure 23C:
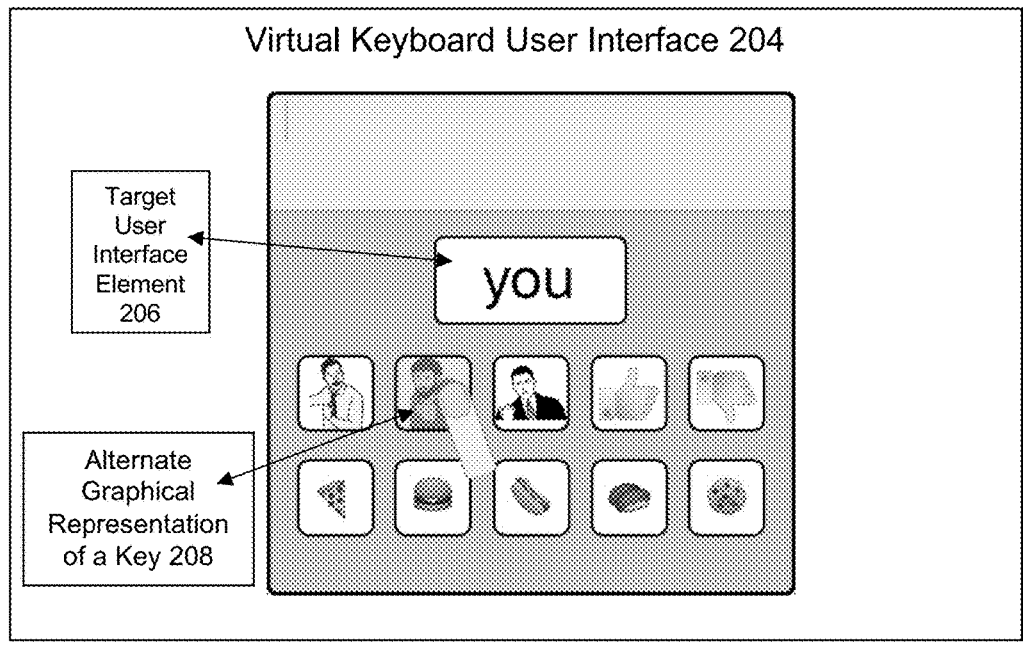
Figure 23D:
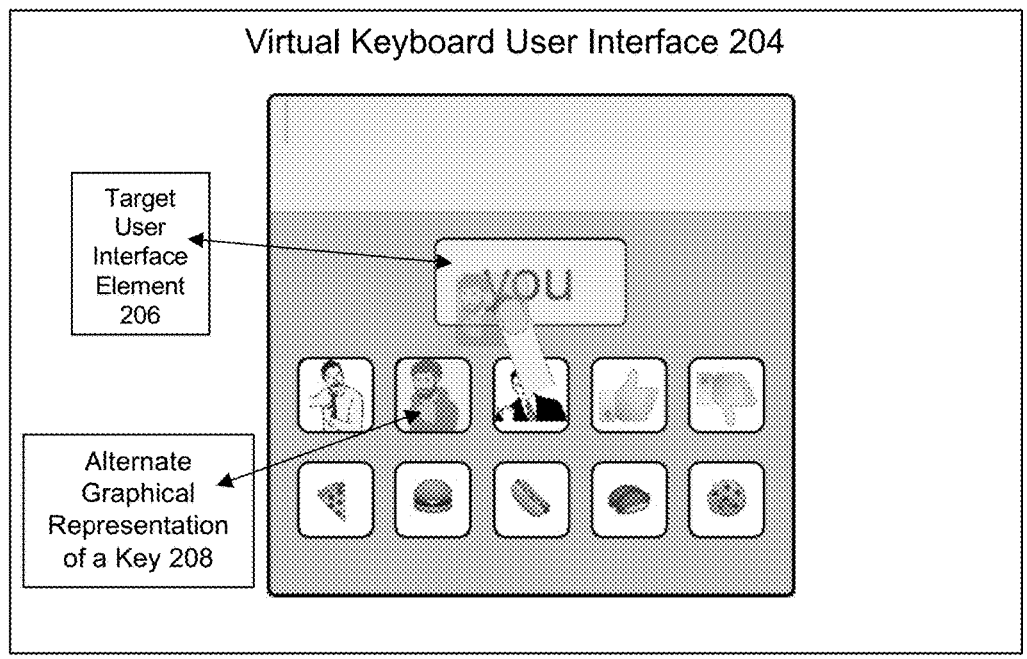
Figure 23E:
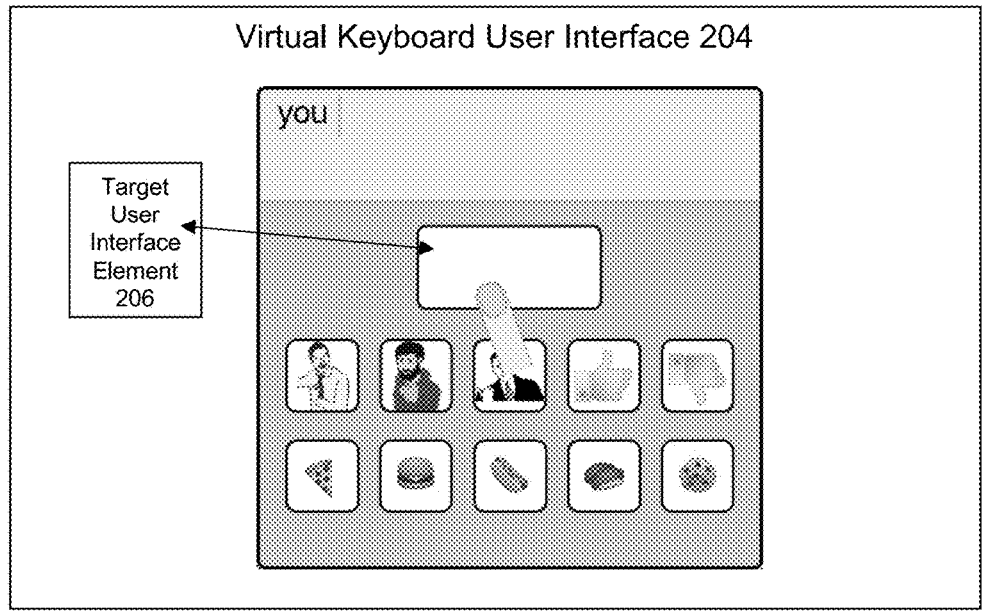
Figure 23F:
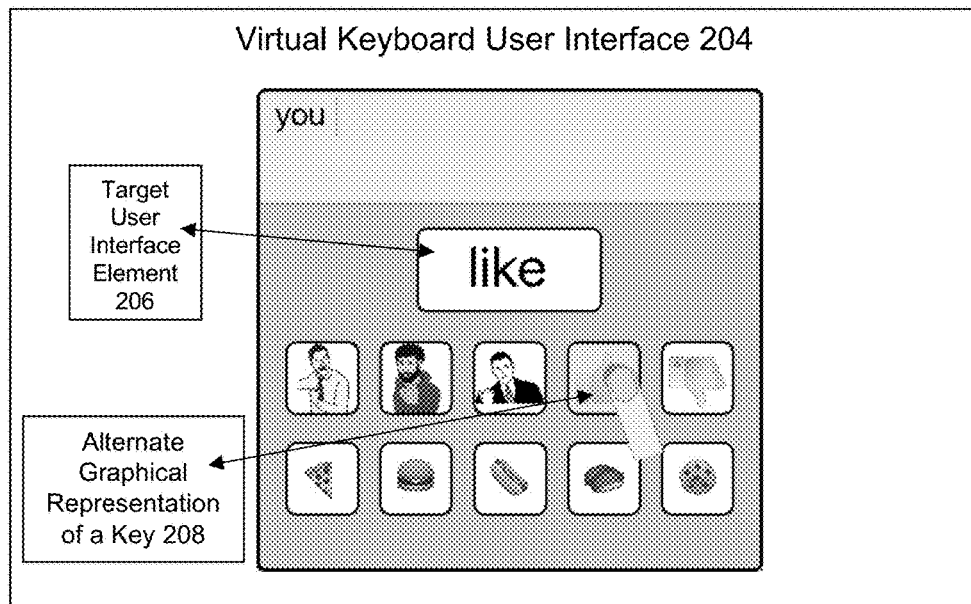
Figure 23G:
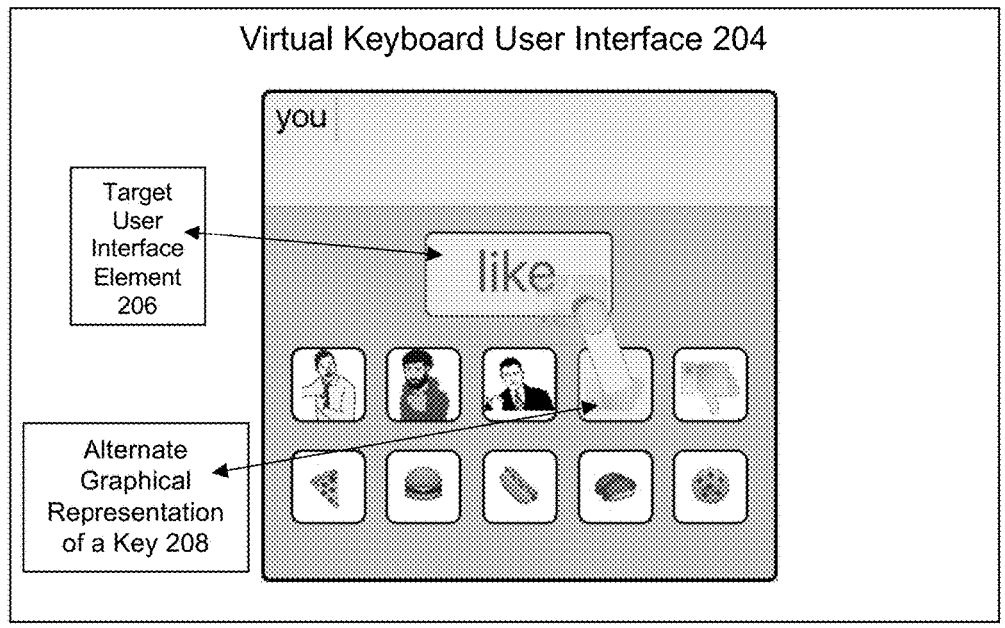
Figure 23H:
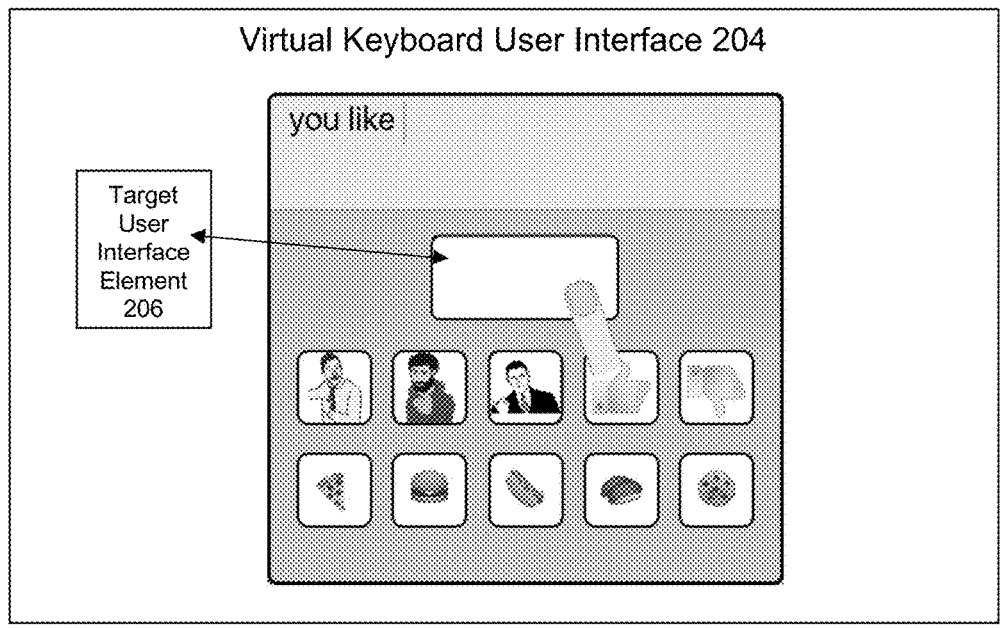
Figure 23I:
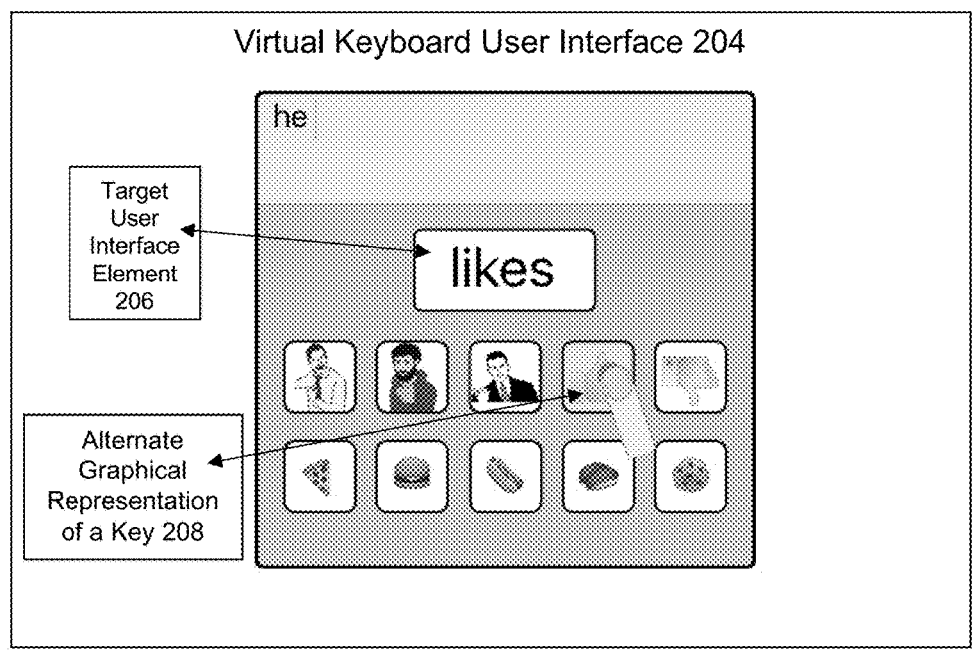

FIG. 23A shows a simple AAC system built with the virtual keyboard application 202. A text entry area is shown at the top. There are two rows with five keys per row. Each key displays a picture. Between the keys and the text entry area is a single target 206. FIG. 23B shows the user selecting the key 208 with a picture of a person pointing to themselves. The word 'I' appears in the target 206, indicating that this word would be inserted if the command sequence is completed. The system could optionally speak the word 'I' for users who cannot read. FIG. 23C shows the user selecting the key 208 with a picture of a person pointing outward. The word 'you' appears on the target 206. FIG. 23D shows the user dragging their finger to the target 206. The target highlights when the finger is on it. Note that a copy of the picture is dragged along with the finger to reinforce the key selection. In FIG. 23E the user has lifted their finger. The word 'you' is inserted and the keys and targets return to their inactive state (no highlights and no label on the target). FIG. 23F shows the user selecting the 'thumbs up' key 208, which indicates the word 'like'. FIG. 23G shows the user dragging to the target 206. In FIG. 23H the user has lifted their finger and the word 'like' is inserted. FIG. 23I shows that context can be used to automatically conjugate verbs or choose other word inflections to match previously entered text. In this case the presence of the word 'he' causes the target 206 to display 'likes' rather than 'like'.

Multiple Targets in AAC Applications

Providing multiple targets in an embodiment in which the virtual keyboard application 202 integrates with an AAC system gives the user increased expressiveness with a smaller number of actions. FIGS. 24A-24F illustrate some of the possible uses of multiple targets in an AAC system.

Figure 24A:
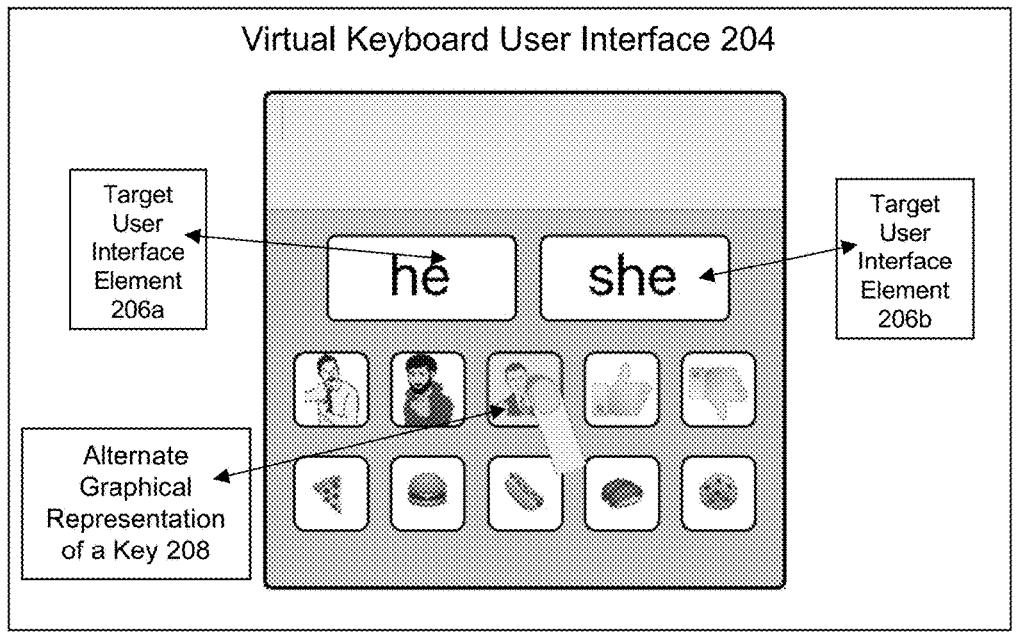
FIGS. 24A-24F are block diagrams showing that providing multiple targets in an AAC system gives the user increased expressiveness with a smaller number of actions.
Figure 24B:
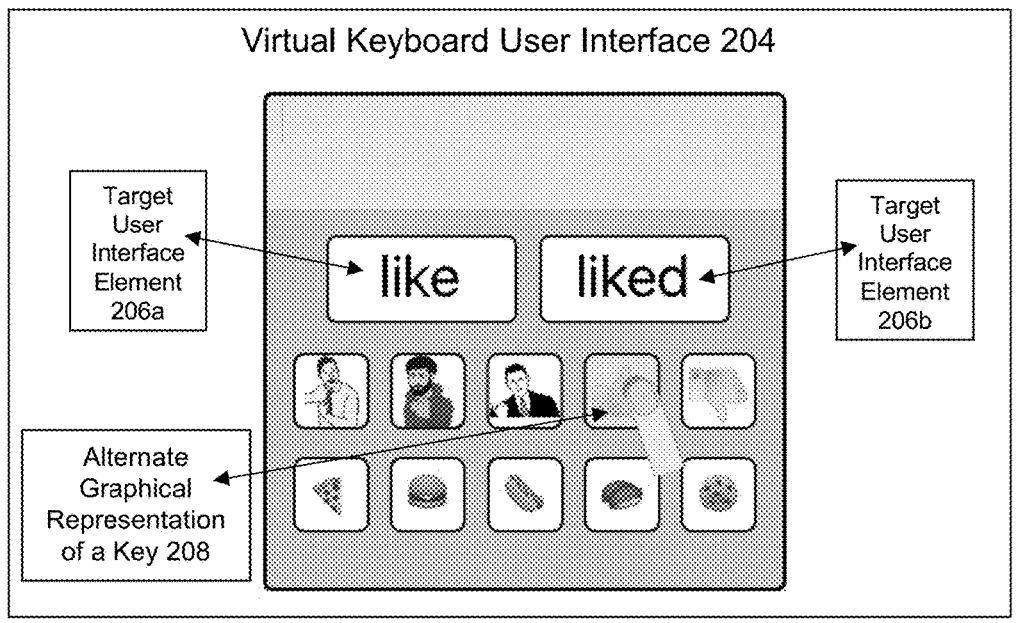
Figure 24C:
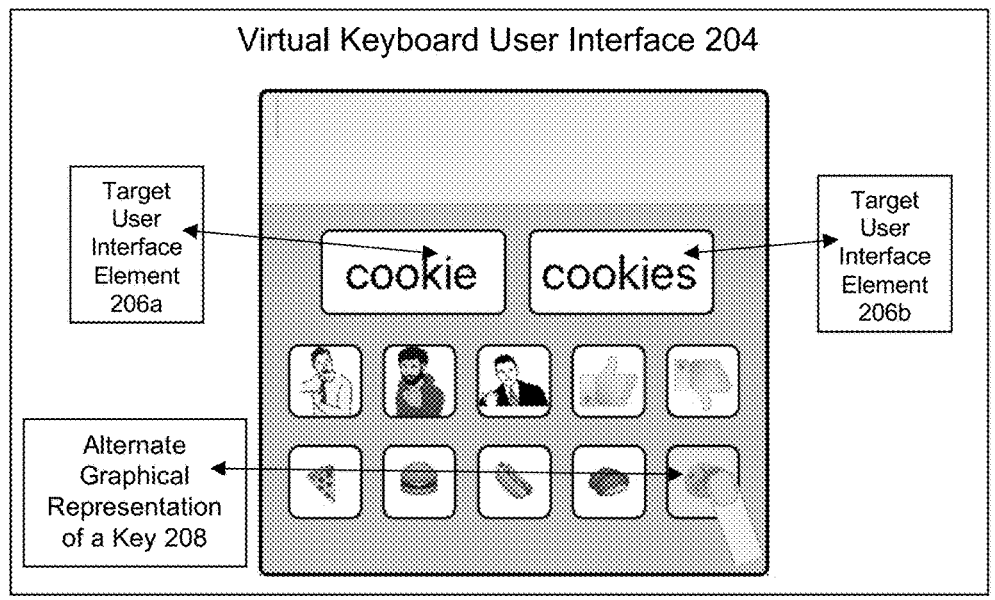

FIG. 24A shows an AAC system displaying two targets 206a and 206b. The user has selected the key 208 that indicates third-person singular. The targets 206a and 206b give the user the choice of inserting the word 'he' or 'she'. FIG. 24B shows the user selecting the key 208 for the verb 'like'. The targets 206a and 206b give the user the choice of inserting the present-tense or past-tense form of the verb. FIG. 24C shows the user selecting the key 208 for the noun 'cookie'. The targets 206a and 206b give the user the choice of inserting the singular or plural version of the word.

Figure 24D:
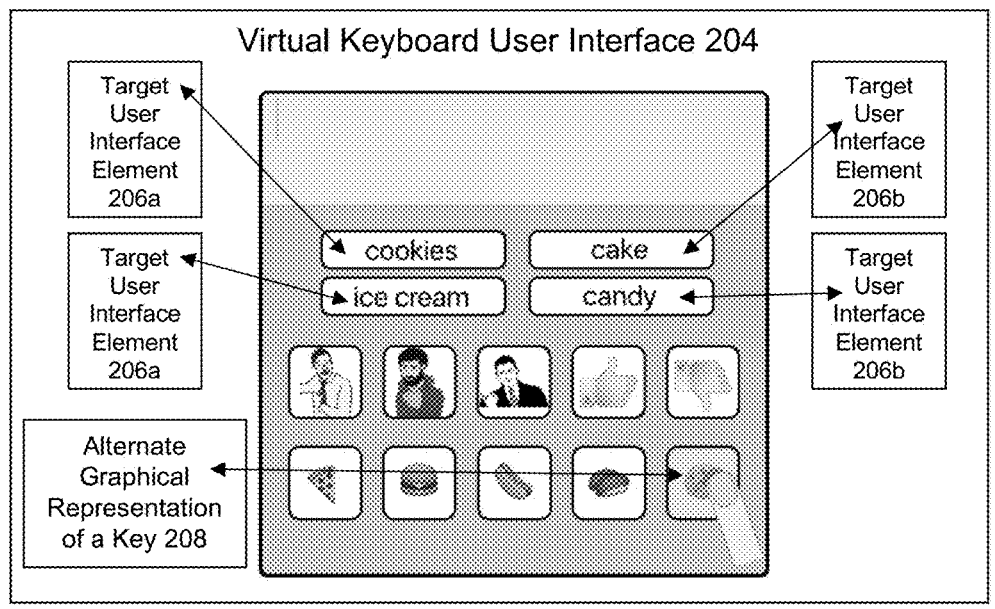
Figure 24E:
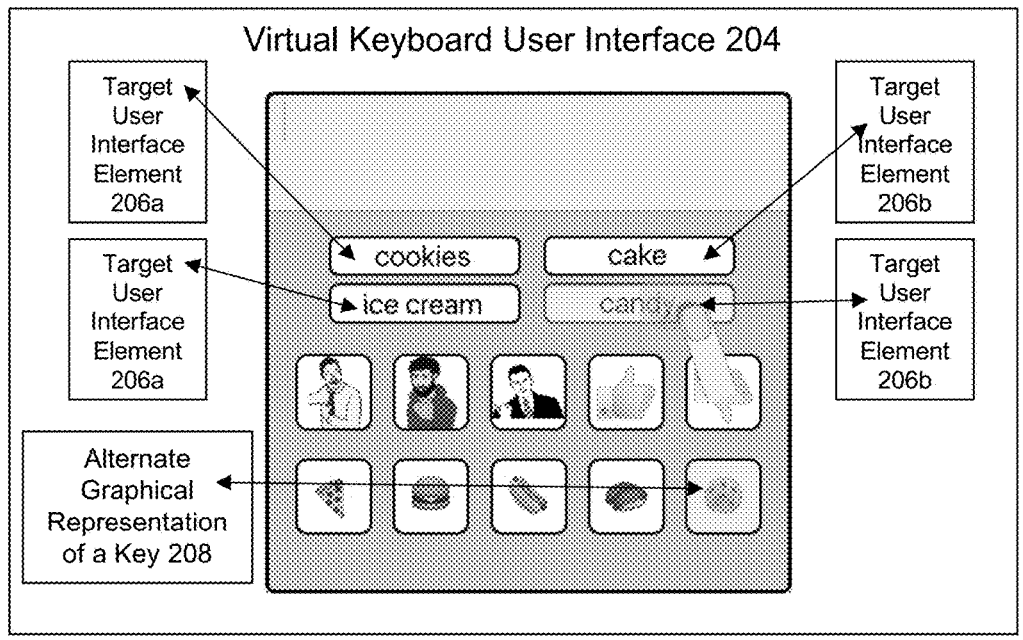
Figure 24F:
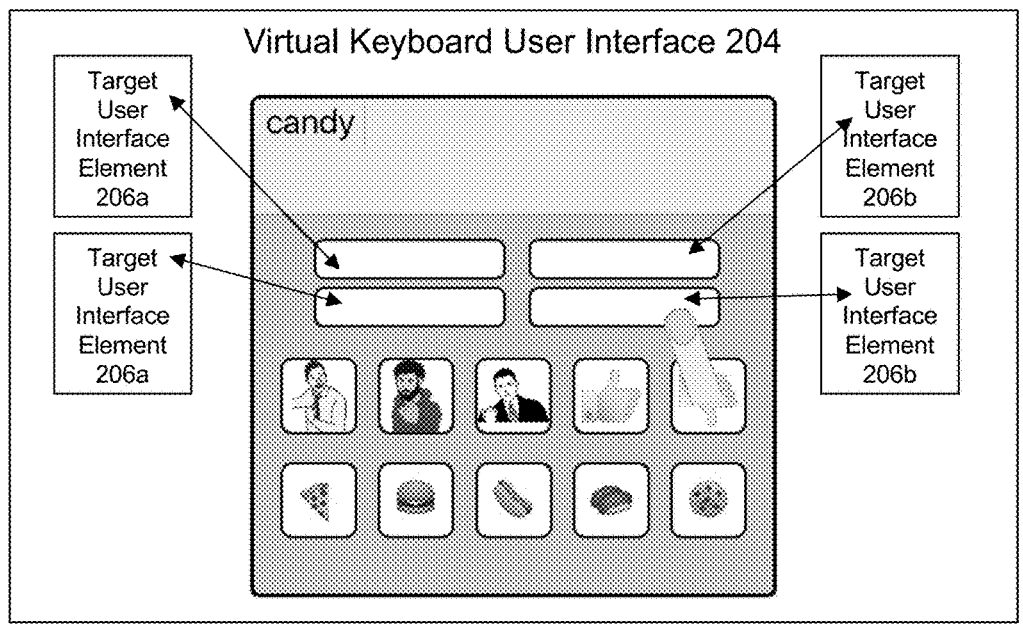

FIGS. 24D-24F show how the use of multiple targets can improve upon a common feature of existing AAC systems. Existing AAC systems are often built with hierarchical pages of vocabulary. The user will first select a category (e.g. "desserts") and then be taken to a separate screen showing keys for each possible dessert. An AAC system built with the virtual keyboard application 202 allows the user to select from a number of items within a category with a single action, without the need to move to a separate screen. In FIG. 24D, the key 208 labeled with a picture of a 'cookie' does not indicate the word 'cookie'. It indicates the category of dessert words. FIG. 24E shows the user dragging their finger to the word 'candy' 206b. In FIG. 24F the user has lifted their finger, the word 'candy' in inserted, and the virtual keyboard application 202 reverts to its inactive state.

In the examples showing multiple targets, an additional feature of the system would speak the word displayed on a target when the user moves their finger over that target. This would allow users who cannot read to choose between cookies, cake, ice cream, and candy, for example.

An alternative embodiment of the system would display pictures rather than words on the targets.

In all of the examples given for AAC systems, the discussion of "inserting text" is really a placeholder for generating text and doing something with it. The text display is not an inherent part of the virtual keyboard application 202. The generated text could be displayed, but it could equally easily be sent to a text-to-speech system and be spoken aloud.

Although only of each of the components in the system 200 has been described, for simplicity and clarity, one of ordinary skill in the art will understand that multiple such machines and systems may be provided.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure. Such phrases may, but do not necessarily, refer to the same embodiment.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, or any compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

Having described certain embodiments of methods and systems for distributed display, execution, and control of applications, it will now become apparent to one of skill in the art that other embodiments incorporating the concepts of the disclosure may be used.

The invention claimed is:

1. A method of operation for a computer executable user interface program to improve functionality of computing device input, wherein the computing device comprises a user interface, an interface to a host application, and an executive module in communication with the user interface and the host application, wherein the user interface displays a virtual keyboard including:
    a set of regions comprising an inactive background area,
    a set of regions comprising one or more keys configured to be responsive to touch events, and
    a set of regions comprising one or more targets, which are fixed in location or dynamically located relative to one or more keys; the method comprising:
configuring the executive module to execute computer code whereby;
    a) if a touch event is detected having a touch point within a key, and
    b) the touch point moves until it is within a target, and
    c) the touch event ends while the touch point is within the target, then
    d) one or more values associated with the target may be transmitted to the host application, and
    e) otherwise if the touch event ends while the touch point is outside of any target, the processing of the touch event ends and no values are transmitted to the host application;
further configuring the executive module to execute computer code whereby;
    f) if a touch event is detected as a touch point within the inactive background area, subsequent movement of the touch point is tracked, then
    g) if the touch event ends while the touch point remains within the inactive background area, no output is generated, else
    h) if the subsequent movement of the touch point places the touch point within a key, then execution continues to (a).

2. The method of claim 1 wherein one or more of the one or more keys provides a representation of one or more symbols.

3. The method of claim 2 further comprising displaying an initial static layout of the virtual keyboard, wherein each key displays multiple symbols.

4. The method of claim 1 further comprising displaying the one or more targets only in response to a touch event within a key.

5. The method of claim 1 further comprising always displaying the one or more targets and only assigning output values to the one or more targets in response to a touch event within a key.

6. The method of claim 1 further comprising updating a language database in response to a target selection.

7. The method of claim 1 further comprising modifying existing text of a word, located prior to an insertion point, or selected in the host application, based on output values associated with a target and sent to the host application.

8. The method of claim 1 further comprising aborting the touch event processing if a touch event has not ended within a specific period of time.

9. The method of claim 1 further comprising displaying multiple characters, words or phrases into the one or more targets.

10. The method of claim 1 further comprising altering the text of a word, located prior to an insertion point, in response to a touch event, wherein the altering includes inflections or conjugations of the word.

11. The method of claim 1 where the one or more targets are dynamically located.

12. The method of claim 1 further comprising displaying candidate output values in the one or more targets, wherein the candidate output values include synonyms.

13. The method of claim 1, wherein transmitting the one or more values to the host application requires both an initial action and a subsequent confirmation action.

14. The method of claim 1 wherein the computing device further comprises a completion generator in communication with the executive module that calculates the one or more candidate output values for association with a target when the touch event is detected.

15. The method of claim 14 where the completion generator assigns values to the one or more targets based on a currently selected key, existing text in the host application, insertion point location in the host application, selected text in the host application, a dictionary, word or letter frequency, language database, or language grammar.

16. The method of claim 14 where the completion generator translates from one language to another, and the method further comprises displaying translated values in the one or more targets corresponding to one or more languages.

17. The method of claim 14 wherein the computing device further comprises a context retrieval module in communication with the executive module that provides text values preceding an insertion point location in the host application and which are used by the completion generator to assign values to the one or more targets.

* * * * *